United States Patent [19]

Yasushi et al.

[11] Patent Number: 5,038,457
[45] Date of Patent: Aug. 13, 1991

[54] HARNESS PRODUCING APPARATUS

[75] Inventors: Ihara Yasushi; Sato Nobuo; Ikeji Masahiro; Asano Takahiro; Yamamoto Satomi; Ishizuka Yasumasa, all of Takarazuka, Japan

[73] Assignee: Shin Meiwa Industry Co., Ltd., Nishinomiya, Japan

[21] Appl. No.: 439,021

[22] PCT Filed: Apr. 24, 1989

[86] PCT No.: PCT/JP89/00431

§ 371 Date: Nov. 15, 1989

§ 102(e) Date: Nov. 15, 1989

[87] PCT Pub. No.: WO89/10619

PCT Pub. Date: Nov. 2, 1989

[30] Foreign Application Priority Data

| Apr. 27, 1988 | [JP] | Japan | 63-106014 |
| Jul. 6, 1988 | [JP] | Japan | 63-90370[U] |
| Aug. 5, 1988 | [JP] | Japan | 63-196943 |
| Nov. 29, 1988 | [JP] | Japan | 63-155956[U] |
| Nov. 29, 1988 | [JP] | Japan | 63-155957[U] |
| Nov. 29, 1988 | [JP] | Japan | 63-303231 |
| Feb. 3, 1989 | [JP] | Japan | 1-25998 |

[51] Int. Cl.⁵ .......................................... H01R 43/00
[52] U.S. Cl. ..................................... 29/564.4; 29/749
[58] Field of Search .................. 29/564.4, 33 M, 748, 29/749, 753, 755, 759, 747, 867, 566.2, 566.3, 564.8; 81/9.51

[56] References Cited

U.S. PATENT DOCUMENTS

| 4,091,695 | 5/1978 | Funcik et al. | 81/9.51 |
| 4,361,942 | 12/1982 | Mazzola et al. | 29/33 M |
| 4,403,383 | 9/1983 | Dewhurst | 29/564.4 X |
| 4,489,476 | 12/1984 | Over et al. | 29/564.4 |
| 4,506,566 | 3/1985 | Schmid | 29/564.4 |
| 4,713,880 | 12/1987 | Dusel et al. | 29/564.4 |
| 4,932,110 | 6/1990 | Tanaka | 29/749 X |

FOREIGN PATENT DOCUMENTS

| 240836 | 10/1987 | European Pat. Off. | 81/9.51 |
| 33-4693 | 1/1956 | Japan . | |
| 38-15874 | 7/1958 | Japan . | |
| 36-22494 | 7/1958 | Japan . | |
| 48-38392 | 11/1973 | Japan . | |
| 50-29147 | 9/1975 | Japan . | |
| 51-13869 | 5/1976 | Japan . | |
| 53-44396 | 11/1978 | Japan . | |
| 54-118584 | 9/1979 | Japan . | |
| 55-26026 | 2/1980 | Japan . | |
| 55-32096 | 8/1980 | Japan . | |
| 55-32097 | 8/1980 | Japan . | |
| 55-32098 | 8/1980 | Japan . | |
| 56-139314 | 10/1981 | Japan . | |
| 57-43965 | 9/1982 | Japan . | |
| 58-22024 | 2/1983 | Japan . | |
| 58-13320 | 3/1983 | Japan . | |
| 60-204206 | 10/1985 | Japan . | |
| 61-154412 | 7/1986 | Japan . | |
| 61-273113 | 12/1986 | Japan . | |
| 61-273114 | 12/1986 | Japan . | |
| 62-27279 | 2/1987 | Japan . | |
| 62-23525 | 5/1987 | Japan . | |

Primary Examiner—William Briggs
Attorney, Agent, or Firm—Oblon, Spivak, McClelland, Maier & Neustadt

[57] ABSTRACT

This invention is directed to a harness producing apparatus for producing a harness (1) by cutting a wire (600a, 600b) having a core covered with a covering, stripping the covering from a cut end portion of the wire and attaching a terminal (604a, 604b) to the stripped end portion of the core. According to this apparatus, a holding means (201) for holding the wire (600a, 600b) is three-dimensionally moved by a moving means (202). When the covering is stripped off, the holding means (201) holds the wire (600a, 600b) at the vicinity of the cut end, so that the wire (600a, 600b) hardly expands and the stripping can be accurate. Further, when the terminal is attached, the core can be moved to a proper position in relation to a terminal attaching means (400) according to a type of terminal.

18 Claims, 43 Drawing Sheets

HARNESS PRODUCING APPARATUS

TECHNICAL FIELD OF THE INVENTION

The present invention relates to a harness producing apparatus for cutting a covered wire, stripping the covering from a cut end portion of the covered wire and attaching a terminal to the stripped end portion.

BACKGROUND OF THE INVENTION

FIG. 42 is a perspective view showing a harness 1. As shown in the figure, the harness 1 includes a covered wire 2 cut off by a predetermined length and terminals 3 attached to stripped end portions which are provided by stripping a covering at the opposite ends of the covered wire 2.

An apparatus for producing the harness 1 should have a structure for performing processes of cutting a covered wire, stripping a covering from a cut end portions of the covered wire and attaching terminals to the stripped end portions.

FIG. 43 shows a conventional producing apparatus. The harness producing apparatus comprises a wire feeding means 11 for feeding a covered wire 14 and a wire cutting means 12 having a pair of cutters for cutting off the covered wire 14 by nipping the upper and lower sides thereof and for cutting into its covering. The harness producing apparatus further includes a terminal attaching means 15 for attaching a terminal to a stripped end portion of the covered wire 14 and a moving means 13 for moving the covered wire 14 from a wire cutting position to a terminal attaching position.

In the harness producing apparatus, the covered wire 14 is fed by a predetermined amount in an direction of an arrow P by the wire feeding means 11, and then it is cut off with the cutters of the wire cutting means 12. Next, the covered wire 14 is moved forward by a covering stripped length in the direction of the arrow P by the wire feeding means 11, and the cutters of the wire cutting means 12 cut into the covering of the covered wire 12 from upper and lower sides. After that, the wire feeding means 11 moves the covered wire 14 backward while the cutters cut into the covering, so that the covering to be stripped is stripped out. The covered wire 14 which is partially stripped off is moved by the moving means 13 to a position where a terminal can be attached to the stripped end portion 16, and the stripped end portion 16 is attached with the terminal by the terminal attaching means 15.

However, it is necessary in such a harness producing apparatus that the moving means 13 is placed between the wire feeding means 11 and the wire cutting means 12, so that the distance between the wire feeding means 11 and the wire cutting means 12 must be long. Therefore, when the covered wire 14 is moved backward by the wire feeding means 11 with the cutters of the wire cutting means 12 cutting into the covering in the stripping process, a portion of the covering between the cutter and the wire feeding means 11 expands. As a result, the length of stripped and exposed portions of the core become ununiform in the respective stripped end portions 16 and the stripping accuracy is reduced.

Further, since the position in the terminal attaching means 15 to which the moving means 13 moves the covered wire can not be changed automatically, the setting position of the terminal attaching means 15 must be moved and adjusted to fit for every kind of attached terminals having different size and configuration. The adjustment must take much time and labor.

Although FIG. 43 shows an apparatus for attaching a terminal to one end of a harness, it is usually desirable that this kind of apparatus can attach terminals to both ends of the harness. Further, it is also desirable that this kind of apparatus has high processing capability and its cutters have high durability.

SUMMARY OF THE INVENTION

The present invention has been accomplished to overcome the above mentioned problems. It is a first object of the present invention to provide a harness producing apparatus which has a high accuracy in stripping a covered wire and can corrspond to many kinds of terminals to the wire with simple operation.

It is a second object of the present invention to provide a harness producing apparatus which achieves the first object and further attaches terminals to the opposite ends of a covered wire.

According to the first aspect of the present invention in order to achieve the first object, A harness producing apparatus for cutting a wire having a core covered with a covering, stripping the covering from a cut end portion of the wire and attaching a terminal to the stripped end portion of the core comprises (a) means for intermittently feeding the wire in a wire feeding direction; (b) means having first and second cutters disposed opposite to each other, for nipping and cutting off the wire and cutting into the covering with the first and second cutters; (c) means for attaching the terminal to the stripped end portion of the core; (d) means for holding and moving the wire, and which includes (d-1) means for holding the wire at a holding position where is close to a cutting position at which the wire is cut off by the cutting means and where is up the cutting portion in the wire feeding direction, and (d-2) means for moving the holding means three-dimensionally so that the wire held by the holding means is movable between the terminal attaching means and a wire feeding line along which the wire is fed by the wire feeding means; (e) means for driving the wire feeding means, the cutting means, the terminal attaching means and the holding and moving means, respectively; (f) means for inputting command and information; and (g) means for controlling the driving means by applying drive control signals to the driving means on the basis of the command and information inputted through the inputting means. The controlling means includes (g-1) means for performing a cutting process in which the wire is fed by the wire feeding means, and cut off by the cutting means while holding by the holding and moving means, (g-2) means for performing a stripping process in which, after the cutting process, the wire is moved by a prescribed amount in the wire feeding direction by the holding and moving means, the covering is cut into with the cutters, and the wire is moved in the reverse direction to the wire feeding direction by the holding and moving means with the cutters into, whereby an end portion of the covering is stripped from the wire, and (g-3) means for performing a terminal attaching process in which, after the stripping process, the stripped portion of the wire is moved to the terminal attaching means by the holding and moving means and the terminal is attached to the stripped portion by the terminal attaching means.

In the above construction according to the first aspect of this invention, since the movement of the holding means is controlled by the control means based upon information about the length of stripped parts or the kind of attached terminals, modification of the stripped length and attaching process for terminals of different kinds can be performed with high accuracy.

According to the second aspect of this invention in order to achieve the above second object, A harness producing apparatus for cutting a wire having a core covered with a covering to divide into a remaining wire and a cut-off wire, stripping the covering from a cut end portion of the remaining wire, stripping the covering from a cut end portion of the cut-off wire, attaching a terminal to a stripped portion of the core of the remaining wire and attaching a terminal to a stripped portion of the core of the cut-off wire comprises (a) means for intermittently feeding the wire in a wire feeding direction; (b) means having first and second cutters disposed opposite to each other, for nipping and cutting off the wire to divid into the remaining and cut-off wires and cutting into the covering with the first and second cutters; (c) first terminal attaching means for attaching the terminal to the stripped portion of the core of the remaining wire; (d) second terminal attaching means for attaching the terminal to the stripped portion of the core of the cut-off wire; (e) first holding and moving means for holding and moving the wire, and which includes (e-1) first holding means for holding the remaining wire at a first holding position where is close to a cutting position at which the wire is cut off by the cutting means and where is up the cutting position in the wire feeding direction, and (e-2) first moving means for moving the first holding means three-dimensionally so that the remaining wire held by the first holding means is movable between the first terminal attaching means and a wire feeding line along which the wire is fed by the wire feeding means; (f) second holding and moving means for holding and moving the wire, and which includes (f-1) second holding means for holding the cut-off wire at a second holding position where is close to the cutting position and where is down the cutting position in the wire feeding direction, and (f-2) second moving means for moving the second holding means three-dimensionally so that the cut-off wire held by the second holding means is movable between the second terminal attaching means and the wire feeding line; (g) means for discharging the cut-off wire having the terminal attached to the stripped portion of the core; (h) means for driving the wire feeding means, the cutting means, the first and second terminal attaching means, the first and second holding and moving means and the discharging means, respectively; (i) means for inputting command and information; and (j) means for controlling the driving means by applying drive control signals to the driving means on the basis of the command and information inputted through the inputting means. The controlling means includes (j-1) means for performing a cutting process in which the wire is fed by the wire feeding means and cut off by the wire cutting means to divide into the remaining and cut-off wires while holding by the first and second holding and moving means, (j-2) means for performing a first stripping process in which, after the cutting process, the remaining wire is moved by a prescribed amount in the wire feeding direction by the first holding and moving means, the covering of the remaining wire is cut into with the cutters and the wire is moved in the reverse direction to the wire feeding direction by the first holding and moving means as the cutters are cut into the convering, whereby an end portion of the covering is stripped from the remaining wire, (j-3) means for performing a second stripping process in which, after the cutting process, the cut-off wire is moved by a prescribed amount in the wire feeding direction by the second holding and moving means, the covering of the cut-off wire is cut into with the cutters and the cut-off wire is moved in the wire feeding direction by the second holding and moving means as the cutters are cut into the convering, whereby an end portion of the covering is stripped from the cut-off wire, (j-4) means for performing a first terminal attaching process in which, after the first stripping process, the stripped portion of the remaining wire is moved to the first terminal attaching means by the first holding and moving means and the terminal is attached to the stripped portion of the remaining wire by the first terminal attaching means, (j-5) means for performing a second terminal attaching process in which, after the second stripping process, the stripped portion of the cut-off wire is moved to the second terminal attaching means by the second holding and moving means and the terminal is attached to the stripped portion of the cut-off wire by the second terminal attaching means, and (j-6) means for performing a discharging process in which, after the second terminal attaching process, the cut-off wire is released from the second holding and moving means and discharged by the discharging means.

Similarly to the first aspect of this invention, in the above construction according to the second aspect of this invention, since the holding means is controlled by the control means based on information about the length of stripped parts or the kind of attached terminals, modification of the stripped length and attaching process for terminals of different kinds can be performed with high accuracy. Further, the covered wire can be provided with the terminals at opposite ends by stripping process and terminal attaching process applied to the both ends of the covered wire.

It is a third object of the present invention to provide a harness producing apparatus which achieves the second object and further has high throughput.

It is a fourth object of the present invention to provide a harness producing apparatus which achieves the third object and further has a high durability of cutter.

It is a fifth object of the present invention to provide a harness producing apparatus which achieves the first or second objects, further is easy to assemble and can control the cutter position with high accuracy.

It is a sixth object of the present invention to provide a harness producing apparatus which achieves the first or second objects and further which a life of the cutters is long and the cutters are wheted in easy.

It is a seventh object of the present invention to provide a harness producing apparatus which achieves the first or second objects and further in which the optimum cutting depth is not changed depending upon the operator or the like, the high processing quality can be maintained and the optimum cutting depth can be obtained in a short period of time.

It is an eighth object of the present invention to provide a harness producing apparatus which achieves the first or second objects and further has a simple construction, and can prevent scraps from scattering with a small sucking means.

It is a ninth object of the present invention to provide a harness producing apparatus which achieves the first or second objects and further has a simple construction, and can surely prevent from scattering scraps.

It is a tenth object of the present invention to provide a harness producing apparatus which achieves the first or second objects and further feeds the wires without applying any excessive tension to the wire.

BEST MODES OF CARRYING OUT THE INVENTION

A. Summary of a First Embodiment

Figure 1A:
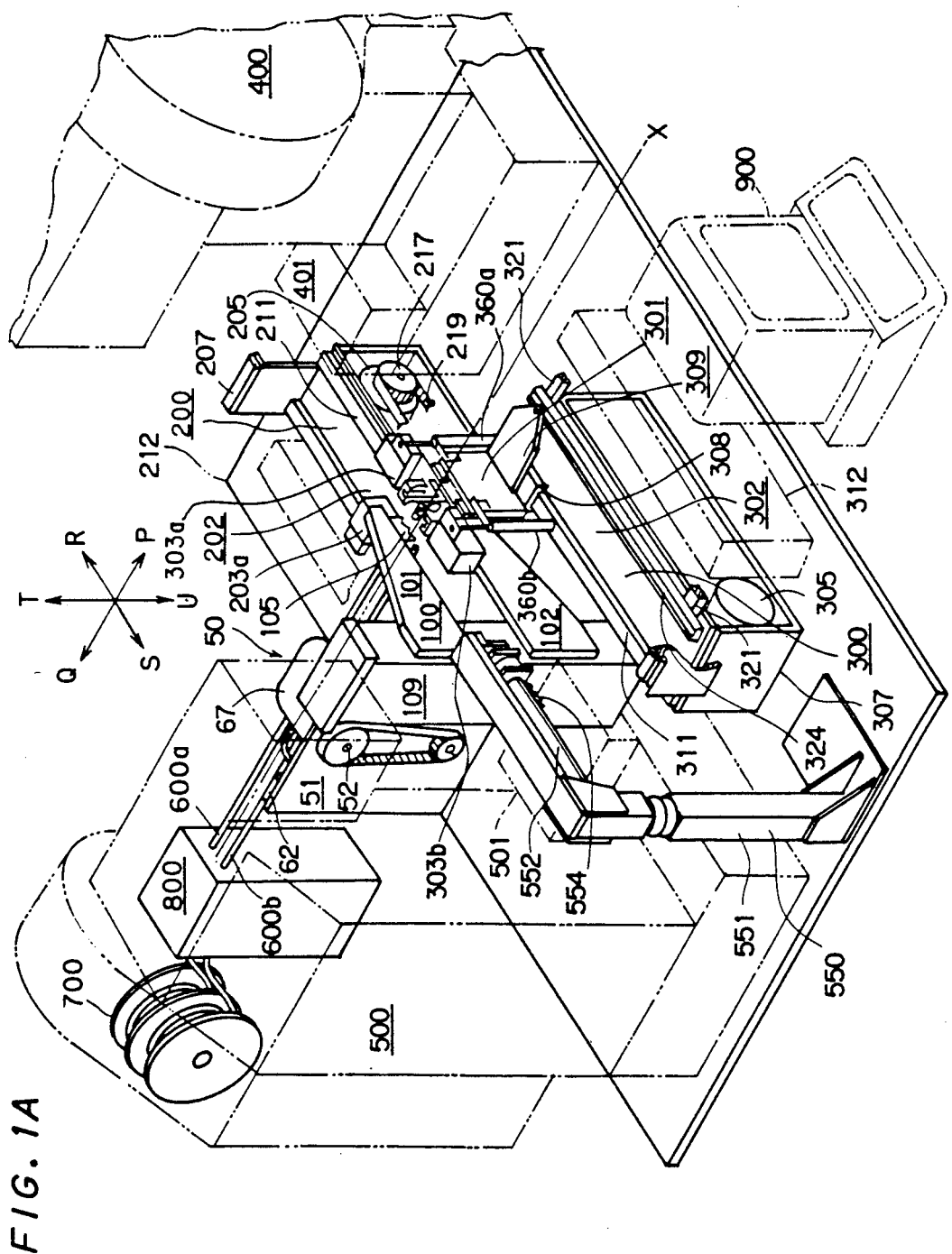
FIG. 1A is a perspective view showing a harness producing apparatus according to a first embodiment of the present invention.
Figure 1B:
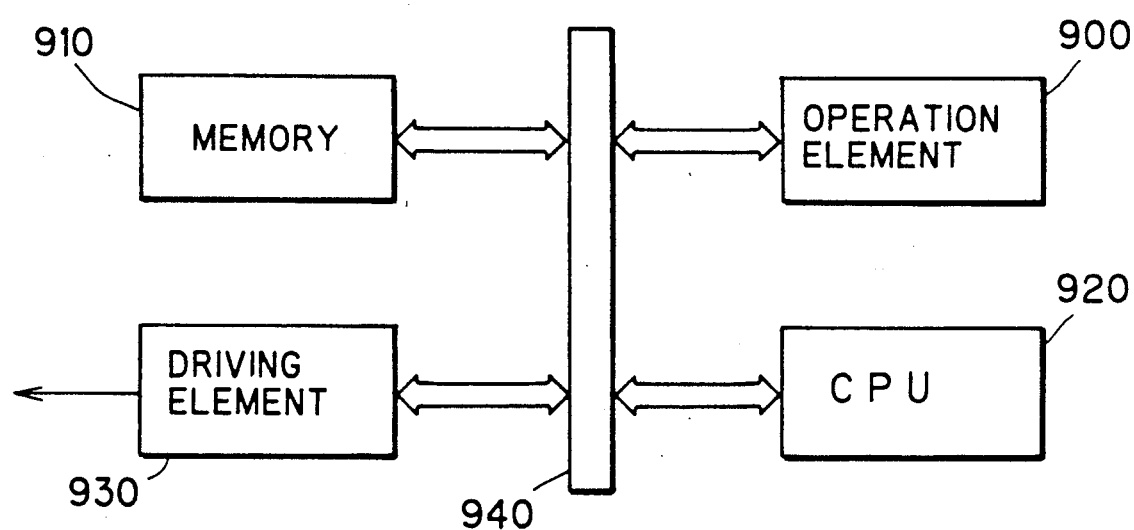
FIG. 1B is a block diagram showing a control means thereof.
Figure 2:
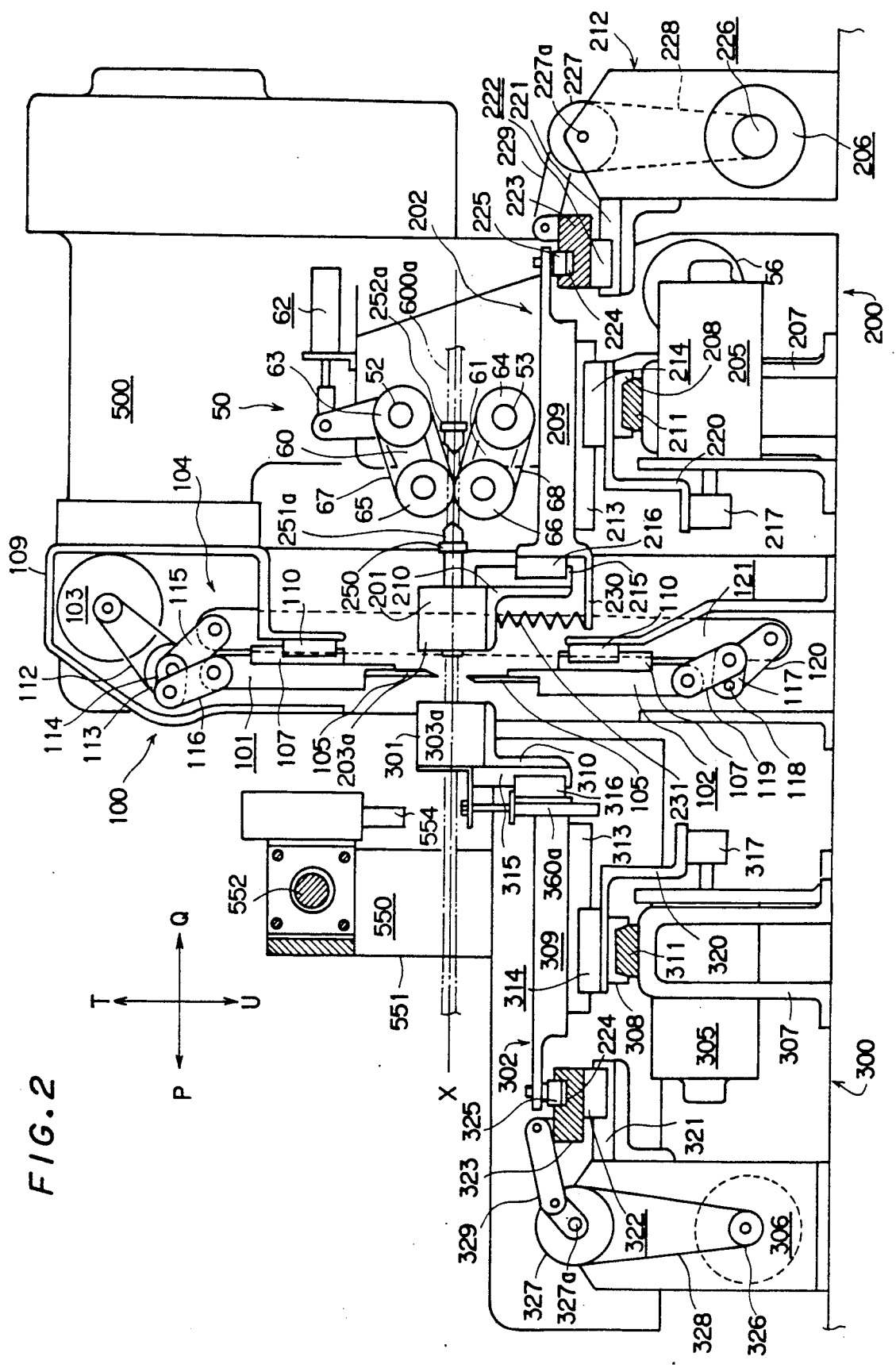
FIG. 2 is a side view thereof.
Figure 3A:
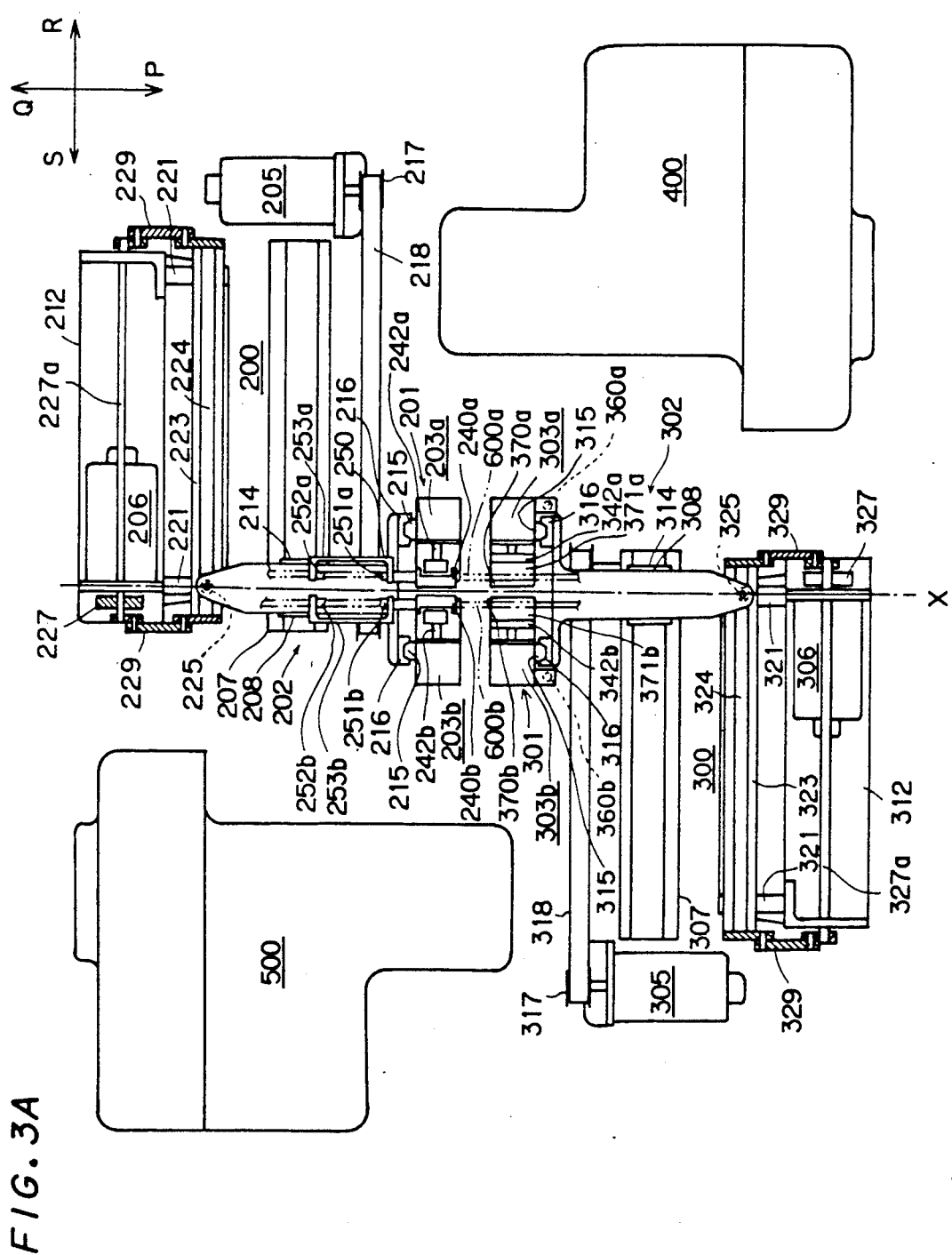
FIGS. 3A and 3B are plan views thereof, respectively.
Figure 3B:
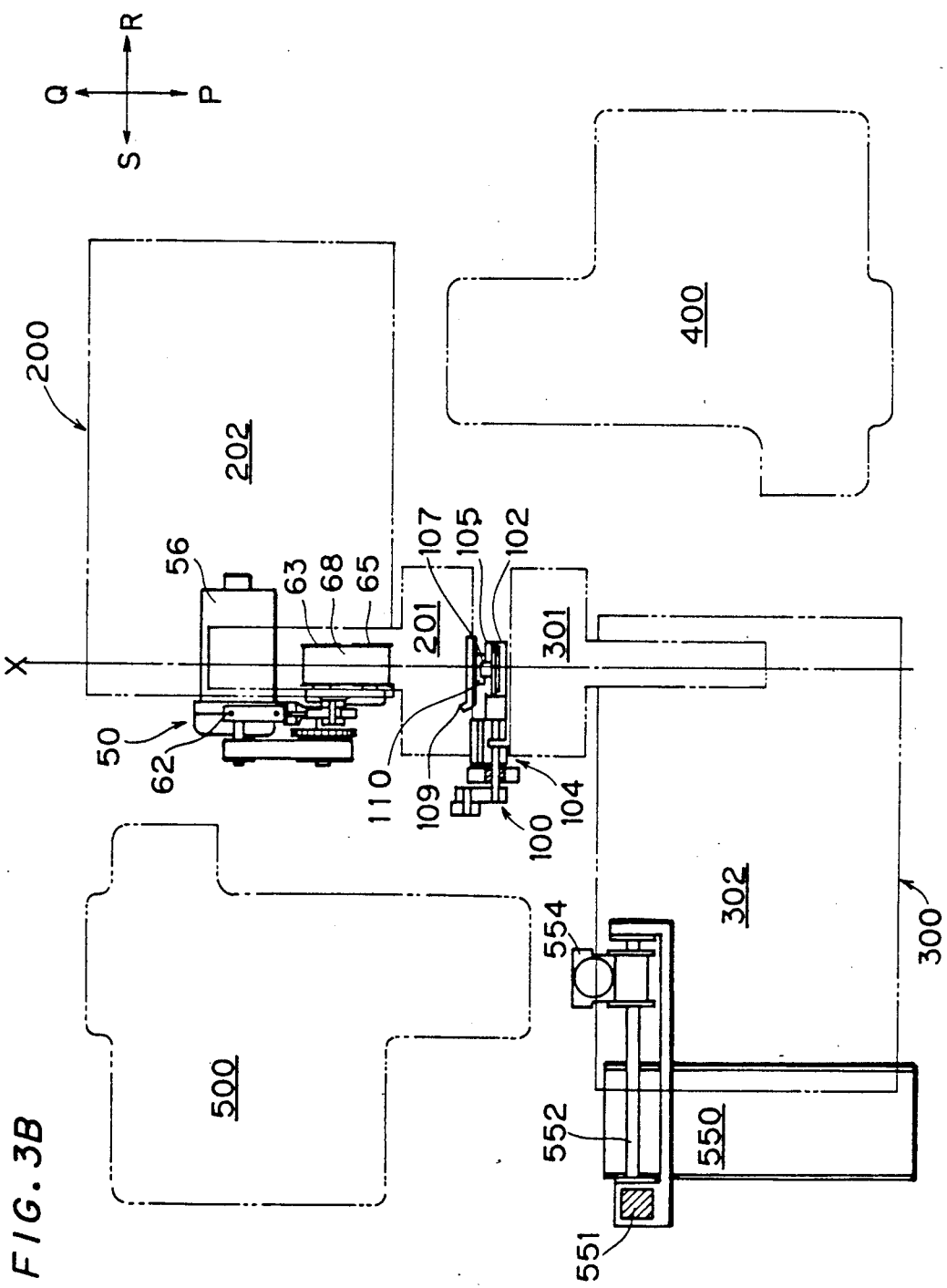

FIG. 1A is a schematic view showing a first embodiment of a harness producing apparatus A according to the invention of claim 2; FIG. 1B is a block diagram showing control means C1 of the harness producing apparatus A; FIG. 2 is a side view of the harness producing apparatus A; and FIGS. 3A and 3B are plan views of the harness producing apparatus A, respectively. The harness producing apparatus A is also an embodiment according to claim 1.

Figure 42:
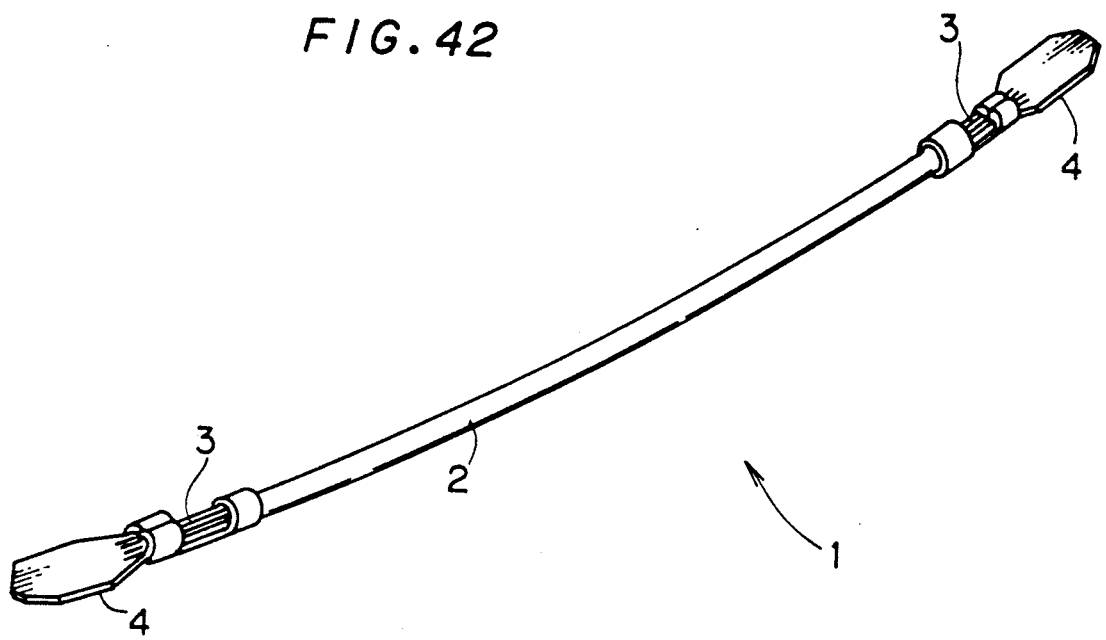
FIG. 42 is a perspective view showing a harness.
Figure 43:
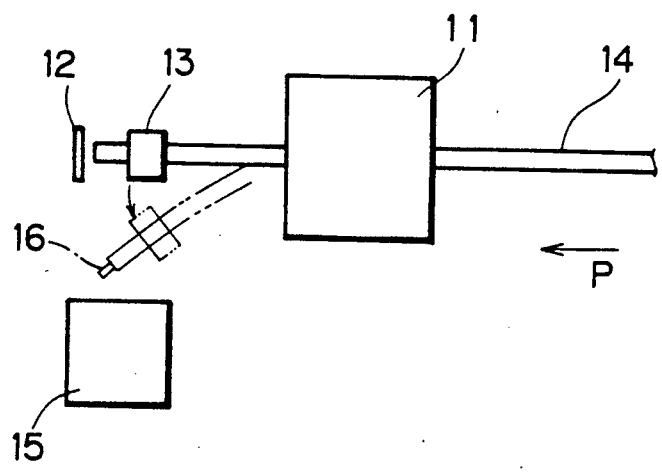
FIG. 43 is a schematic plan view showing a conventional harness producing apparatus.

The harness producing apparatus A shown in the figures is for producing a harness (shown in FIG. 42) having terminals attached to its opposite ends. The harness producing apparatus A comprises wire feeding means 50, wire cutting means 100, first and second holding and moving means 200, 300, first and second terminal attaching means 400, 500 and discharging means 550.

Two covered wires 600a, 600b are simultaneously fed in the direction of an arrow P along a wire feeding line X, and thereafter they are held by the first holding and moving means 200 at positions which are close to respective predetermined cutting regions and upstream with regard to the wire feeding direction P. Also, the covered wires 600a, 600b are held by the second holding and moving means 300 at the downstream positions. Then, each of the covered wires 600a, 600b is cut off with the wire cutting means 100 (cutting treatment) so that they can be devided into remaining wires and cut-off wires, respectively. A covering of the remaining wires is stripped in its down stream part by the first holding and moving means 200 and the wire cutting means 100 in a way described below. The remaining wires having a stripped end portion are moved in the direction of an arrow R perpendicular to the wire feeding direction P. Terminals are attached to the respective stripped end portions of the remaining wires by the first terminal attaching means 400, respectively. The remaining wires are moved in the direction of an arrow S to an original position by the first holding and moving means 200. On the other hand, respective covering of the cut-off wires is stripped in its upstream part by the second holding and moving means 300 and the wire cutting means 100 in a way described below. The cut-off wires having a stripped end portion are moved in the direction of the arrow S by the second holding and moving means 300. Terminals are atached to the respective stripped end portions of the cut-off wires by the second terminal attaching means 500, respectively. The cut-off wires are discharged by the discharging means 550, and thereafter the second holding and moving means 300 is moved in the direction of the arrow R to an original position. Harness attached terminals at its opposite ends are produced one after another by continuously repeating the above procedure. Althouh this invention is applied to the apparatus which feeds two covered wires 600a, 600b simultaneously, it is clearly that this invention can be applied to the apparatus which feeds only one covered wire.

The respective means will be explained in detail below.

A-1. Wire Feeding Means

Figure 4:
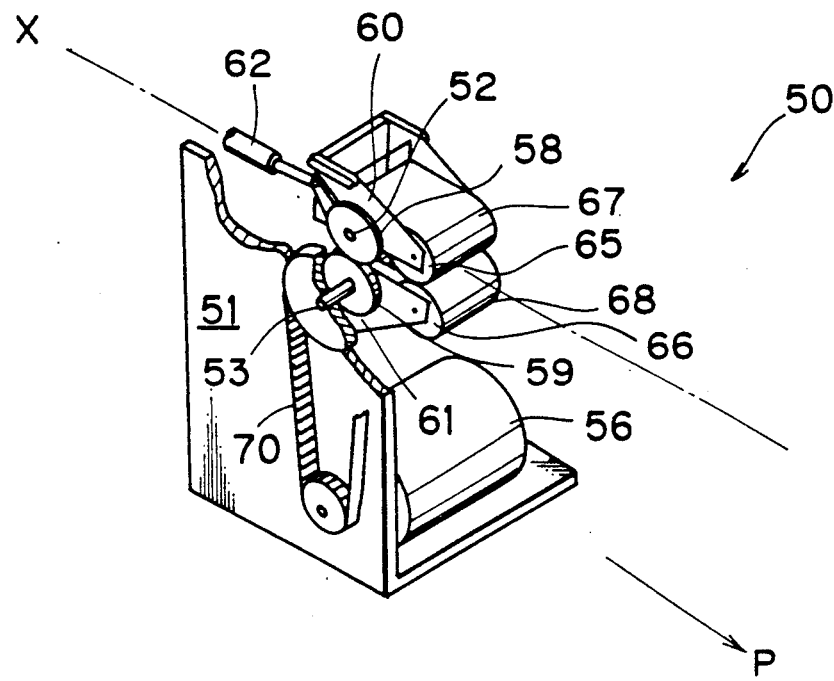
FIG. 4 is a perspective view showing a wire feeding means.

FIG. 4 is a perspective view showing the wire feeding means 50. As shown in FIGS. 1A, 2, 3B and 4, the wire feeding means 50 has rotary shafts 52, 53 rotatably supported by and through the body 51 and is adapted to transmit rotary power generated by a motor 56 being a component of driving means to the rotary shafts 52, 53 through a power transmission mechanism 70 at an identical rotating speed. Switchgears 58, 59 which are engaged with each other are rotatably supported by the rotary shafts 52, 53, respectively.

Roller supporting plates 60, 61 are attached to the switchgears 58, 59, respectively. The roller supporting plate 60 is pivoted on a piston portion of a switching cylinder 62. The roller supporting plate 60 can pivot about the rotary shaft 52 by moving the piston portion of the switching cylinder 62 forward and backward. Rotation of the roller supporting plate 60 is transmitted to the roller supporting plate 61 through the switchgears 58, 59, so that the roller supporting plate 61 can pivot about the rotary shaft 53. In this way, the roller supporting plates 60, 61 open and close.

Length measuring means 63, 64 (FIG. 2) are attached to the rotary shafts 52, 53, respectively. Feeding rollers 65, 66 are rotatably supported by the head portions of the roller supporting plates 60, 61, respectively. Feeding belts 67, 68 connect the length measuring rollers 63, 64 and the feeding rollers 65, 66, respectively. When the covered wires 600a, 600b are fed, the switching cylinder 62 is actuated to move the roller supporting plates 60, 61 to the closed position. The feeding belts 67, 68 are circulated by the motor 56 through the rotary shafts 52, 53 and the length measuring rollers 63, 64 while the covered wires 600a, 600b are nipped with the feeding rollers 65, 66, so that the covered wires 600a, 600b are fed in the direction shown with the arrow P.

On the other hand, when the covered wires 600a, 600b are not fed, the feeding rollers 65, 66 are moved to the open position through the switching cylinder 62, to thereby release the covered wires 600a, 600b.

A-2. wire Cutting Means

Figure 5:
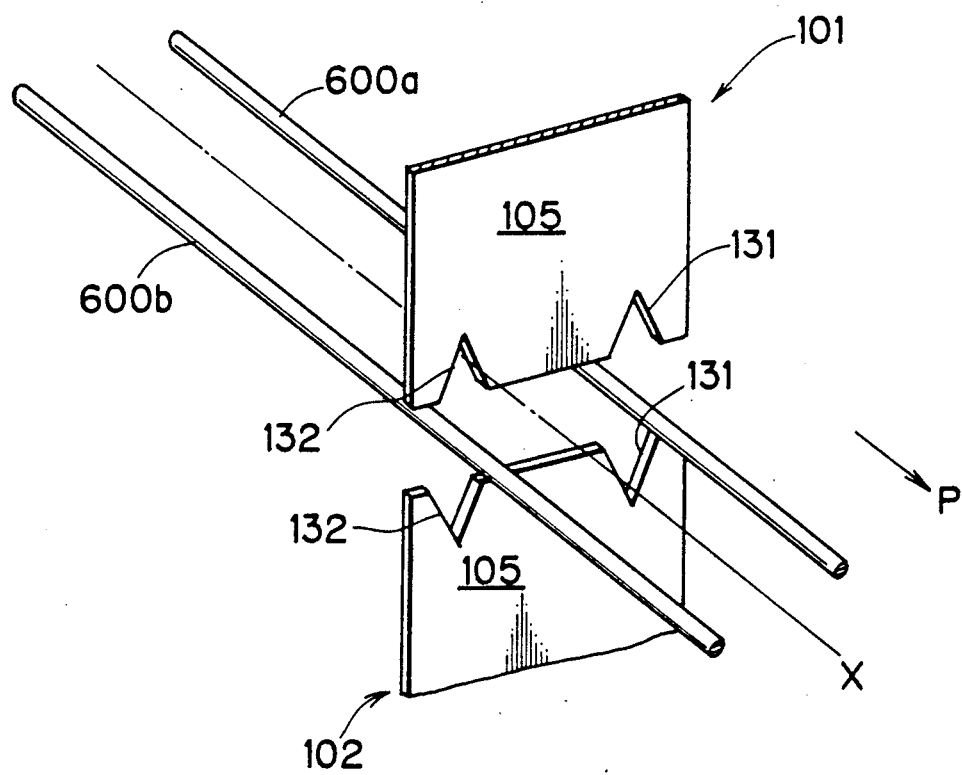
FIG. 5 is a partial perspective view showing a wire cutting means.

FIG. 5 is a perspective view of a main portion of the wire cutting means 100. As shown in FIGS. 1A, 2, 3B and 5, the wire cutting means 100 comprises a pair of cutter bodies 101, 102 for nipping the covered wires 600a, 600b, a motor 103 (FIG. 2) which is a component of the driving means, a parallel link 104 mechanism for coverting a rotational drive of the motor 103 to a vertical movement of the cutter bodies 101, 102. The cutter bodies 101, 102 have cutters 105 opposite to each other and vertical rails 107. Rail racks 110 by which the rails 107 are slidably supported are attached to a frame 109, so that the cutter bodies 101, 102 can vertically slide.

As shown in FIG. 2, a pulley 113 is rotatably supported by the frame 109. The rotation of the motor 103 is transmitted to the pulley 113 through a belt 112. One ends of first and second links 114, 115 are attached to the pulley 113 to cooperate with the rotational movement of the pulley 113. One end of a third link 116 is rotatably connected to the other end of the first link 114. The other end of the third link 116 is rotatably supported by the top end of the cutter body 101. A fourth link 117 disposed on the lower portion is rotatably supported by the frame 109 to rotate about a shaft 118. One end of a fifth link 119 is rotatably supported by the other end of the fourth link 117.

The other end of the fifth link 119 is rotatably supported by the bottom end of the cutter body 102. One end of a sixth link 120 is rotatably supported by the one end of the fourth link 117 to cooperate with the fourth link 117 and rotate about the shaft 118. The other end of the sixth link 120 and the other end of the second link 115 are connected by a seventh link 121.

When the pulley 113 is rotated in a counterclockwise direction by the motor 103, the first and second links 114, 115 are rotated in the counterclockwise direction, respectively. By virtue of this, the third link 116 is pushed down, to thereby go down the cutter body 101, whereas the seventh link 121 is simultaneously caused to rise. Following that, the sixth link 120 and the fourth link 117 is rotated in the counterclockwise direction. By virtue of this, the fifth link 115 is pushed up, to thereby go up the cutter body 102.

Conversely, when the pulley 113 is rotated in a clockwise direction by the motor 109, the cutter body 101 rises whereas the cutter body 102 simultaneously goes down. Thus, the wire cutting means is adapted to open and close the cutter bodies 101, 102 in accordance with the rotation of the motor 103.

Further, as shown in FIG. 5, the cutters 105 are provided with cutting edges 131, 132. When the covered wires 600a, 600b are disposed as shown in FIG. 5 and then the cutters 105 are transferred from a full open position to closed position, cores of the covered wires 600a, 600b as well as converings thereof are cut off with the cutters 105. Additionally, when the cutters 105 are moved from the full open position to a somewhat open position, only the coverings of the covered wires 600a, 600b are cut into with the cutters 105.

A-3. First Holding and Moving Means 200

Figure 6:
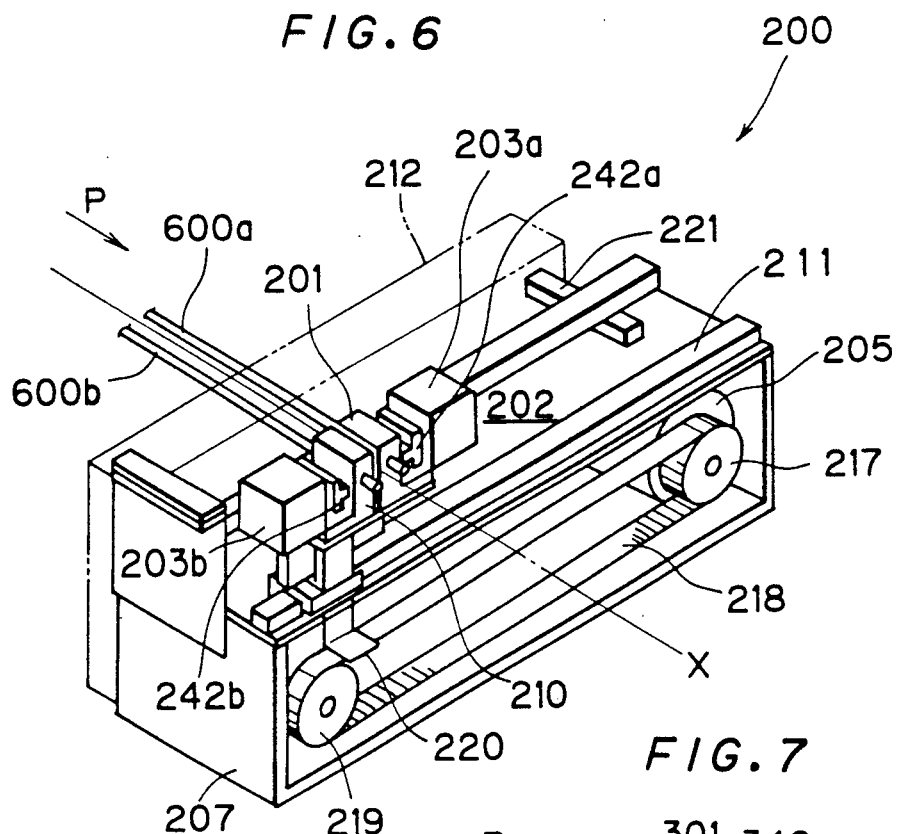
FIG. 6 is a perspective view showing a first holding and moving means.

FIG. 6 is a perspective view showing the first holding and moving means 200. As shown in FIGS. 1A, 2, 3A, 3B and 6, the first holding and moving means 200 comprises: a first holding means 201 capable of holding the covered wires 600a, 600b; a first moving means 202 by which the first holding means 201 is movably supported three-dimensionally; cylinders 203a, 203b which are driving means for holding the covered wires 600a, 600b; and motors 205, 206 (FIG. 2) which are driving means for moving the first holding means 201.

The first moving means 202 comprises: a base 207; a horizontal movement mechanism 208 (FIG. 2) mounted on the base 207; a forward and backward movement mechanism 209 (FIG. 2) mounted on the horizontal movement mechanism 208; and a vertical movement mechanism 210 attached to the forward and backward movement mechanism 209 and for supporting the first holding means 201. A rail 211 is placed on the base 207 in a lateral direction shown with arrows R, S. The horizontal movement mechanism 208 is slidably provided on the rail 211 in a longitudinal direction of the rail 211. A rail 213 (FIG. 2) is attached to the forward and backward movement mechanism 209 in a longitudinal direction shown with arrows P, Q. The rail 213 is slidably provided on a rail rack 214 of the horizontal movement mechanism 208. Thus, the forward and backward movement mechanism 209 is movably supported by the horizontal movement mechanism 208 in a longitudinal direction. A rail 215 is attached to the vertical movement mechanism 210 in a vertical direction shown with the arrows R, U. The rail 215 is slidably supported by a bearing 216 (FIG. 2) of the forward and backward movement mechanism 209.

Thus, the vertical movement mechanism 210 is movably supported by the forward and backward movement mechanism 209 in a vertical direction. The first holding means 201 can be moved three-dimensionally by moving the horizontal movement mechanism 208, the forward and backward movement mechanism 209 and the vertical movement mechanism 210 by an appropriate amount.

A pulley 217 is attached to a rotary shaft of the motor 205. A pulley 219 is rotatably supported by the base 207. A belt 218 connects these pulleys 217, 219. The belt 218 is connected to the horizontal movement mechanism 208 through a connection piece 220. When the belt 218 is circulated by the motor 205, the horizontal movement mechanism 208 is moved laterally.

A pair of rails 221 are longitudinally placed on lateral ends of a driving mechanism 212 having the motor 206. A forward and backward movement portion 223 is slidably provided on the pair of the rails 221 in a longitudinal direction of the rail 221 through rail racks 222 (FIG. 2). A guide groove 224 is formed on the forward and backward movement portion 223 in a lateral direction. A slide shaft 225 is slidably provided into the guide groove 224. An end of the forward and backward movement mechanism 209 is rotatably supported by the slide shaft 225. A rotation plate 227 is rotatably provided on a body of the driving mechanism 212 in synchronization with the rotation of a pulley 226 (FIG. 2) attached to a rotary shaft of the motor 206. A belt 228 (FIG. 2) connects the rotation plate 227 and the pulley 226. Each one end of link mechanisms 229 are attached to lateral ends of a rotation shaft 227a to which the rotation plate 227 is fixed. Each of the other end of the link mechanisms 229 is connected to the forward and backward movement portion 223. When the rotary shaft 227a is rotated in a counterclockwise direction (in FIG. 2) by the motor 206, the forward and backward movement portion 223 is pushed forward (in a direction of an arrow Q) through the link mechanisms 229. Following that, the forward and backward movement mechanism 209 is moved forward. When the rotary shaft 227a is reversely rotated, the forward and backward movement mechanism 209 is pulled backward.

A spring receiving piece 230 is placed to a front end of the forward and backward movement mechanism 209 and extents therefrom. A spring 231 is placed between the spring receiving piece 230 and the vertical movement mechanism 210, whereby the vertical movement mechanism 210 is pushed upward.

As shown in FIG. 3A, the first holding means 201 attached to the vertical movement mechanism 210 is provided with holding cylinders 240a, 240b through which the covered wires 600a, 600b can be inserted. A recessed portion is formed in bodies of the holding cylinders 240a, 240b. Corresponding to the recessed portions, nippers 242a, 242b are attached to respective piston portions of the cylinders 203a, 203b. When the nippers 242a, 242b are moved to the closed position by the cylinders 203a, 203b, the covered wires 600a, 600b inserted through the holding cylinders 240a, 240b are nipped by the nippers 242a, 242b and the inner surfaces of the holding cylinders 240a, 240b. When the nippers 242a, 242b are moved to the open position, the covered wires 600a, 600b are released.

A guide member 250 is attached to the first holding means 201 so that the covered wires 600a, 600b can be guided in the holding cylinders 240a, 240b. The guide member 250 comprises guiding cylinders 251a, 251b and guiding cylinders 252a, 252b attached to the guiding cylinders 251a and 251b through supporting members 253a, 253b, respectively. The upper and lower sides of the covered wires 600a, 600b are nipped by the wire feeding means 50 in an exposed region of the covered wire 600a between the guiding cylinders 251a, 252a and an exposed region of the covered wire 600b between the guiding cylinders 251b, 252b.

A-4. Second Holding and Moving Means 300

Figure 7:
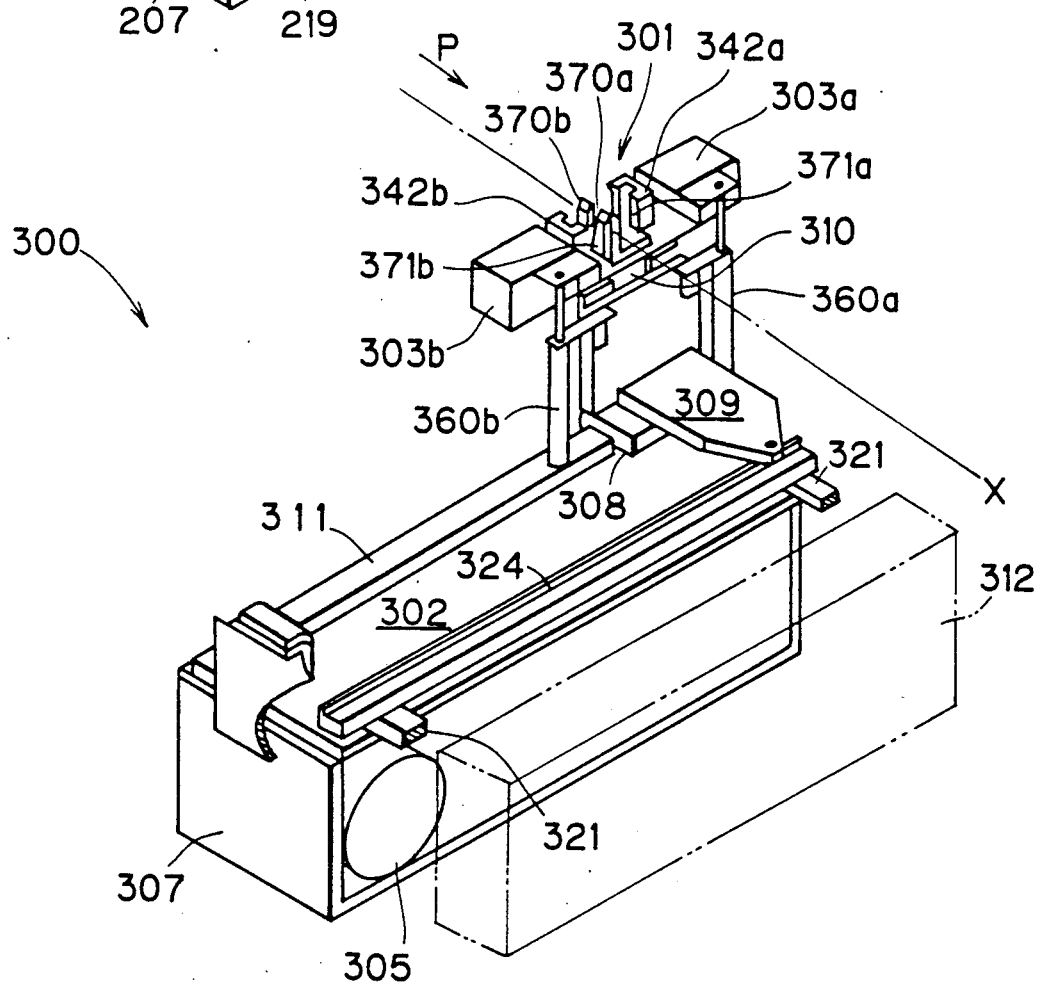
FIG. 7 is a perspective view showing a second holding and moving means.

FIG. 7 is a perspective view showing the second holding and moving means 300. As shown in FIGS. 1A, 2, 3A, 3B and 7, the second holding and moving means 300 comprises second holding means 301 and second moving means 302, similarly to the first holding and moving means 200. The second moving means 302 is, however, different from the first moving means 202 in that a vertical movement mechanism 308 of the second moving means 302 is vertically moved by cylinders 360a, 360b. Specifically, the cylinders 360a, 360b are attached to a forward and backward movement mechanism 309, respective piston postions of the cylinders 360a, 360b is connected to a vertical movement mechanism 310, and the vertical movement mechanism 310 is vertically moved by the movement of the cylinders 360a, 360b.

In the second holding means 301, protrudent pieces 370a, 370b are formed for holding, a holding groove 371a open in the upside is formed with the protrudent piece 370a and the nipper 342a, and further a holding groove 371b open in the upside is formed with the protrudent piece 370b and the nipper 342b, so as to accommodate the covered wires 600a, 600b. Thus, the covered wires 600a, 600b are accommodated in the holding grooves 371a, 371b. In this situation, the nippers 342a, 342b are moved to the closed position through the cylinders 303a, 303b to nip the covered wires 600a, 600b, or the nippers 342a, 342b are moved to the open position to release the covered wires 600a, 600b. Further, the covered wires 600a, 600b can be accommodated in the holding grooves 371a, 371b from the upside openings by the second holding means 301 moved upward by the cylinders 360a, 360b with the nippers 342a, 342b being in the open position. Other components not described herein are similar in the first holding and moving means 200. Therefore, corresponding parts are indicated with like reference numerals and explanation about them is omitted.

A-5. Cutting Process and Stripping Processes

A cutting process and first and second stripping processes according to the present invention will be briefly described with reference to FIGS. 1A, 2, 3A and 3B. The cutting process includes steps of feeding the covered wires 600a, 600b by a predetermined amount by the wire feeding means 50, holding the covered wires 600a, 600b with the first and second holding means 201, 301, cutting off cores as well as coverings of the covered wires 600a, 600b with cutters 105 in a nipping manner, whereby the covered wires are divided into remaining wires and cut-off wires. The first stripping process includes steps of cutting into the coverings of the remaining wires with the cutters 105 after moving the remaining wires held by the first holding means 201 in a wire feeding direction P, and stripping the downstream covering of the remaining wires by moving the remaining wires backward with the cutters 105 cutting into the covering thereof. The second stripping process is a treatment of stripping the upstream coverings of the cut-off wires, similarly to the first stripping treatment.

A-6. First and Second Terminal Attaching Means 400, 500

Figure 8:
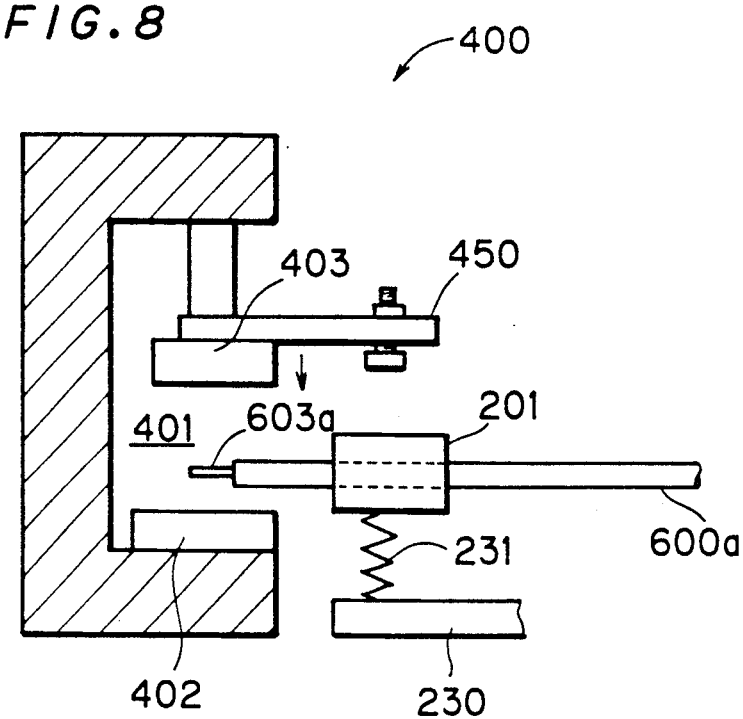
FIG. 8 is a schematic sectional view showing a first terminal attaching means.

FIG. 8 is a schematic sectional view showing the first terminal attaching means 400. As shown in FIGS. 1A, 3A, 3B and 8, a first terminal attaching portion 401 of the first terminal attaching means 400 comprises a press plate 402 and a die 403 movable vertically to cooperate with the press plate 402. As for the remaining wires performed to the first stripping process, the remaining wires 601a, 601b are moved by the first holding and moving means 200 so that stripped ends 603a, 603b of the remaining wires 601a, 601b are placed above the press plate 402. Then, the die 403 is moved downward through driving means not shown to attach terminals to the stripped ends 603a, 603b.

Further, a press position adjusting member 450 is attached to the die 403 so to move in synchronization with a vertical movement thereof (FIG. 8). When the die 403 is moved downward to attach terminals to the stripped ends 603a, 603b, the bottom end of the press position adjusting member 450 comes in contact with the top of the first holding means 201. As the die 403 is further moved down, the first holding means 201 is pushed down against the spring 231, whereby a high of the stripped ends 603a, 603b can be adjusted in attaching terminals thereto.

On the other hand, the second terminal attaching means 500 has almost the same structure as the first terminal attaching means 400. Therefore, corresponding parts are indicated with like reference numerals and the explanation thereof is omitted.

A-7. Discharging Means 550

Figure 9:
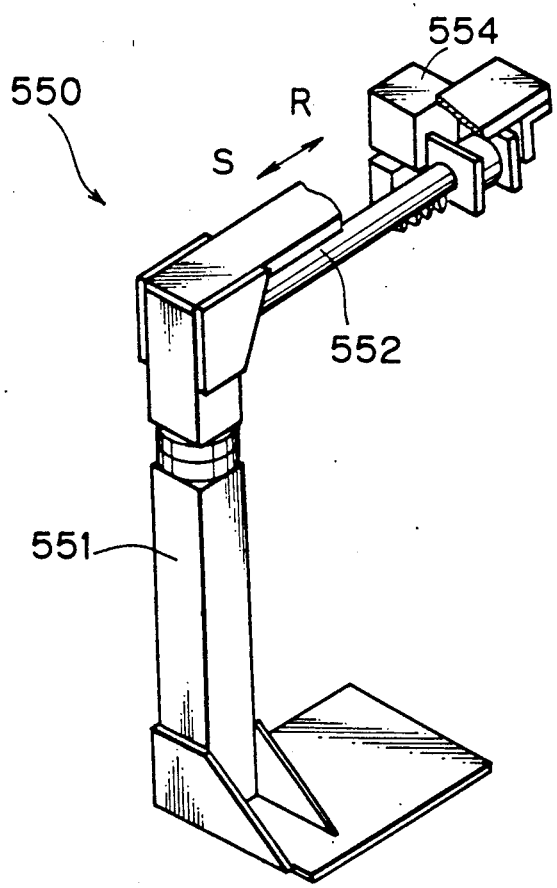
FIG. 9 is a perspective view showing a discharging means.

FIG. 9 is a perspective view showing the discharging means 550. As shown in FIGS. 1A, 2, 3B and 9, the discharging means 550 comprises a post 551, a cylindrical rail 552 disposed on the top of the post 551 in a direction shown with arrows R, S, and a clamp 554 which is slidably supported by the rail 552 in a longitudinal direction of the rail 552 and capable of holding simultaneously two cut-off wires. The cut-off wires (harnesses) having terminals attached by the second terminal attaching means 500 are held by the clamp 554 of the discharging means 550. The clamp 554 is moved up above a wire discharging portion not shown, and thereafter the cut-off wires (harnesses) are released from the clamp 554, to thereby fall down to the wire discharging portion.

A-8. First Control Means C1

As shown in FIG. 1B, the first control means C1 comprises: an operation element 900 which is a input means for inputting various commands and information; a memory 910 for storing programs for performing the treatment for producing harness, initial data or the like; a CPU 920 for performing a prescribed process (described below) based upon data stored in the memory 910 and data inputted from the outside of the apparatus through the operation element 900; and a driving element 930 for driving, based upon commands from the CPU 920, the motor 56 and the switching cylinder 62 of the wire feeding means 50, the motor 103 of the wire cutting means 100, the cylinders 203a, 203b and the motors 205, 206 of the first holding and moving means 200, the cylinders 303a, 303b, the motors 305, 306 and the cylinders 360a, 360b of the second holding and moving means 300, the driving means (not shown) of the first and second terminal attaching means 400, 500, and the driving means (not shown) of the discharging means 550. The operation element 900, the memory 910, the CPU 920 and the driving element 930 are interconnected by a system bus 940. Commands and information inputted through the operation element 900 are, for example, commands such as operation start command and various information such as a cut-off length of covered wires, a stripped length of coverings, types of attached terminals and the number of a process. Input data is stored in the memory 910.

A-9. Peripheral Equipment

As shown in FIG. 1A, a wire drawing device 800 is disposed between a reel 700 on which the covered wires 600a, 600b are wound and the wire feeding means 50, so that the covered wires 600a, 600b are passed through the wire drawing device 800. The wire drawing device 800 straighten a bending tendency of the covered wires 600a, 600b to feed them to the wire feeding means 50.

B. Operation

Figure 10A:
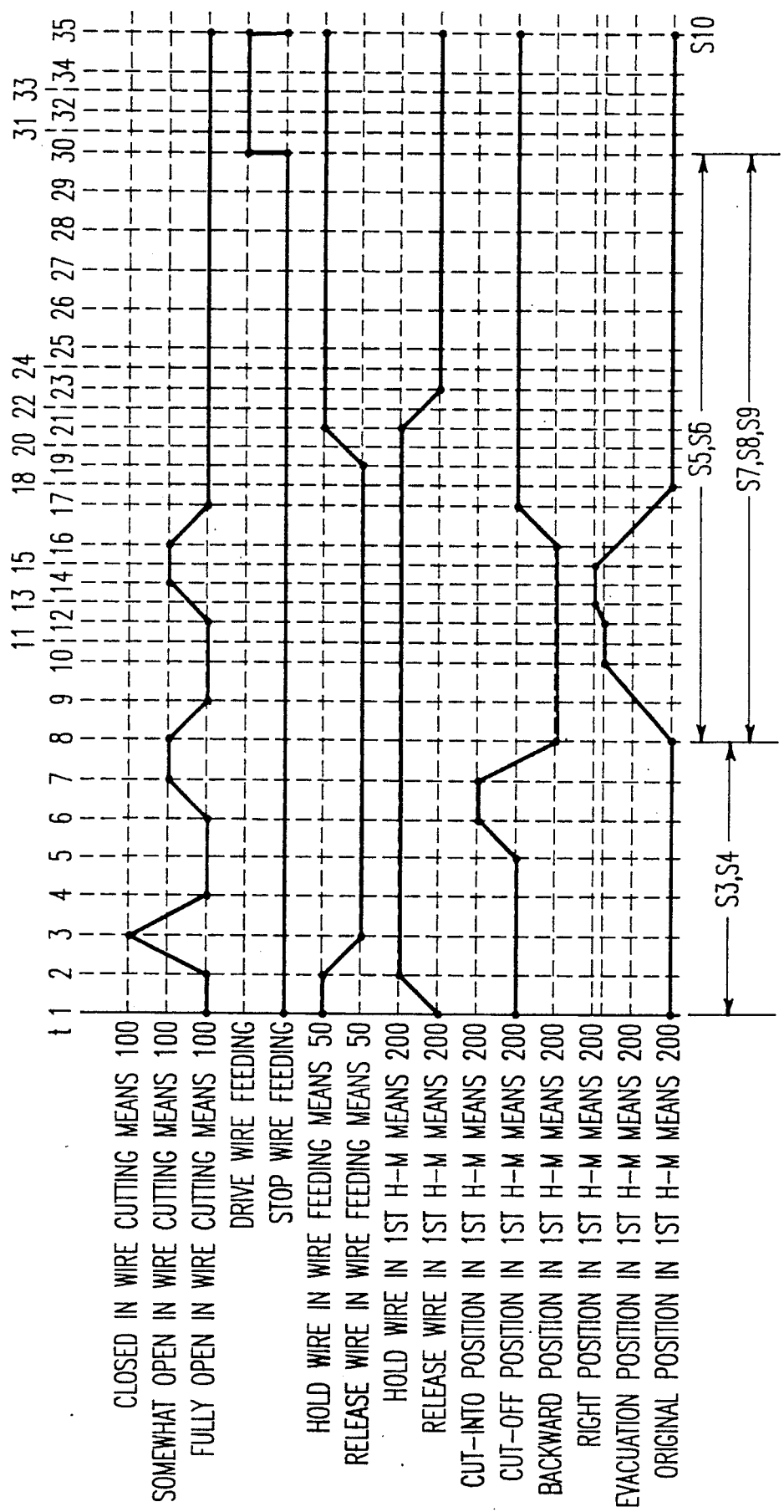
FIGS. 10A and 10B are timing charts showing an operation of the first embodiment.
Figure 10B:
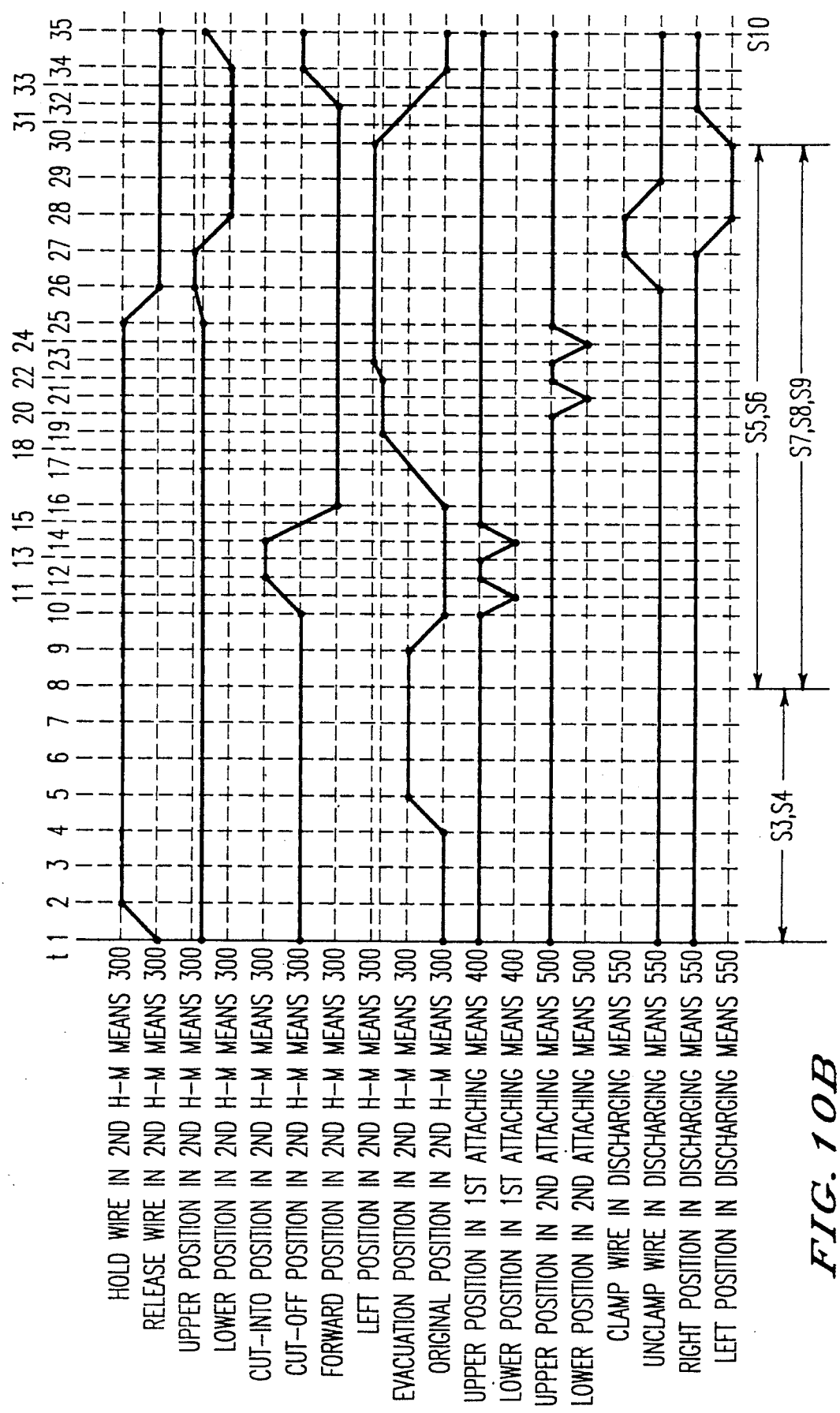
Figure 11A:
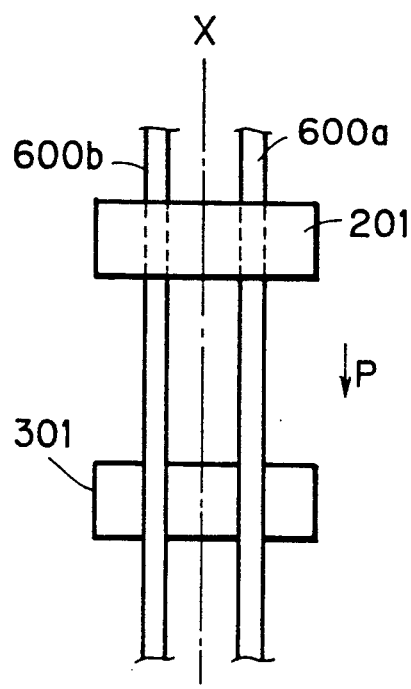
FIGS. 11A to 11H are explanatory views showing an operation of the first embodiment, respectively.
Figure 11B:
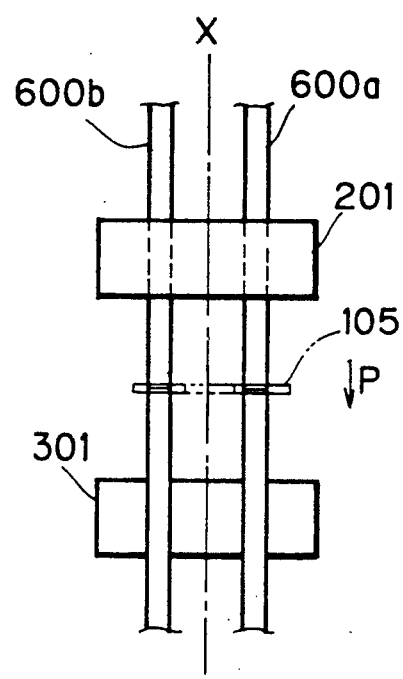

FIG. 10 is a timing chart illustrating operations of the harness producing apparatus according to the present invention; FIGS. 11A to 11H are diagrams illustrating each operation, respectively; and FIG. 12 is a flowchart. Referring FIG. 10, "CLOSED IN WIRE CUTTING MEANS 100" stands for a state which the cutters 105 are closed to cut off the covered wires 600a, 600b, "SOMEWHAT OPEN IN WIRE CUTTING MEANS 100" stands for a state which the cutters 105 are somewhat open to cut into only the coverings 607a, 607b of the covered wires 600a, 600b, and "FULLY OPEN IN WIRE CUTTING MEANS 100" stands for a state which the cutters 105 are fully open.

"DRIVE WIRE FEEDING" stands for a state which the feeding rollers 65, 66 rotate, and "STOP WIRE FEEDING" stands for a state which the feeding rollers 65, 66 stop. "HOLD WIRE IN WIRE FEED- ING MEANS 50" stands for a state which the feeding rollers 65, 66 are closed to nip the covered wires 600a, 600b, and "RELEASE WIRE IN WIRE FEEDING MEANS 50" stands for a state which the feeding rollers 65, 66 are open to release the covered wires 600a, 600b.

"HOLD WIRE IN 1st H-M MEANS 200" stands for a state which the nippers 242a, 242b of first holding and moving means 200 are closed to hold the covered wires 600a, 600b, respectively, and "RELEASE WIRE IN 1st H-M MEANS 200" stands for a state which the nippers 242a, 242b thereof are open.

"CUT-INTO POSITION IN 1st H-M MEANS 200" stands for a position of the first holding means 201 in which the stripping process is performed, "CUT-OFF POSITION IN 1st H-M MEANS 200" stands for a position thereof in which the cutting process is performed, and "BACKWARD POSITION IN 1st H-M MEANS 200" stands for a position thereof to which the first holding means 201 is moved somewhat backward from the cutting position to strip the covering.

"RIGHT POSITION IN 1st H-M MEANS 200" stands for a position thereof to which the remaining wires 601a, 601b held by the first holding means 201 are moved so that terminals can be attached, "EVACUATION POSITION IN 1st H-M MEANS 200" stands for a position off the feeding axis X somewhat to the left, and "ORIGINAL POSITION IN 1st H-M MEANS 200" stands for a position corresponding to the feeding axis X.

"UPPER POSITION IN 2nd H-M MEANS 300" stands for a position in which the second holding means 301 is at the same hight as the cutting position, and "LOWER POSITION IN 2nd H-M MEANS 300" stands for a position lower than that. "HOLD WIRE IN 2nd H-M MEANS 300", "RELEASE WIRE IN 2nd H-M MEANS 300", "CUT-INTO POSITION IN 2nd H-M MEANS 300", "CUT-OFF POSITION IN 2nd H-M MEANS 300", "FORWARD POSITION IN 2nd H-M MEANS 300", "LEFT POSITION IN 2nd H-M MEANS 300", "EVACUATION POSITION IN 2nd H-M MEANS 300" and "ORIGINAL POSITION IN 2nd H-M MEANS 300" stand for positions and states similar to the aforementioned "HOLD WIRE IN 1st H-M MEANS 200" et al.

"UPPER POSITION IN 1st ATTACHING MEANS 400" and "UPPER POSITION IN 2nd ATTACHING MEANS 500" stand for positions to which the die 403, 503 are moved downward to attach the terminals to the stripped end portions of the remaining wires 601a, 601b and the cut-off wires 602a, 602b, respectively. "LOWER POSITION IN 1st ATTACHING MEANS 400" and "LOWER POSITION IN 2nd ATTACHING MEANS 500" stand for positions to which the die 403, 503 are moved upward after attaching the terminals, respectively.

"CLAMP WIRE IN DISCHARGING MEANS 550" stands for a state of the discharging means 550 in which the clamp 554 fastens to hold the cut-off wires 602a, 602b, and "UNCLAMP WIRE IN DISCHARGING MEANS 550" stands for a state thereof in which the clamp 554 loosens. "RIGHT POSITION IN DISCHARGING MEANS 550" stands for a position to which the clamp 554 is moved to the right to receive the cut-off wires 602a, 602b held by the second holding means 301, and "LEFT POSITION IN DISCHARGING MEANS 550" stands for a position to which the clamp 554 is moved to the left to discharge the cut-off wires 602a, 602b.

When the harness producing apparatus A receives an operation start command by an operator through the operation element 900, the first and second holding means 201, 301 are moved to the respective cutting positions, the nippers 242a, 242b, 342a, 342b are moved to the open position, and the covered wires 600a, 600b are fed while nipped by the wire feeding means 50 (Step S1). Then, as shown in FIG. 11A, the feeding rollers 65, 66 are stopped at time t1 to stop feeding the covered wires 600a, 600b (Step S2). An amount by which the covered wires 600a, 600b are fed by the wire feeding means 50 is determined based upon information about a length of a wire cut off from the covered wire, which is inputted through the operation element 900. Then, the nippers 242a, 242b, 342a, 342b of the first and second holding means 201, 301 are moved to the closed position at time t2 to hold the covered wires 600a, 600b, respectively. Further, as shown in FIG. 11B, the feeding rollers 65, 66 are moved to the open position at time t3 to cause the wire feeding means 50 to release the covered wires 600a, 600b while the cutters 105 are moved to the closed position to cut off the covered wires 600a, 600b (Cutting process; Step S3). Thus, the covered wire 600a, 600b are divided into remaining wires 601a, 601b and cut-off wires 602a, 602b, respectively.

Figure 11C:
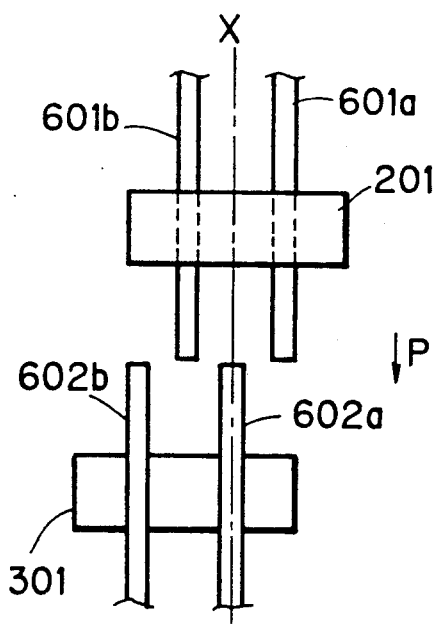
Figure 12:
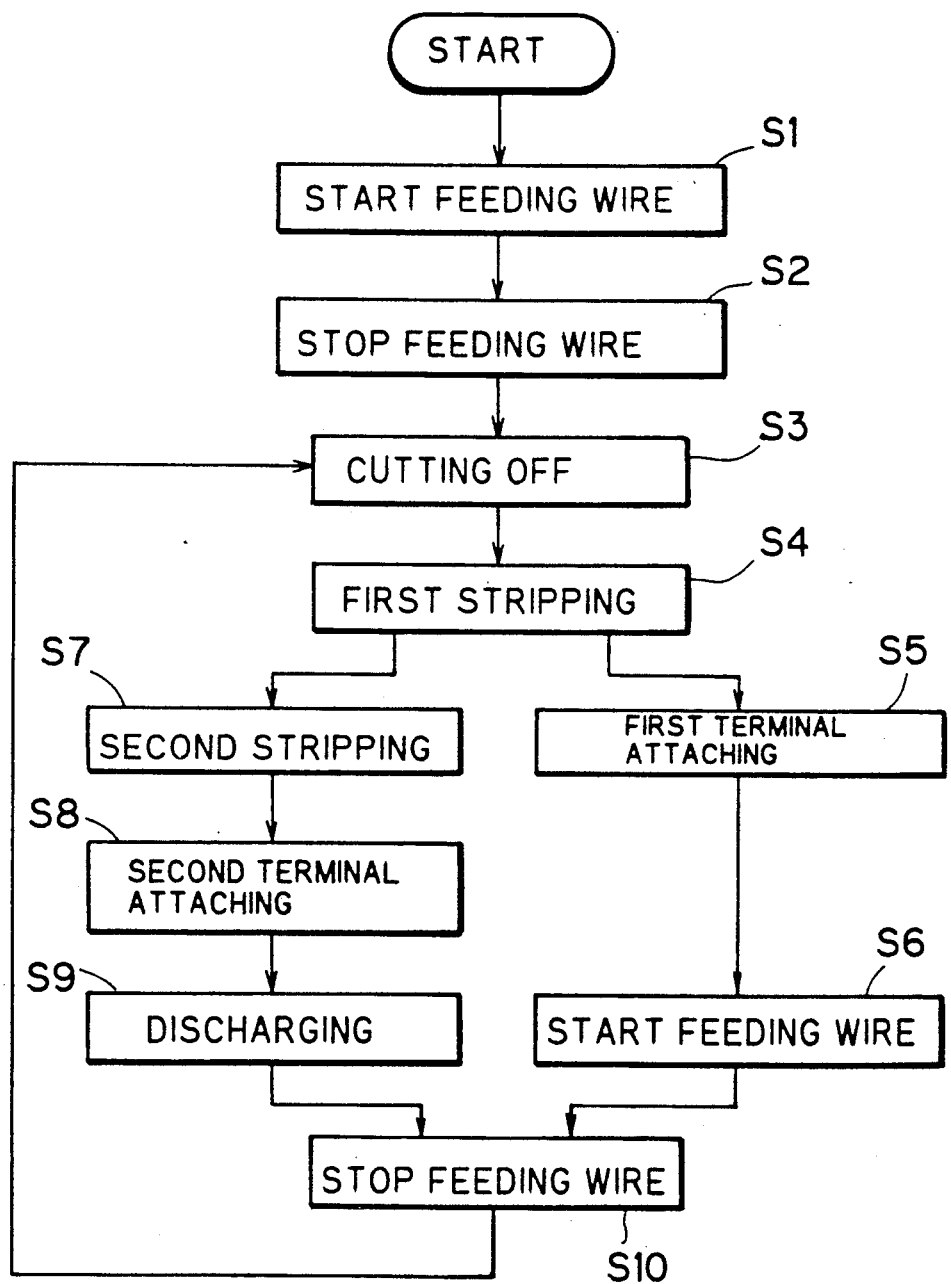
FIG. 12 is a flowchart showing the operation of the first embodiment.

As shown in FIG. 11C, the second holding means 301 is moved somewhat to the left at time t5 so as to prevent the remaining wires 601a, 601b and the cut-off wires 602a, 602b from interfering with each other when the remaining wires 601a, 601b are moved forward later.

Figure 11D:
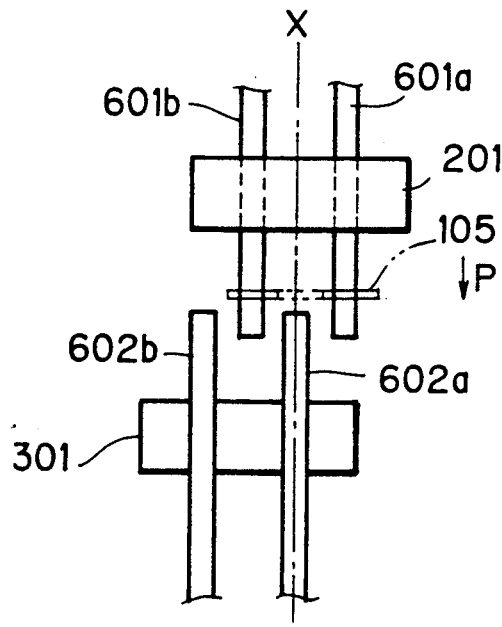
Figure 11E:
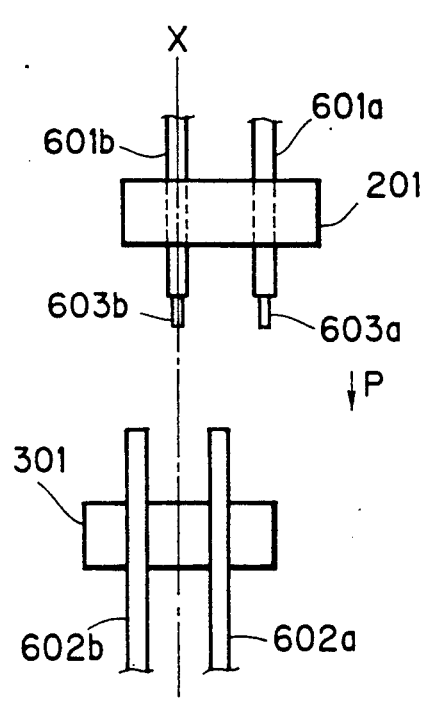

As shown in FIG. 11D, forward movement of the first holding means 201 (in a direction of the arrow P) causes the remaining wires 601a, 601b to be moved somewhat forward at time t6, and the cutters 105 are moved to the somewhat open position at time t7 to cut into a covering of the remaining wires 601a, 601b. An amount by which the remaining wires 601a, 601b are moved forward by the first holding means 201 is determined based upon information about a length of the stripped covering, which is inputted through the operation element 900 in advance. The first holding means 201 is moved backward at time t8 while the coverings of the downstream ends of the remaining wires 601a, 601b are cut into with the cutters 105, whereby the coverings thereof are stripped out as shown in FIG. 11E (First Stripping Process; Step S4) and the stripped ends 603a, 603b are formed. In this first stripping process, the length of the coverings from the cutting position in which wires are cut into with the cutters 105 to the first holding means 201, are shortened because the remaining wires 601a, 601b are held by the first holding means 201 in the vicinity of the cutting position. Consequently, elongation of the coverings are reduced when the remaining wires 601a, 601b are moved backward, length of the core in the stripped portions becomes uniform and accuracy of stripping can be improved.

Then, Steps S5 to S9 are performed. The first terminal attaching process is carried out at Step S5, and wire feeding is started at Step S6 while the second stripping process is carried out at Step S7, the second terminal attaching process is carried out at Step S8, and discharging process is carried out at Step S9.

Figure 11F:
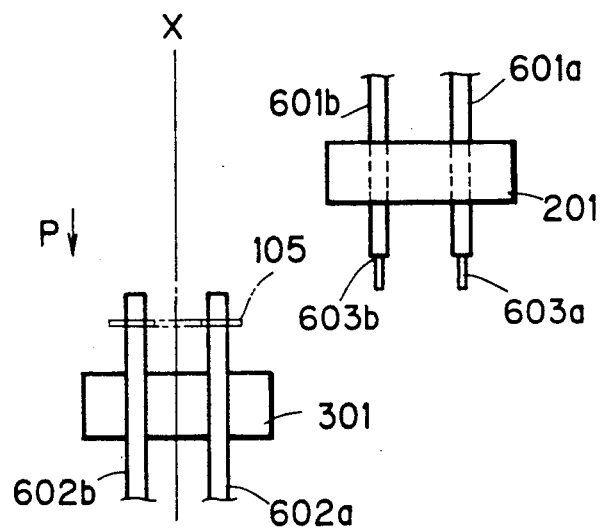

As shown in FIG. 11F, the first holding means 201 is moved from the feeding axis to the right for attaching terminals in time t8 to t10, a terminal 604a is attached to a stripped end 603a of the remaining wire 601a by the first terminal attaching means 400 at time t11, and the first terminal attaching process is completed by attaching terminal to a stripped end 603b of the remaining wire 601b at time t14. It should be noted that the first holding means 201 is moved a little to the right from time t12 to t13 in order to carry out terminal attaching processes in turn for two remaining wires 601a, 601b. In this case, when attached terminals are of different type, stripped coverings have different in length from each other. Accordingly, a position in which the remaining wire 601b is held by the first holding means 201 must be adjusted on attaching terminals by moving the first holding means 201 forward and backward in accordance with the kind of attached terminal.

Also, in the case that a wiring spacing of two remaining wires 601a, 601b is changed, an amount of the lateral movement of the remaining wire 601a, 601b by the first holding means 201 must be adjusted on attaching terminals. In this embodiment, an amount of the forward (P direction), backward (Q direction) and lateral (R, S directions) movement of the first holding means 201 related to the first terminal attaching means 400 is adjusted based upon information such as a kind of a attached terminal, which is inputted through the operation element 900 in advance.

As for Steps S7 to S9, the second holding means 301 is moved back to the original position at time t10, and the cut-off wires 602a, 602b are moved backward by a amount corresponding to the length of stripped coverings. The amount of the backward movement is also determined based upon information about the length of stripped coverings, which is inputted through the operation element 900 in advance. Then, the coverings of the cut-off wires 602a, 602b are cut into with the cutters 105 at time t14, and the cut-off wires 602a, 602b are moved forward at time t16 with the coverings being cut into with the cutters 105 so as to strip the coverings in the upstream ends of the cut-off wires 602a, 602b. Thus, the second stripping process is performed. The cut-off wires 602a, 602b are held in the vicinity of the cutting position by the second holding means 301, similarly to the first stripping process, so that elongation of the coverings is reduced and accuracy of stripping is obtained.

Figure 11G:
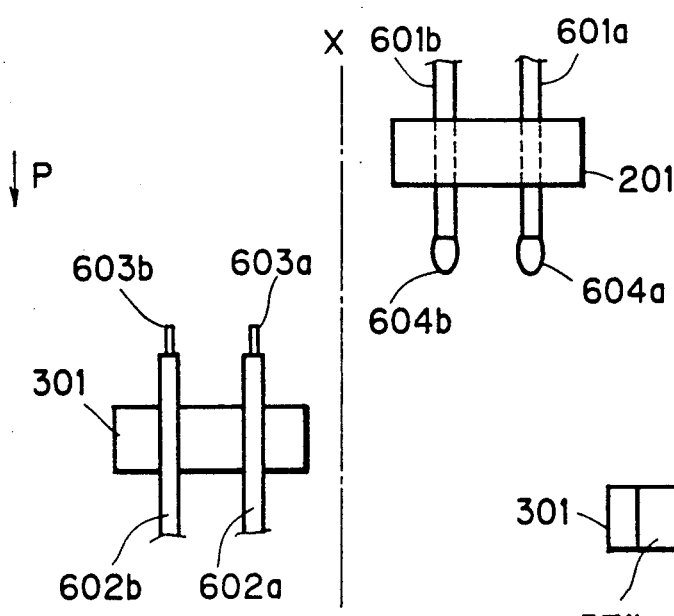

Referring to FIG. 11G, the second holding means 301 is moved from the original position to the left position for attaching terminals in time t16 to t19, and terminals are attached to the stripped ends 603a, 603b of the cut-off wires 602a, 602b by the second terminal attaching means 500 in time t20 to t25. Thus, the second terminal attaching process is performed. In this case, the amount of the forward (P direction), backward (Q direction) and lateral (R, S directions) movement of the second holding means 301 relative to the second terminal attaching means 500 is adjusted based upon information such as the kind of the terminals attached, which is inputted through the operation element 900 in advance. Further, in time t26 to t27, the second holding means 301 is moved up so that the clamp 554 of the discharging means 550 can hold the cut-off wires 602a, 602b (harnesses) whereas the second holding means 301 release the cut-off wires 602a, 602b, and thereafter the clamp 554 holds the cut-off wires 602a, 602b. Then, at time t28, the second holding means 301 is moved down and the clamp 554 of the discharging means 550 is moved to the left position for discharging. At time t29, the clamp 554 release the cut-off wires 602a, 602b (harnesses) to discharge them to a wire discharging portion (Discharging process; Step S9).

Figure 11H:
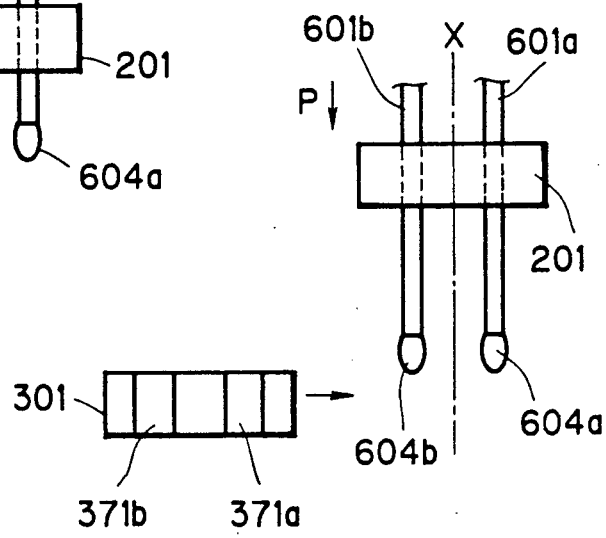

As shown in FIG. 11H, the first holding means 201 is moved back to the original position after the first terminal attaching process is performed in time t15 to t18. After the covered wires 600a, 600b (the remaining wires 601a, 601b) are nipped by the feeding rollers 65, 66 of the wire feeding means, the first holding means 201 release the remaining wires 601a, 601b in time t19 to t23. Then, the feeding rollers 65, 66 rotates to feed the wires at time t30. The second holding means 301 which has been moved down at time t28 is moved to the position below the cutting position in time t30 to t34 while kept down not to interfere with the covered wires 600a, 600b. Thereafter, the second holding means 301 is moved up in time t34 to t35, so that the covered wires 600a, 600b are accommodated in the holding grooves 371a, 371b of the second holding means 301 from the upside openings. Then, feeding of the covered wires 600a, 600b is stopped at time t35 (Step S10), and then return to Step S3.

These steps are repeated, whereby harnesses are produced successively.

C. Effects of the First Embodiment

In the harness producing apparatus A of the first embodiment according to the first embodiment, the length of stripped portions of covered wires or the position corresponding to terminals are easily changed because the first and second holding means 201, 301 are movably provided three-dimensionally and the movement is controlled by the first control means. In other words, modification of the length of the stripped portions and terminal be attached to the stripped portions can be performed with high accuracy only by applying new information on the length of the stripped portions and on the kinds of the attached terminals or the like to the harness producing apparatus A through the operation element 900.

Further, in performing the first and second stripping processes, the remaining wires 601a, 601b and the cut-off wires 602a, 602b are held in the vicinity of the cutting position by the first and second holding means 201, 301, so that the length of coverings from the cutting position to the first and second holding means 201, 301 is shortened. Accordingly, variation in length of the stripped coverings due to elongation of the coverings is diminished, and stripping accuracy is improved.

D. Second Embodiment

A harness producing apparatus D of a second embodiment related to claim 3 will now be described. The harness producing apparatus D is different from the harness producing apparatus A of the first embodiment in two points described below.

Figure 13:
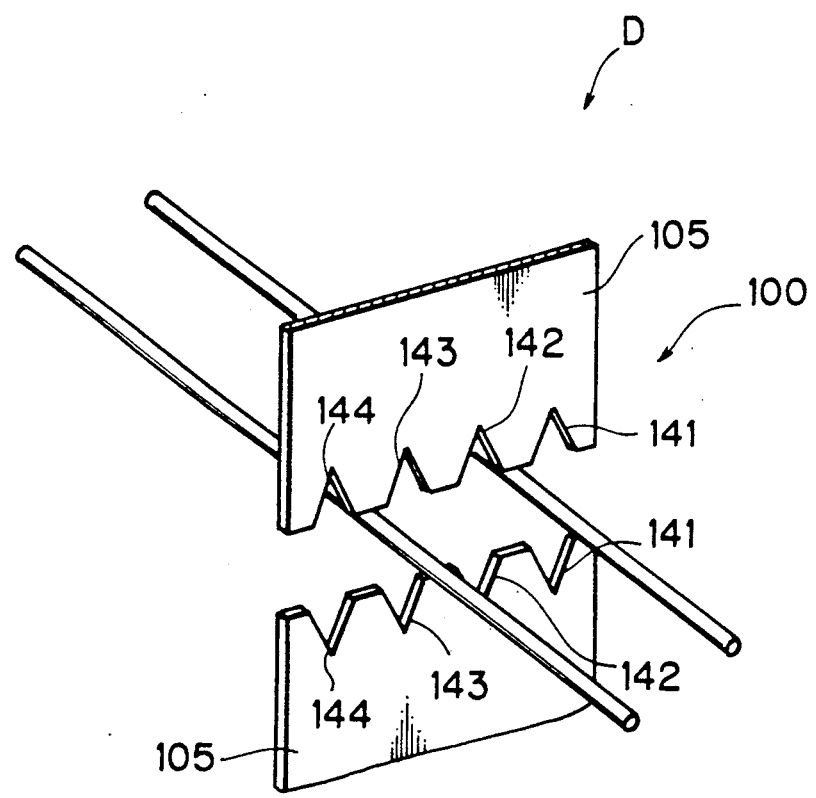
FIG. 13 is a partial perspective view showing a wire cutting means applied to the second embodiment of the present invention.
Figure 14A:
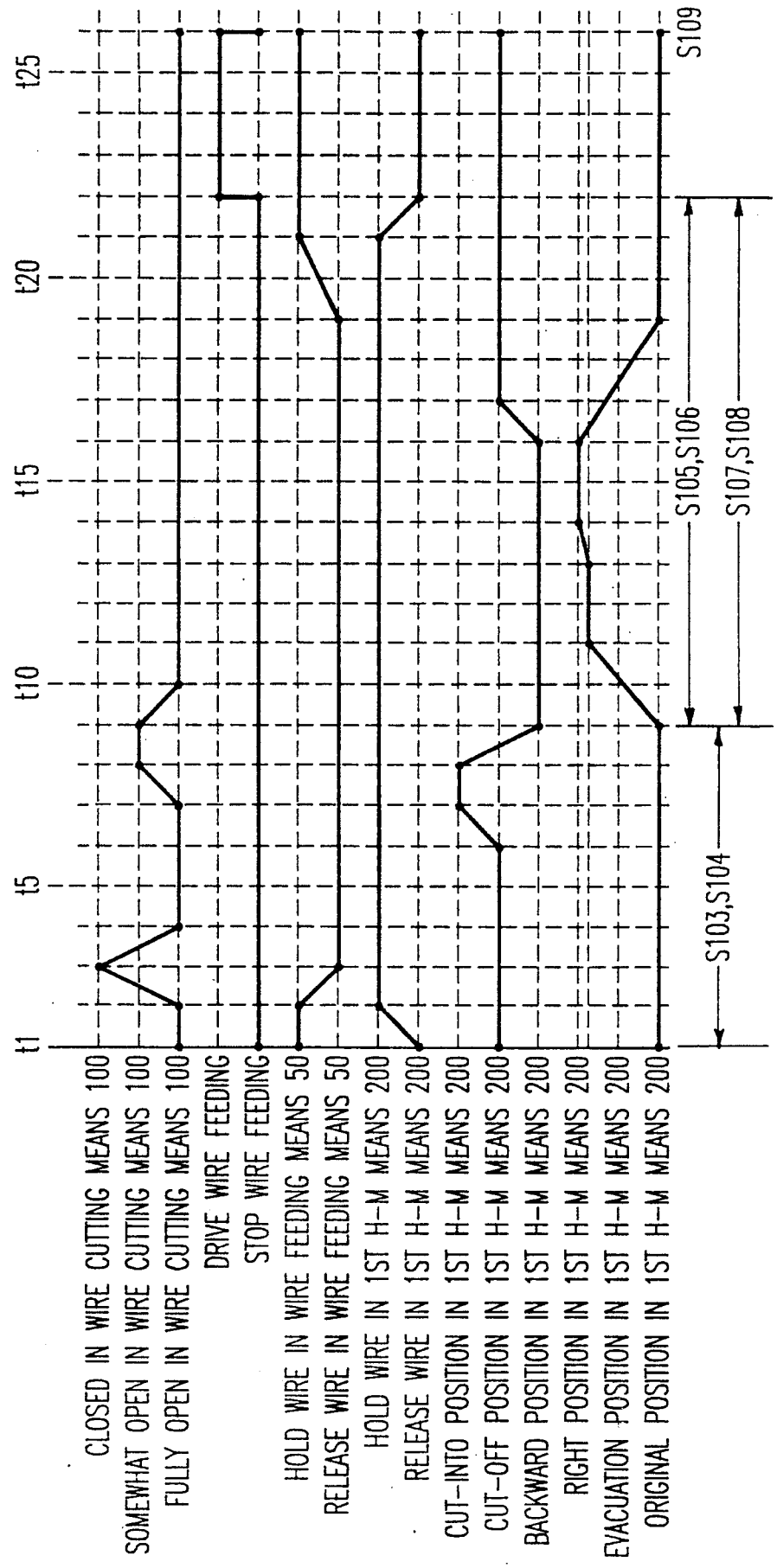
FIGS. 14A and 14B are timing charts showing an operation of the second embodiment.
Figure 14B:
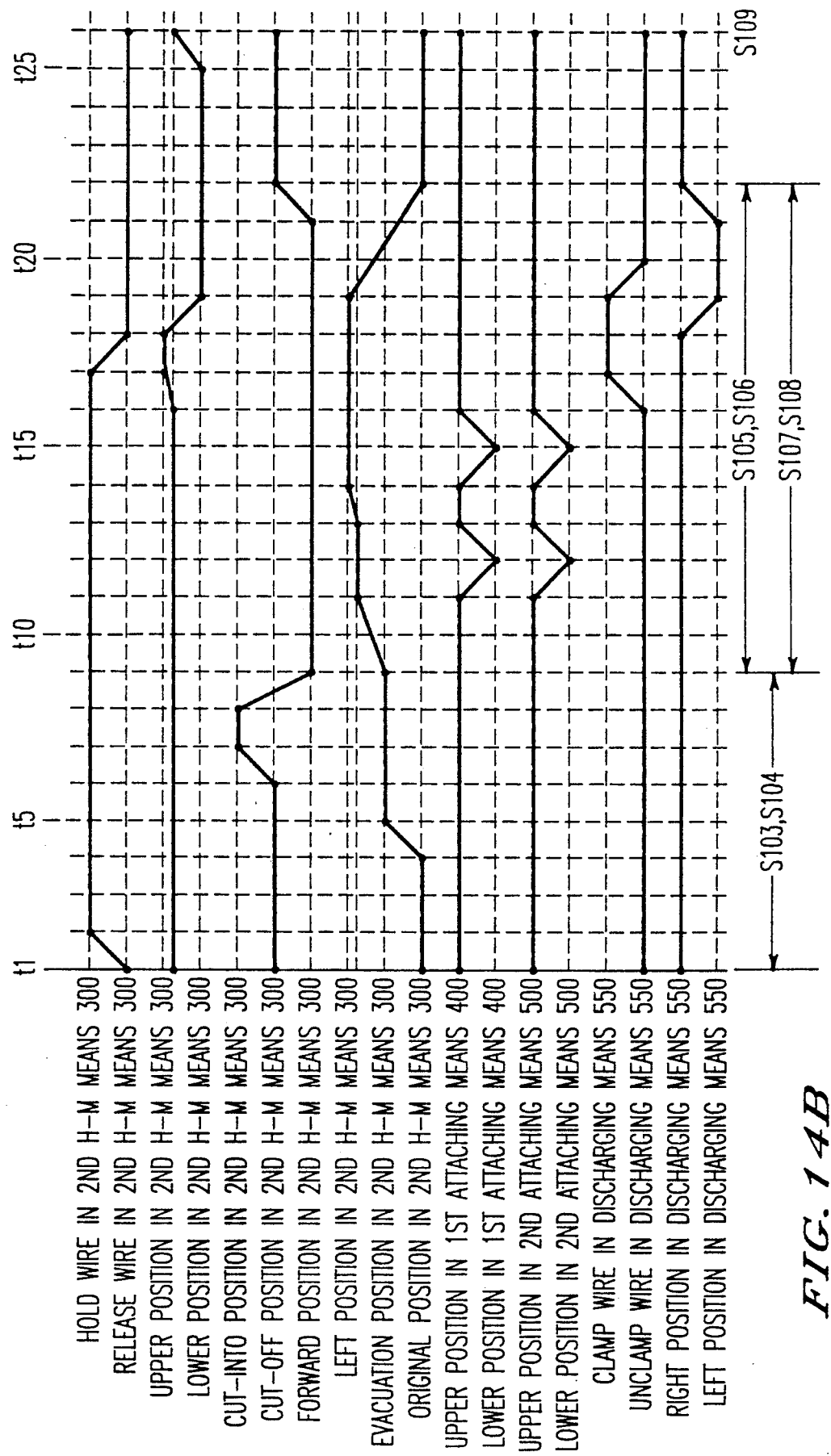

One is that four edges are formed in the respective cutters 105 of the wire cutting means 100, that is, first edges 141, second edges 142, third edges 143 and fourth edges 144 as shown in FIG. 13.

The other is that a second control means (not shown) is substituted for the first control means C1 of the harness producing apparatus A to operate the harness producing apparatus B as follows.

Figure 15A:
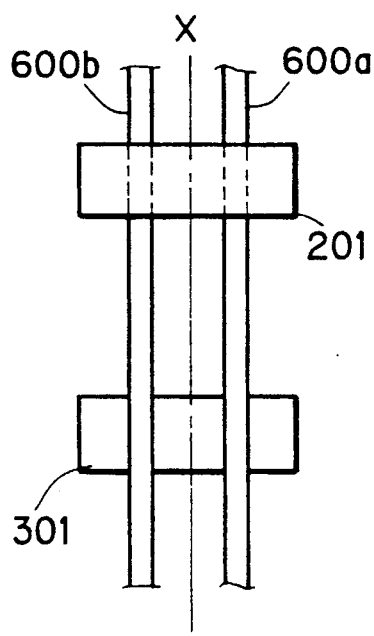
FIGS. 15A to 15F are explanatory views showing an operation of the second embodiment, respectively.
Figure 15B:
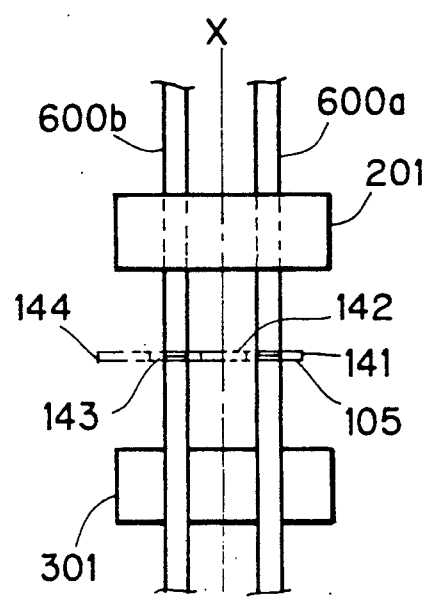

The covered wires 600a, 600b are fed at Step S101 as shown in FIG. 14, FIGS. 15A to 15F and FIG. 16. At time t1, the feeding is stopped (Step S101) as shown in FIG. 15A. A cutting process is carried out in Step S103 (time t2 to t3) as shown in FIG. 15B. In this case, the covered wire 600a is cut off with the first edges 141 of the cutters 105 while the covered wire 600b is cut off with the third edges 143.

Figure 15C:
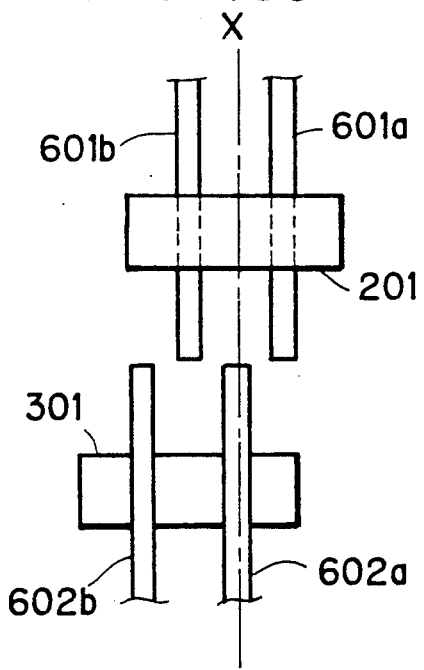
Figure 15D:
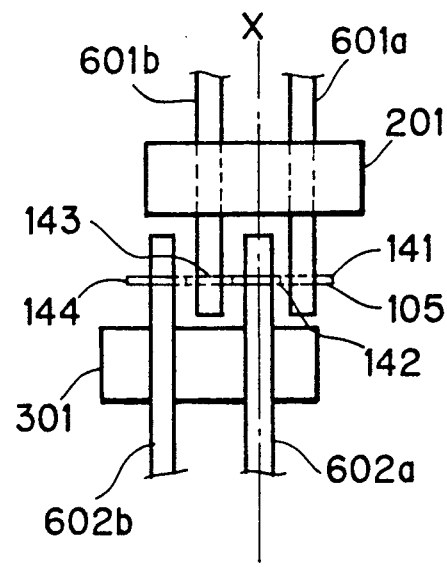
Figure 15E:
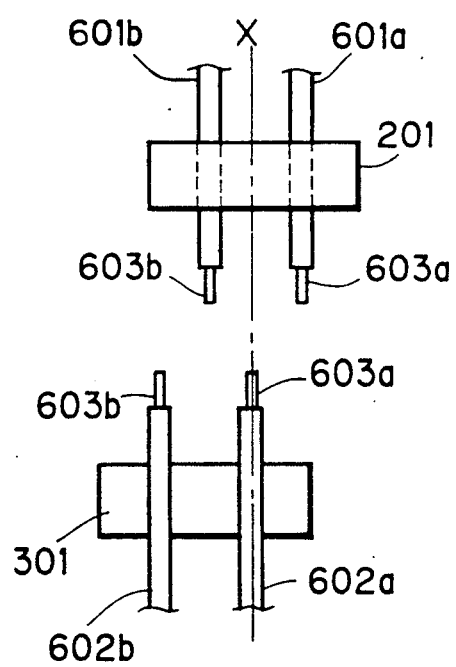

As shown in FIG. 15C, the second holding means 301 is moved to the left. At time t7, the first holding means 201 is moved forward while the second holding means 301 is moved backward. At time t8, coverings of the remaining wires 601a, 601b and the cut-off wires 602a, 602b are cut into with the cutters 105 as shown in FIG. 15D. In this case, the remaining wires 601a, 601b are cut into with the first edges 141 and the third edges 143, and the cut-off wires 602a, 602b are cut into with the second edges 142 and the fourth edges 144. At time t9, the remaining wires 601a, 601b are moved backward while the cut-off wires 602a, 602b are moved forward, with the coverings being cut into with the cutters 105. Thus, the first and second stripping processes are simultaneously carried out as shown in FIG. 15E (Step S104).

Then, Steps S105 to S108 are carried out. That is, the first terminal attaching process is performed at Step S105 and wire feeding is started at Step S106, while the second terminal attaching process is performed at Step S107 and a discharging process is performed at Step S108.

From time t11 to t16, the remaining wires 601a, 601b are moved to the right for attaching terminals, and thereafter terminals 604a, 604b are attached by the first terminal attaching means 400 (Step S105). On the other hand, the cut-off wires 602a, 602b are moved to the left for attaching terminals, and thereafter terminals are attached by the second terminal attaching means 500 (Step S107).

Figure 15F:
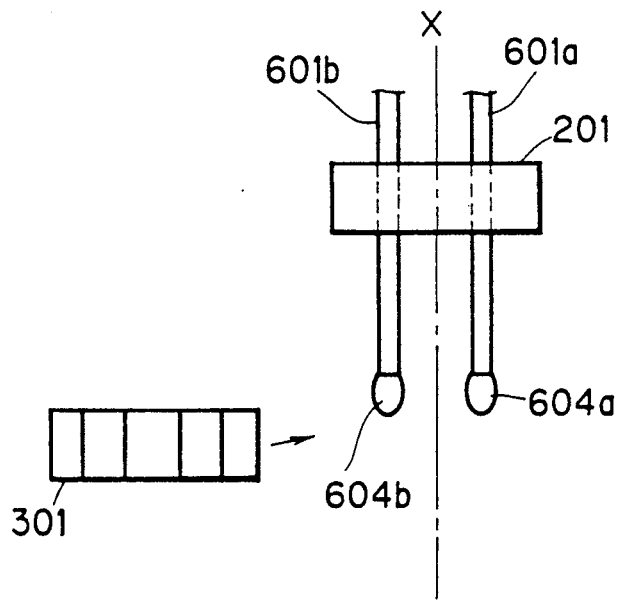
Figure 16:
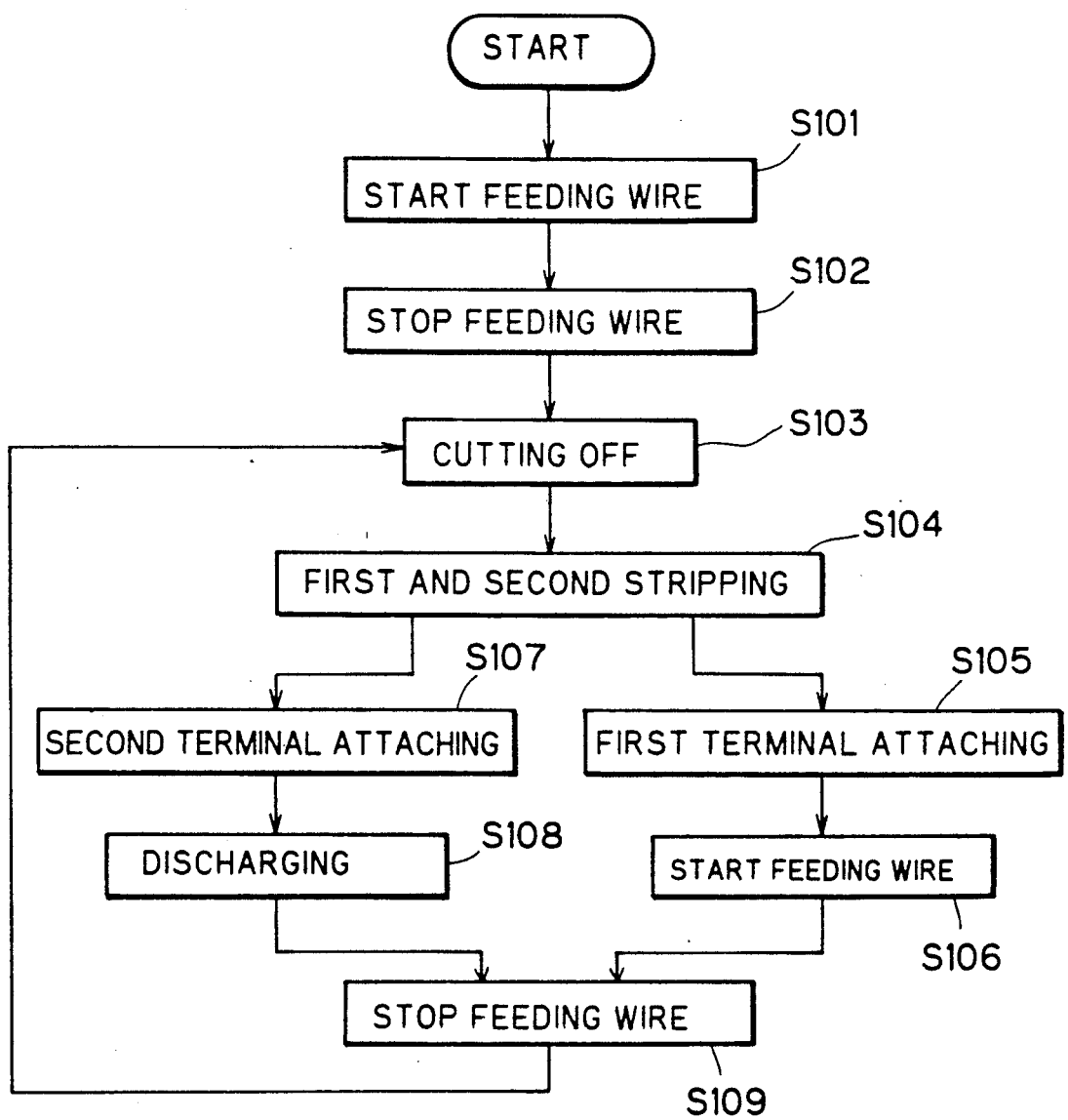
FIG. 16 is a flowchart showing an operation of the second embodiment.
Figure 17A:
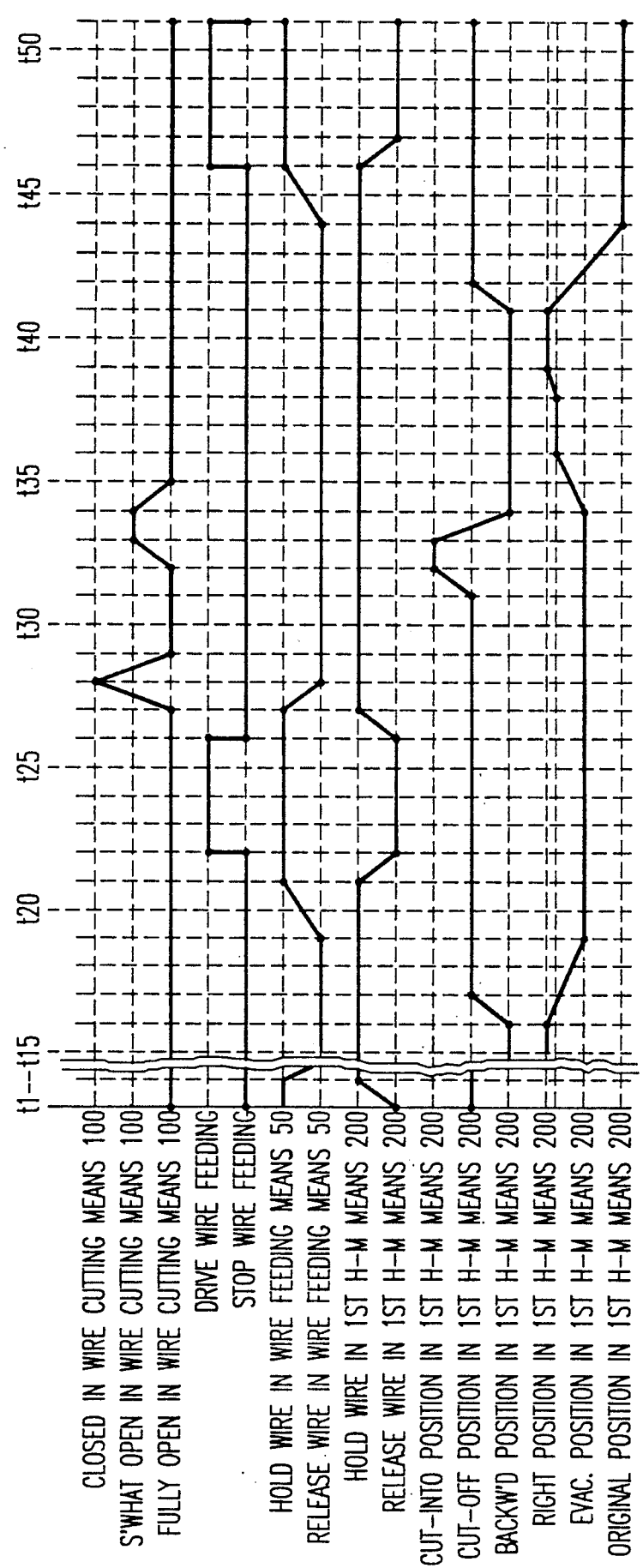
FIGS. 17A and 17B timing charts showing an operation of the third embodiment of the present invention.
Figure 17B:
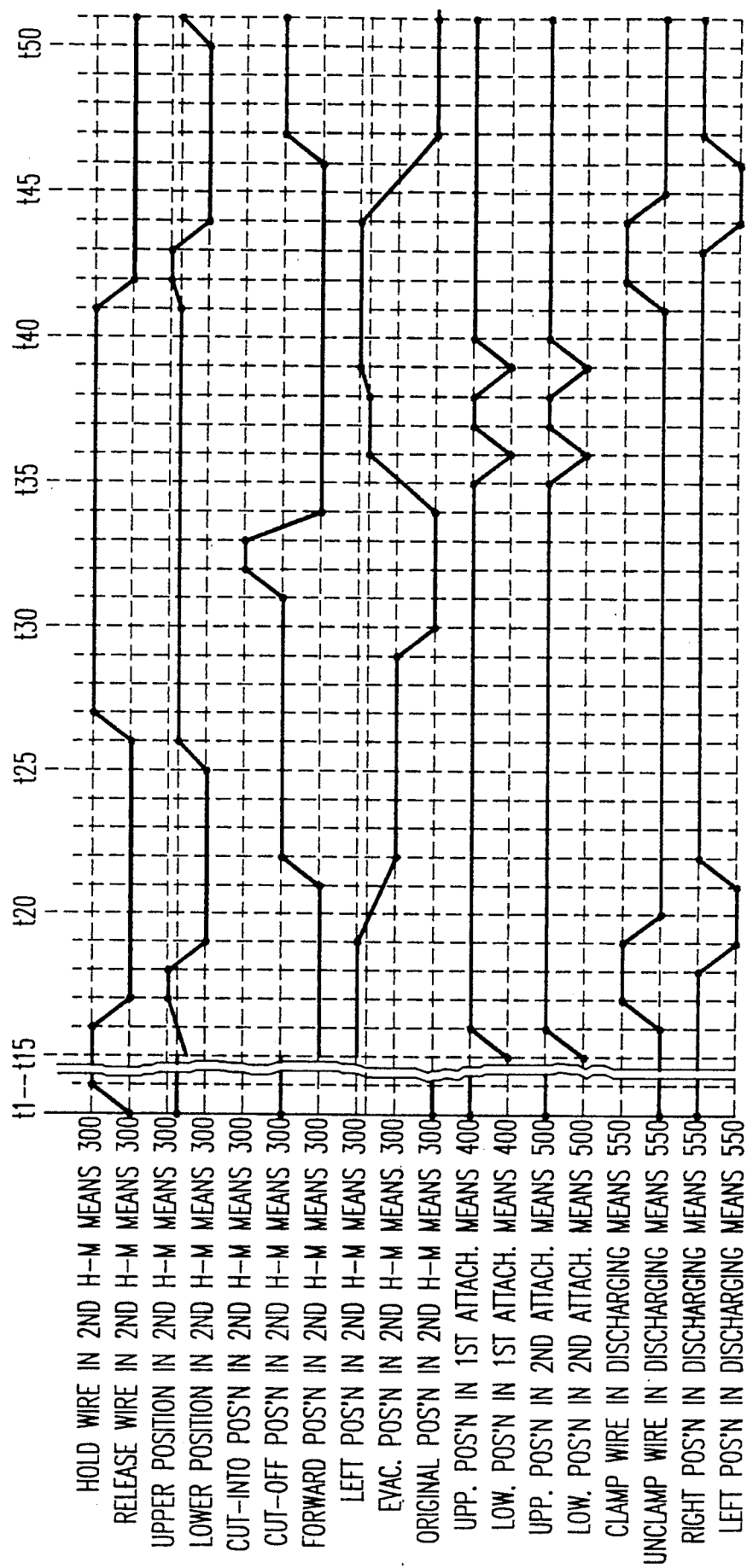

As shown in FIG. 15F, the first holding means 201 is moved back to the original position at time t19. At time t22, feeding of the covered wires 600a, 600b is started (Step S106). The covered wires 602a, 602b (harnesses) are discharged in time t17 to t22, and the second holding means 301 is moved back to the original position in time t19 to t25. Feeding of the wires are stopped at time t26 (Step S109).

Accordingly to the harness producing apparatus D, processing capability is increased while having the same effect as can be obtained using the harness producing apparatus A of the first embodiment because the first and second stripping processes can be simultaneously performed.

E. Third Embodiment

A harness producing apparatus E of a third embodiment related to claim 4 will now be described. The harness producing apparatus E is different from the harness producing apparatus D of the second embodiment in that it is provided with a third control means instead of the second control means to operate the harness producing apparatus E as described below.

As shown in FIG. 17 and FIGS. 18A to 18G, the same operation as in the harness producing apparatus D of the second embodiment is performed from the beginning of operation to time t16. A cutting process, first and second stripping processes, and first and second terminal attaching processes are performed from time t1 to time t16. Then, the first holding means 201 is moved to the evacuation position not to back to the original position at time t19 while wires are fed at time t22. On the other hand, the second holding means 301 delivers the cut-off wires 602a, 602b (harnesses) to the discharging means 550 at time t17. The second holding means 301 is then moved to the evacuation position to be opposite to the first holding means 201 from time t19 to t22. Feeding of wires is stopped at time t26.

Figure 18A:
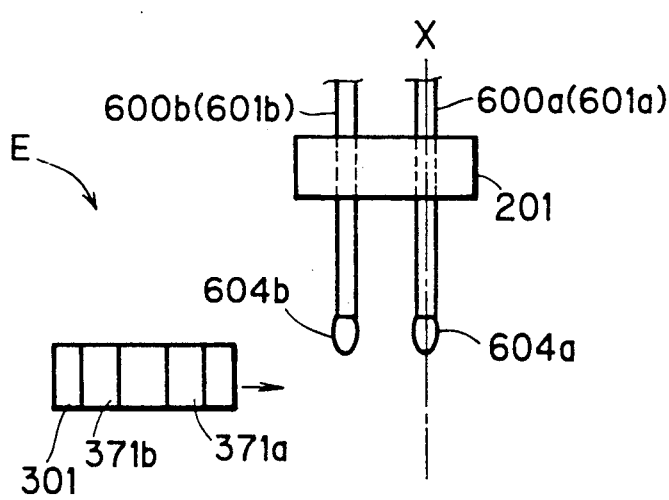
FIGS. 18A to 18G are explanatory views showing an operation of the third embodiment, respectively.
Figure 18B:
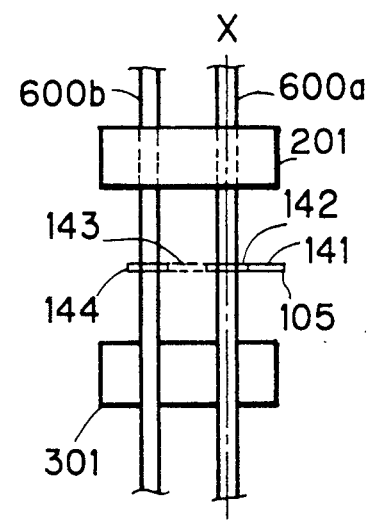
Figure 18C:
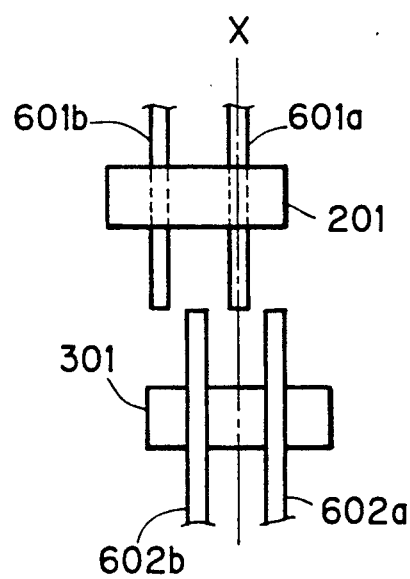
Figure 18D:
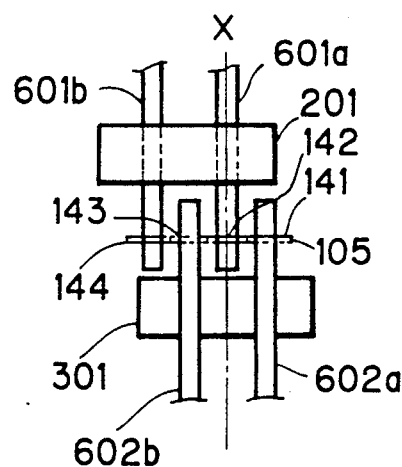
Figure 18E:
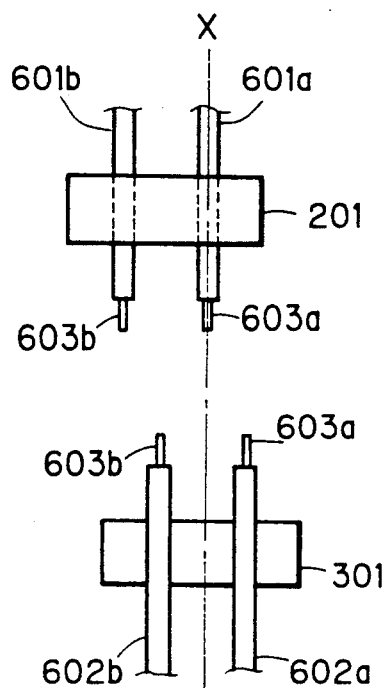

As shown in FIG. 18B, the second cutting process is performed from time t27 to t29. Unsimilarly to the first cutting process, the covered wire 600a is cut off with the second edges 142 while the covered wire 600b is cut off with the fourth edges 144. As shown in FIG. 18C, the second holding means 301 is moved to the original position at time t30. Then, as shown in FIGS. 18D and 18E, the first holding means 201 is move forward while the second holding means 301 is moved backward. Then, coverings of the covered wires are cut into with the cutters 105, and thereafter as shown in FIG. 18D, the first holding means 201 is moved backward with the coverings of the remaining wires 601a, 601b being cut into with the second and fourth edges 142, 144 while the second holding means 301 is moved forward with the coverings of the cut-off wires 602a, 602b being cut into with the first and third edges 141, 143. Thus, the first and second stripping processes are performed in time t32 to t34.

Figure 18F:
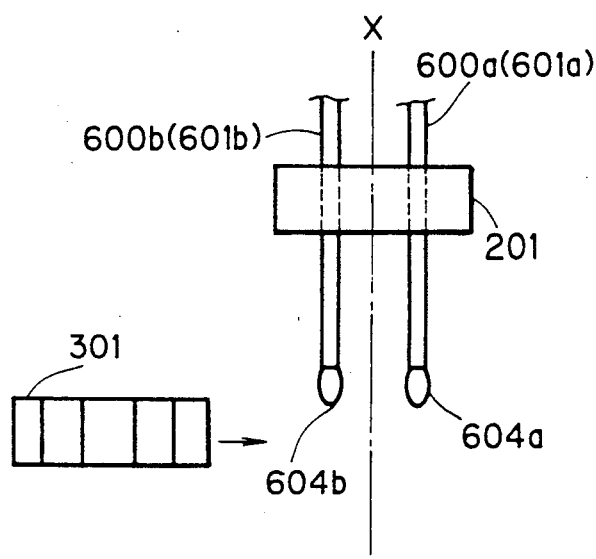
Figure 18G:
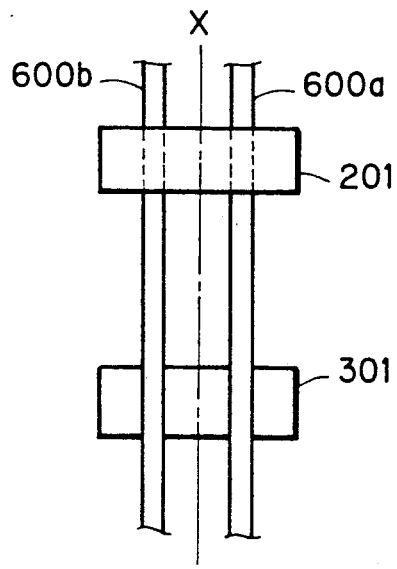

Further, the first terminal attaching of process for the remaining wires 601a, 601b are performed. From time t41 to t47, the first holding means 201 is moved back to the original position as shown in FIG. 18F, and then feeding of wires is started. On the other hand, the second terminal attaching treatment for the cut-off wires 602a, 602b are performed. From time t41 to 51, the second holding means 301 is moved back to the original position after the second process for discharging the cut-off wires 602a, 602b is completed, and feeding of wires is stopped as shown in FIG. 18G. Thereafter, the above mentioned operation is to be repeated.

As previously mentioned, in the harness producing apparatus E, the first and third edges 141, 143 and the second and fourth edges 142, 144 are alternately used in cutting off the covered wires 600a, 600b. Accordingly, the frequency of use of each edge of the cutters 105 is reduced to half, whereby the burden thereto caused by cutting the cores of the covered wires 600a, 600b is reduced to half and high durability can be obtained.

F. Fourth and Fifth Embodiments

A construction of the wire cutting means 100 is not limited to that shown in FIG. 2 as in the above embodiments, but it can be constructed as described below.

F-1. Fourth Embodiments

Figure 19:
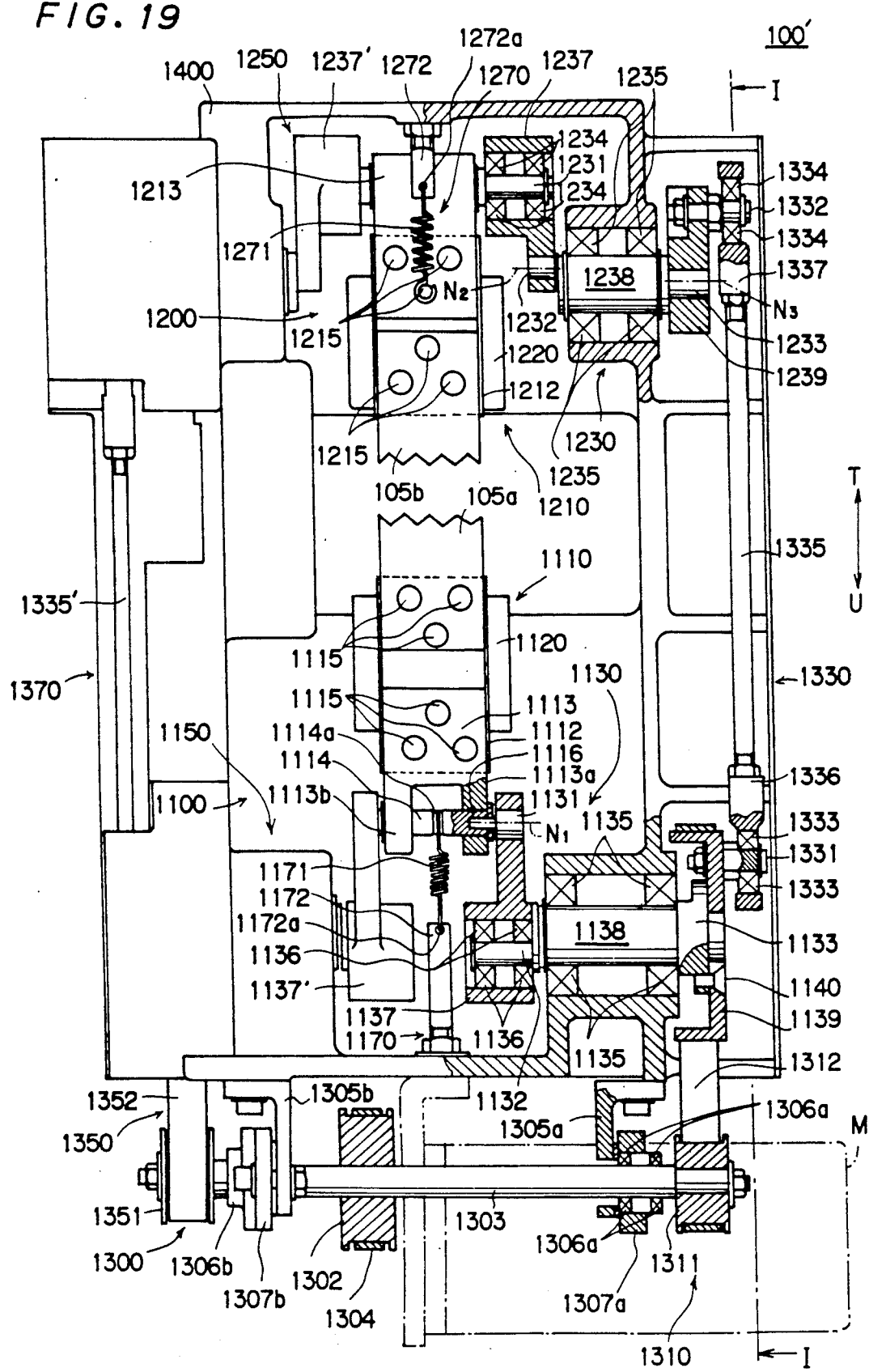
FIG. 19 is a plan view showing a wire cutting means applied to the fourth embodiment of the present invention.
Figure 20:
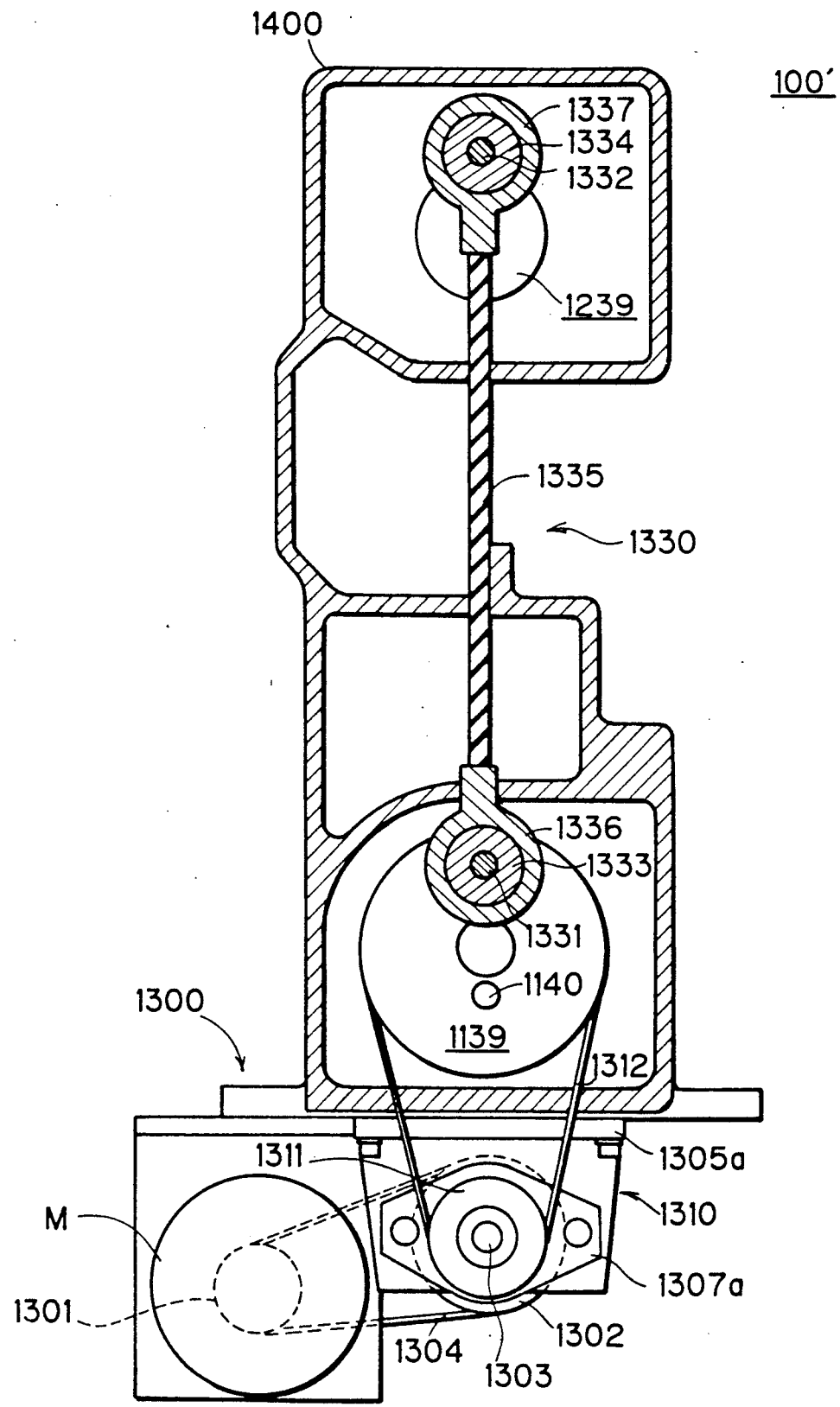
FIG. 20 is a sectional view along the line I—I of FIG. 19.

FIG. 19 is a perspective view showing another embodiment of the wire cutting means. FIG. 20 is a sectional view along the line I—I of FIG. 19.

For explanation, the right and left parts of FIG. 19 are herein referred to as "right" and "left", respectively, and the upper and lower parts thereof are referred to as "upper" and "lower", respectively.

As shown in FIGS. 19 and 20, a wire cutting means 100' according to the fourth embodiment comprises a pair of cutters 105a, 105b for nipping and cutting off covered wires or cutting into coverings of the covered wires, a driving system (referred to as "a lower driving mechanism" below) 1100 for driving the cutter 105a, a driving system (referred to as "an upper driving mechanism" below) 1200 for driving the cutter 105b, a servomotor M being a source of driving the cutters 105a, 105b, a drive transmission mechanism 1300 for transmitting the rotation of a driving shaft of the servomotor M to the upper and lower driving mechanisms 1200, 1100, and a body 1400.

(1) Lower Driving Mechanism 1100

The lower driving mechanism 1100 comprises: a lower cutter holding means 1110 for holding the cutter 105a; a guide bearing 1120 for moving the cutter 105a held by the cutter holding means 1110 in a direction shown with arrows T and U; a lower right driving means 1130 for driving the right side of the cutter 105a; a lower left driving means 1150 for driving the left side of the cutter 105a; and a lower looseness control means 1170 for preventing the cutter 105a from loosening.

The lower cutter holding means 1110 includes a guide rail 1112, a bracket 1113 and a pin 1114. The guide rail 1112 is movably provided in directions shown with the arrows T and U on the guide bearing 1120 fixed to the body 1400. The cutter 105a and the bracket 1113 are disposed at a certain space on the guide rail 1112 and fixed thereto with bolts 1115, respectively. An aperture 1116 is formed in a convex part 1113a of the bracket 1113, and an aperture not shown is also formed in a convex part 1113b. The pin 1114 is fixed through these apertures. When the pin 1114 is received force in the T-direction, the guide rail 1112, the bracket 1113 and the cutter 105a move altogether on the guide bearing 1120 in the T-direction. On the other hand, when the pin 1114 is received force in the U-direction, they move altogether on the guide bearing 1120 in the U-direction.

The lower right driving means 1130 includes a cam-follower 1131, an eccentric shaft 1132, shafts 1133, 1138, bearings 1135, 1136, a lever 1137 and a pulley 1139. The lever 1137 is connected to the pin 1114 rotatably about the axis $N_1$ through the cam-follower 1131. The shaft 1138 is rotatably supported by the body 1400 through the bearing 1135. The spindle-like eccentric shaft 1132 is eccentrically fixed to one end of the shaft 1138 with the axis of the shaft 1138. This eccentric shaft 1132 is rotatably connected to the lever 1137 through the bearing 1136 while the shaft 1133 is fixed to the other end of the shaft 1138. The shaft 1133 is fixed to the pulley 1139 with the bolt 1140. Therefore, when the pulley 1139 rotates in a predetermined direction, both the shafts 1133, 1138 together rotate in the same direction as the pulley 1139 while the eccentric shaft 1132 eccentrically rotates about the axis of the shaft 1138. This rotation is transmitted to the pin 1114 through the lever 1137 and the cam-follower 1131 as a linear movement in the T- or U- direction.

The lower left driving means 1150 is arranged opposite to the lower right driving means 1130 with regard to the lower looseness control means 1170 explained in detail below being therebetween. The lower left driving means has the same construction as that of the lower right driving means 1130. Accordingly, explanation about the construction of the lower left driving means 1150 is omitted while corresponding parts are designated with like reference numerals.

The lower looseness control means 1170 includes a spring 1171 and a spring force adjustment bolt 1172. One end of the spring 1171 is hooked in a groove 1114a formed almost in the center of the pin 1114 while the other end is hooked in an aperture 1172a formed in the top of the spring force adjustment bolt 1172. The spring force adjustment bolt 1172 of which lower end is fixed to the body 1400 is rotated in forward or reverse direction to expand and contract the spring 1171 so that spring force on the spring 1171 can be adjusted.

(2) Upper Driving Mechanism 1200

The upper driving mechanism 1200 comprises: an upper cutter holding means 1210 for holding the cutter 105b; a guide bearing 1220 for moving the cutter 105b held by the cutter holding means 1210 in the T- or U-direction; upper right driving means 1230 for driving the right side of the cutter 105b; upper left driving means 1250 for driving the left side of the cutter 105b; and upper looseness control means 1270 for preventing the cutter 105b from loosening.

The upper cutter holding means 1210 has the same construction as that of the lower cutter holding means 1110. Namely, the upper cutter holding means 1210 includes a guide rail 1212, a bracket 1213 and a pin (corresponding to the pin 1114). When a T-directional force is applied to the pin (not shown), the guide rail 1212, the bracket 1213 and the cutter 105b together move on the guide bearing 1220 in the T-direction. On the other hand, when a U-directional force is applied to the pin, the guide rail 1212, the bracket 1213 and the cutter 105b together move on the guide bearing 1220 in the U-direction.

The upper right driving means 1230 includes shafts 1231, 1233, 1238, an eccentric cam-follower 1232, bearings 1234, 1235 and levers 1237, 1239. The shaft 1231 is fixed to the pin provided in the bracket 1213. One end of the lever 1237 is rotatably connected to the shaft 1231 through the bearing 1234. The shaft 1238 is rotatably supported by the body 1400 through the bearing 1235. One end of the shaft 1238 is rotatably provided with the eccentric cam-follower 1232. The axis $N_2$ of the eccentric cam-follower 1232 is eccentric with the axis of the shaft 1238. One end of the lever 1239 is fixed to the other end of the shaft 1238 through the shaft 1233. Thus, when the lever 1239 is rotated about the axis $N_3$ of the shaft 1233 in a predetermined direction, the shafts 1233, 1238 together rotate in the same direction as the lever 1239 while the eccentric cam-follower 1232 rotates eccentrically about the axis of the shaft 1238. The eccentric rotation is transmitted to the pin in the bracket 1213 through the lever 1237 and the shaft 1231 as a linear movement in the T- or U-direction.

The upper left driving means 1250 is arranged opposite to the upper right driving means 1230 with the upper looseness control means 1270 described in detail below being between them. This construction is the same as that of the upper right driving means 1230. Therefore, explanation about the construction of the upper left driving means 1250 is omitted while corresponding parts are designated with like reference numerals.

The upper looseness control means 1270 includes a spring 1271 and a spring force adjustment bolt 1272. One end of the spring 1271 is hooked to one of bolts 1215 which connect the guide rail 1212 and the bracket 1213 while the other end is hooked to an aperture 1272a formed in the lower end of the spring force adjustment bolt 1272. The spring force adjustment bolt 1272 of which top is fixed to the body 1400 is rotated in forward or reverse direction to expand or contract the spring 1271, so that spring force of the spring 1271 can be adjusted.

(3) Drive Transmission Mechanism 1300

The drive transmission mechanism 1300 comprises: a right drive transmission means 1310 for transmitting the rotation of the driving shaft of the servomotor M to the lower right driving means 1130; a right synchronizing transmission means 1330 for transmitting the rotation of the driving shaft of the servomotor M to the upper right side driving means 1230 in synchronization with a rotation of the shaft 1133 of the lower right drive means 1130; a left side drive transmission means 1350 for transmitting the rotation of the driving shaft of the servomotor M to the lower left driving means 1150; and a left synchronizing transmission means 1370 for transmitting the rotation of the driving shaft of the servomotor M to the upper left driving means 1250 in synchronization with a rotation of the shaft 1153 of the lower left drive means 1150.

The right drive transmission means 1310 includes pulleys 1301 (shown in FIG. 20), 1302, 1311, a shaft 1303 and belts 1304, 1312. The pulley 1301 is attached to the driving shaft of the servomotor M. The pulley 1302 is attached to the shaft 1303 disposed pallarel to the driving shaft of the servomotor M. The belt 1304 connects these pulleys 1301, 1302, to thereby transmit the rotation of the driving shaft of the servomotor M to the shaft 1303. The shaft 1303 is rotatably supported by the body 1400 through bearings 1306a, 1306b attached to the body 1400 through attachment members 1305a, 1305b.

The pulley 1311 is attached to one end of the shaft 1303. The belt 1312 connects the pulley 1311 and the pulley 1139, so that the rotation of the driving shaft of the motor M transmitted to the shaft 1303 is transmitted to the pulley 1139 of the lower right driving means 1130 through the pulley 1311 and the belt 1312.

The right synchronizing transmission means 1330 includes pins 1331, 1332, bearings 1333, 1334, a rod 1335 and rod ends 1336, 1337. One end of the pin 1331 is attached to a peripheral portion of the pulley 1139 while the rod end 1336 is rotatably connected to the other end through the bearing 1333. One end of the pin 1332 is fixed to the upper end of the lever 1239 while the rod end 1337 is rotatably connected to the other end through the bearing 1334. The rod ends 1336, 1337 are interconnected by the rod 1335. Thus, the rotation of the pulley 1139 of the upper right driving means 1230 is synchronously transmitted to the lever 1239 of the upper right driving means 1230 through the pin 1331, the rod end 1336, the rod 1335, the rod end 1337 and the pin 1332.

The left drive transmission means 1350 is arranged on the left side of the right drive transmission means 1310, and the construction of the left drive transmission means 1350 is the same as that of the right drive transmission means 1310. Therefore, explanation about the construction of the left drive transmission means 1350 is omitted while corresponding parts are designated with like reference numerals.

The left synchronizing transmission means 1370 is provided opposite to the right synchronizing transmission means 1330 with regard to the lower and upper driving mechanism 1100, 1200 being therebetween. The construction of the left synchronizing transmission means 1370 is the same as that of the right synchronizing transmission means 1330. Therefore, explanation about the construction of the left synchronizing transmission means 1370 is omitted while corresponding parts are designated with like reference numerals.

(4) Operation

Operation of the apparatus having a construction described above will now be explained. In the case that the pair of cutters 105a, 105b are moved to the closed position to nip and cut off covered wires or perform stripping process (for example, in Steps S3, S4 and S7), a signal is applied to the servomotor M of the driving element 930 (FIG. 1B) from the CPU 920 of the first control means C1 (FIG. 1B) to rotate the driving shaft of the motor M in a predetermined direction.

The rotation of the driving shaft of the motor M is transmitted to the shaft 1303 through the pulley 1301, the belt 1304 and the pulley 1302, so that the pulley 1301 rotates in a clockwise direction with regard to a plane of FIG. 20. The rotation of the pulley 1311 is transmitted to the pulley 1139 through the belt 1312, so that the pulley 1139 also rotates in the clockwise direction. Accordingly, the shafts 1133, 1138 of the lower right driving means 1130 also rotate together in the clockwise direction while the eccentric shaft 1132 eccentrically rotates in the clockwise direction about the axis of the shaft 1138. The clockwise rotation is converted into a T-directional force through the lever 1137 and the cam-follower 1131, and then the T-directional force is applied to the pin 1114, to thereby move the right side of the cutter 105a in the T-direction.

Further, the rotation of the driving shaft of the motor M is transmitted to the lower left driving means 1150 by the left drive transmission means 1350 in the same manner as in the foregoing to move the left side of the cutter 105a in the T-direction, synchronously with the right side.

The rotation of the pulley 1139 in the lower right driving means 1130 is synchronously transmitted to the lever 1239 of the upper right driving means 1230 by the right synchronizing transmission means 1330, so that the lever 1239 also rotates in the clockwise direction about the shaft 1233 along with the shaft 1233. Accordingly, the shafts 1233, 1238 together rotate in the clockwise direction while the eccentric cam-follower 1232 eccentrically rotates in the clockwise direction about the axis of the shaft 1238. The clockwise rotation is converted into a U-directional force through the lever 1237 and the shaft 1231, and then the U-directional force is applied to the pin, to thereby move the right side of the cutter 105b in the U-direction.

Further, the rotation of the driving shaft of the motor M is transmitted to the upper left driving means 1250 by the left synchronizing transmission means 1370 in the same manner as in the foregoing to move the left side of the cutter 105b in the U-direction, synchronously with the right side.

Conversely, in the case that the cutters 105a, 105b are moved to the open position after cutting or stripping process of the covered wires, a signal is applied to the servomotor M from the CPU 920 (FIG. 1B) so that the driving shaft of the motor M can be rotated in the reverse direction to the above mentioned case.

In this case, a reverse procedure to the above case is carried out, to thereby move the cutters 105a, 105b to the full open position.

(5) Effects

As previously mentioned, in the lower right driving means 1130, the rotation of the shaft 1138 is converted into the eccentric rotation of the eccentric shaft 1132 and further into a linear movement of the right side of the cutter 105a by the lever 1137 and the cam-follower 1131. Simultaneously, similar to the above case, the rotational movement is converted into a linear movement of the left side of the cutter 105a to move the cutter 105a in the T- or U-direction in the lower left driving means 1150 while the rotation of the shaft 1238 is converted into the eccentric rotation of the eccentric cam-follower 1232 and further into a linear movement of the right side of the cutter 105b by the lever 1237 and the shaft 1231 in the upper right driving means 1230.

Simultaneously, similar to the above case, the rotational movement is converted into a linear movement of the left side of the cutter 105b to move the cutter 105b in the U- or T-direction in the upper left driving means 1250. Accordingly, the wire cutting means of the fourth embodiment is easy to assemble and adjust and can more accurately control the displacement of the cutters 105a, 105b compared with the wire cutting means 100 of the first embodiment.

F-2. Fifth Embodiment

Figure 21:
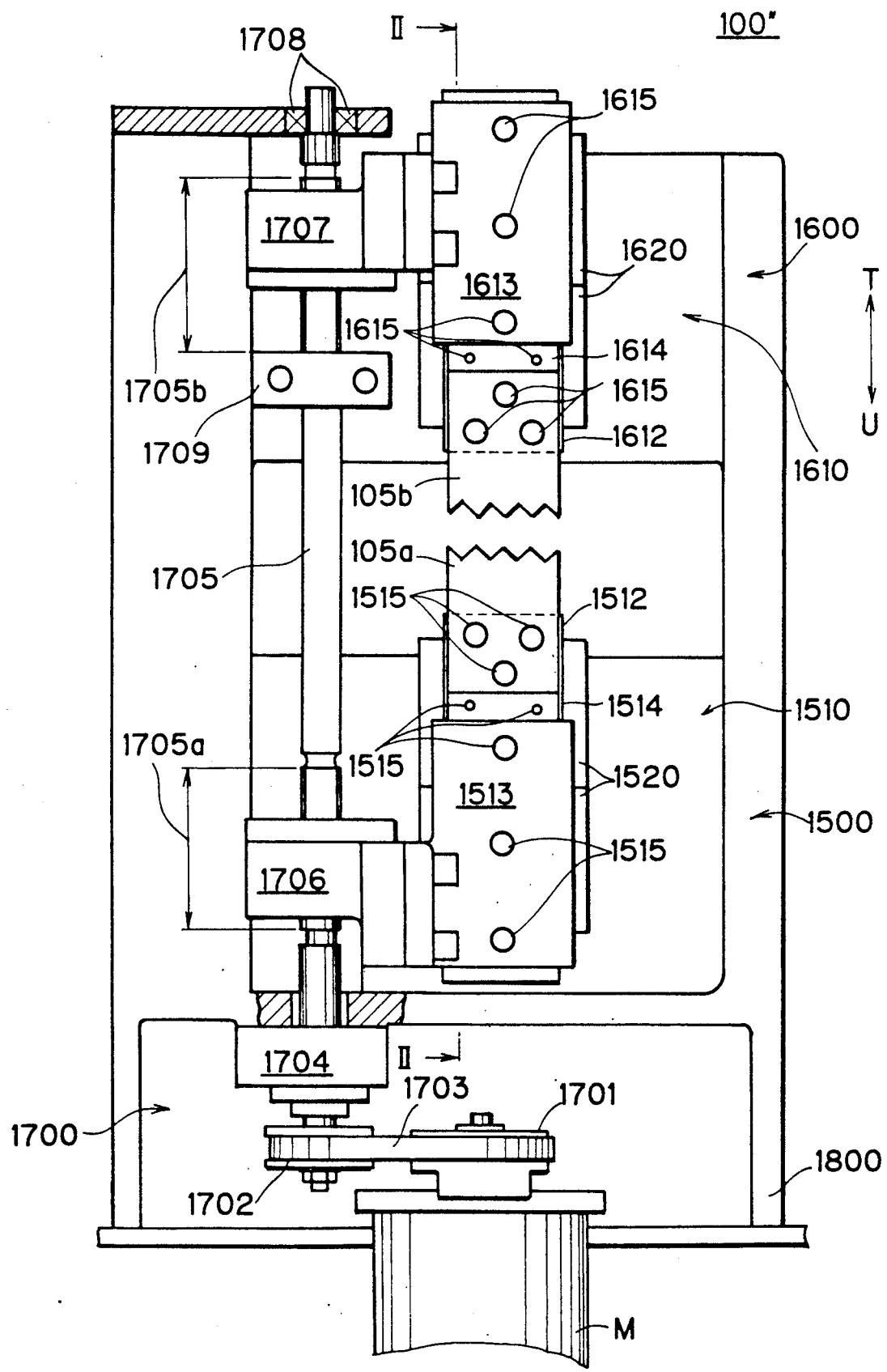
FIG. 21 is a plan view showing a wire cutting means applied to the fifth embodiment of the present invention.
Figure 22:
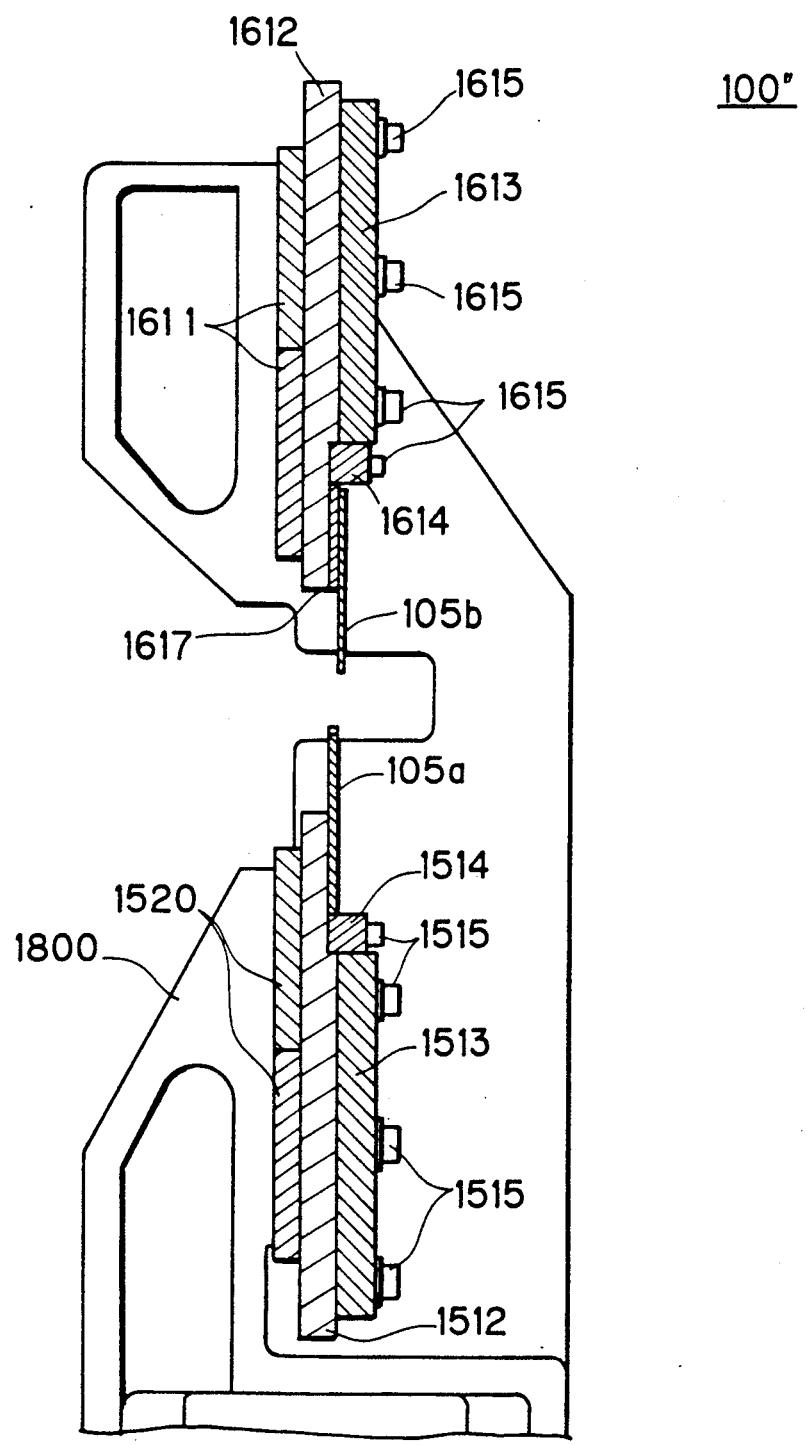
FIG. 22 is a sectional view along the line II—II of FIG. 21.

FIG. 21 is a perspective view showing still another embodiment of the wire cutting means. FIG. 22 is a sectional view along the line II—II of FIG. 21.

For the explanation, the right and left parts in FIG. 21 are herein referred to as "right" and "left" and the upper and lower parts are referred to as "upper" and "lower".

As shown in FIGS. 21 and 22, a wire cutting means 100'' according to the fifth embodiment comprises: a pair of cutters 105a, 105b for nipping and cutting off covered wires and cutting into coverings of the covered wires to perform stripping process; a driving means (referred to as "a lower driving mechanism" below) 1500 for driving the cutter 105a in the T- and U-directions; a driving means (referred to as "an upper driving mechanism" below) 1600 for driving the cutter 105b in the T- and U-directions; a servomotor M being a source of driving the cutters 105a, 105b; a drive transmission mechanism 1700 for transmitting the rotation of a driving shaft of the servomotor M to the upper and lower driving mechanisms 1600, 1500; and a body 1800.

(1) Lower Driving Mechanism 1500

The lower driving mechanism 1500 includes a lower cutter holding means 1510 for holding the cutter 105a and a guide bearing 1520 for moving the cutter 105a held by the cutter holding means 1510 in the T- and U-directions.

The lower cutter holding means 1510 includes a guide rail 1512, a bracket 1513 and a stopper 1514. The guide bearing 1520 fixed to the body 1800 is provided with the guide rail 1512 movable in the T- and U-directions. The cutter 105a, the stopper 1514 and the bracket 1513 are disposed on the guide rail 1512 in this order and fixed with bolts 1515. Therefore, when a T-directional force is applied to the bracket 1513, the guide rail 1512, the bracket 1513, the stopper 1514 and the cutter 105a are moved together on the guide bearing 1520 in the T-direction. On the other hand, when a U-directional force is applied to the bracket 1513, the guide rail 1512, the bracket 1513, the stopper 1514 and the cutter 105a are moved together on the guide bearing 1520 in the U-direction.

(2) Upper Driving Mechanism 1600

The upper driving mechanism 1600 includes an upper cutter holding means 1610 for holding the cutter 105b and a guide bearing 1620 for moving the cutter 105b held by the cutter holding means 1610 in the T- and U-direction.

The upper driving mechanism 1600 has almost the same construction as that of the lower driving mechanism 1500. The upper cutter holding means 1610 includes a guide rail 1612, a bracket 1613 and bolts 1615. The upper driving mechanism 1600 is different from the lower driving mechanism 1500 only in that the upper driving mechanism 1600 has a spacer 1617 (FIG. 22) inserted between the cutter 105b and the guide rail 1612. The spacer 1617 has almost the same thickness as that of the cutter 105a. Therefore, explanation about the construction of the upper driving means 1600 is omitted.

(3) Drive Transmission Mechanism 1700

The dive transmission mechanism 1700 comprises pulleys 1701, 1702, a belt 1703, a terminal bearing unit 1704, a ball thread 1705, ball thread brackets 1706, 1707 and a bearing 1708. The ball thread 1705 connects the upper and lower driving mechanisms 1600, 1500; that is, one end of the ball thread 1705 is rotatably supported by the body 1800 through the bearing 1708 while the other end thereof is rotatably supported by the body 1800 through the terminal bearing unit 1704. The ball thread 1705 has a left screw region 1705a in the lower portion corresponding to the cutter 105a and a right screw region 1705b in the upper portion corresponding to the cutter 105b. The left screw region 1705a is engaged with the ball thread bracket 1706 while the right screw region 1705b is engaged with the ball thread bracket 1707. The ball thread brackets 1706, 1707 are connected to the brackets 1513, 1613 with bolts, respectively. Further, the pulley 1702 is attached to the lower end of the ball thread 1705 while the pulley 1701 is attached to the driving shaft of the servomotor M. The belt 1703 connects these pulleys 1701, 1702, so that the rotation of the driving shaft of the servomotor M is transmitted to the ball thread 1705 through the pulley 1701, the belt 1703 and the pulley 1702.

When the ball thread 1705 rotates, the ball thread brackets 1706, 1707 engaged with the left and right screw regions 1705a, 1705b mutually come to be nearer or farther in the axial direction of the ball screw 1705 depending upon the direction in which the ball thread 1705 rotates. Thus, the cutters 105a, 105b are moved to the open and closed positions.

Reference numeral 1709 designates a stopper provided for preventing the ball thread brackets 1706, 1707 from moving beyond the left and right screw regions 1705a, 1705b, respectively. In other words, the stopper 1709 is for preventing the cutters 105a, 105b from moving above respective predetermined amounts.

(4) Operation

The operation of the apparatus constructed as described in the foregoing will now be explained. In the case that the pair of cutters 105a, 105b are moved to the closed position for nipping and cutting off the covered wires or performing a stripping process (for example, in Step S3, S4 and S7), a signal is applied to the servomotor M from the CPU 920 (FIG. 1B) to rotate the driving shaft of the motor M in a predetermined direction.

The rotation of the driving shaft of the motor M is transmitted to the ball thread 1705 through the pulley 1701, the belt 1703 and the pulley 1702 to rotate the ball thread 1705 in a predetermined direction. Accordingly, the ball thread bracket 1706 is moved in the T-direction in accordance with the rotational direction of the ball thread 1705 in the left screw region 1705a, so that the guide rail 1512, the bracket 1513, the stopper 1514 and the cutter 105a together are moved on the guide bearing 1520 in the T-direction. At the same time, the ball thread bracket 1707 is moved in the U-direction in accordance with the rotational direction of the ball thread 1705 in the right screw region 1705b, so that the guide rail 1612, the bracket 1613, the stopper 1614 and the cutter 105b together are moved on the guide bearing 1611 in the U-direction. Thus, the cutters 105a, 105b are moved to the open and closed positions.

On the other hand, in the case that the cutters 105a, 105b are moved to the open position after the cutting and stripping processes, a signal is applied to the servomotor M from the CPU 920 (FIG. 1B) to rotate the driving shaft of the motor M in the reverse direction to that in the above case. In this case, the dirving shaft of the motor M rotates in the reverse direction, the wire cutting means is reveresed.

(5) Effects

As previously mentioned, the rotation of the ball thread 1705 is converted into a linear movement of the cutters 105a, 105b through the ball thread brackets 1706, 1707 engaged with the left and right screw regions 1705a, 1705b, to thereby move the cutters 105a, 105b to the open and closed positions. Accordingly, similar to the fourth embodiment, the wire cutting means of the fifth embodiment is easy to assemble and adjust and still can accurately control the displacement of the cutters 105a, 105b.

G. Sixth Embodiment

Now a harness producing apparatus G of a sixth embodiment according to the invention of claim 8 will be described. The harness producing apparatus G is different from the harness producing apparatus A of the first embodiment in the following two points.

Figure 23:
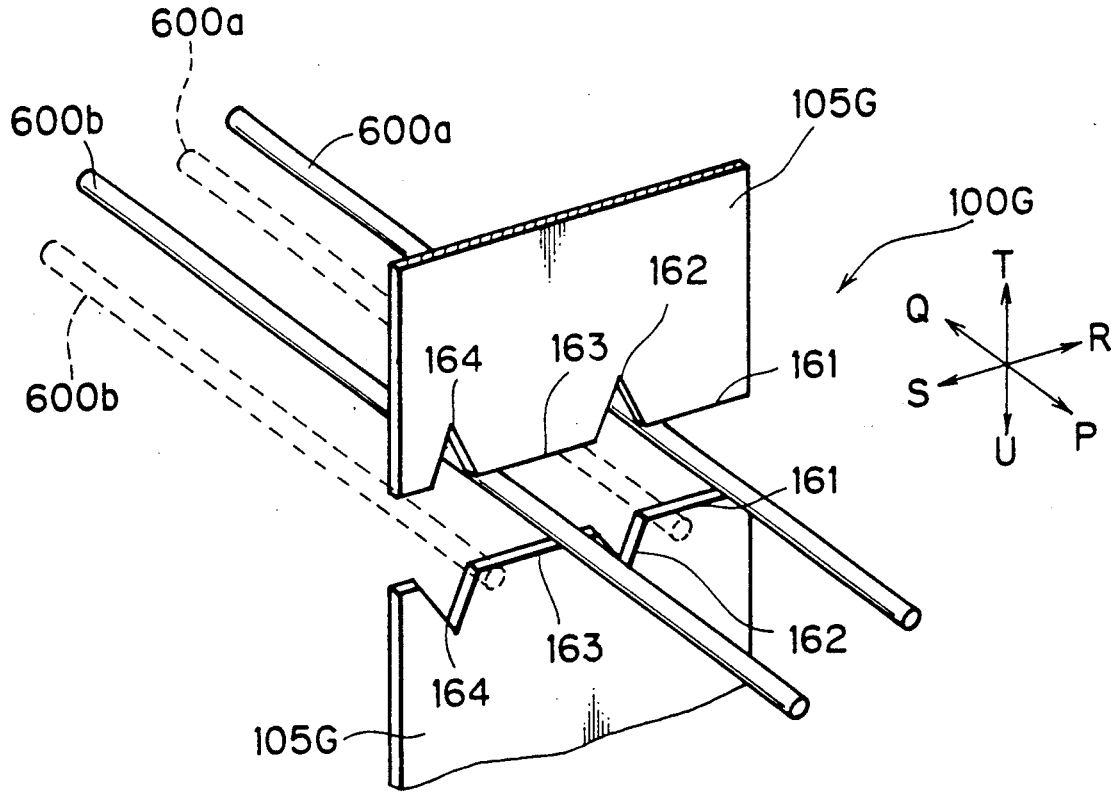
FIG. 23 is a plan view showing a wire cutting means applied to the sixth embodiment of the present invention.

One is that the cutters 105G shown in FIG. 23 are substituted for the cutters 105 (FIG. 5) in the wire cutting means.

The other is that a fourth control means (not shown) is substituted for the first control means of the harness producing apparatus A to perform the operation described below.

G-1. Cutters 105G

FIG. 23 is a perspective view showing a main portion of a wire cutting means 100G. As shown in FIG. 23, edges 161, 163 for cutting off and edges 162, 164 for stripping coverings are formed on the cutters 105G. The cutting edges 161, 163 are finished substantially linear in a shape whereas the stripping edges 162, 164 are finished substantially V-shape (or U-shape) in a shape. When covered wires 600a, 600b are arranged as shown in the solid line in FIG. 23 and the cutters 105G are moved from the fully open position to the closed position, the covered wires 600a, 600b are cut off with the cutting edges 161, 163. On the other hand, when the covered wires 600a, 600b are disposed as shown in the dot line in FIG. 23 and the cutters 105G are moved from the fully open position to the somewhat open position, the coverings of the covered wires 600a, 600b are cut into with the stripping edges 162, 164, respectively.

G-2. Harness Producing Apparatus G

Figure 24:
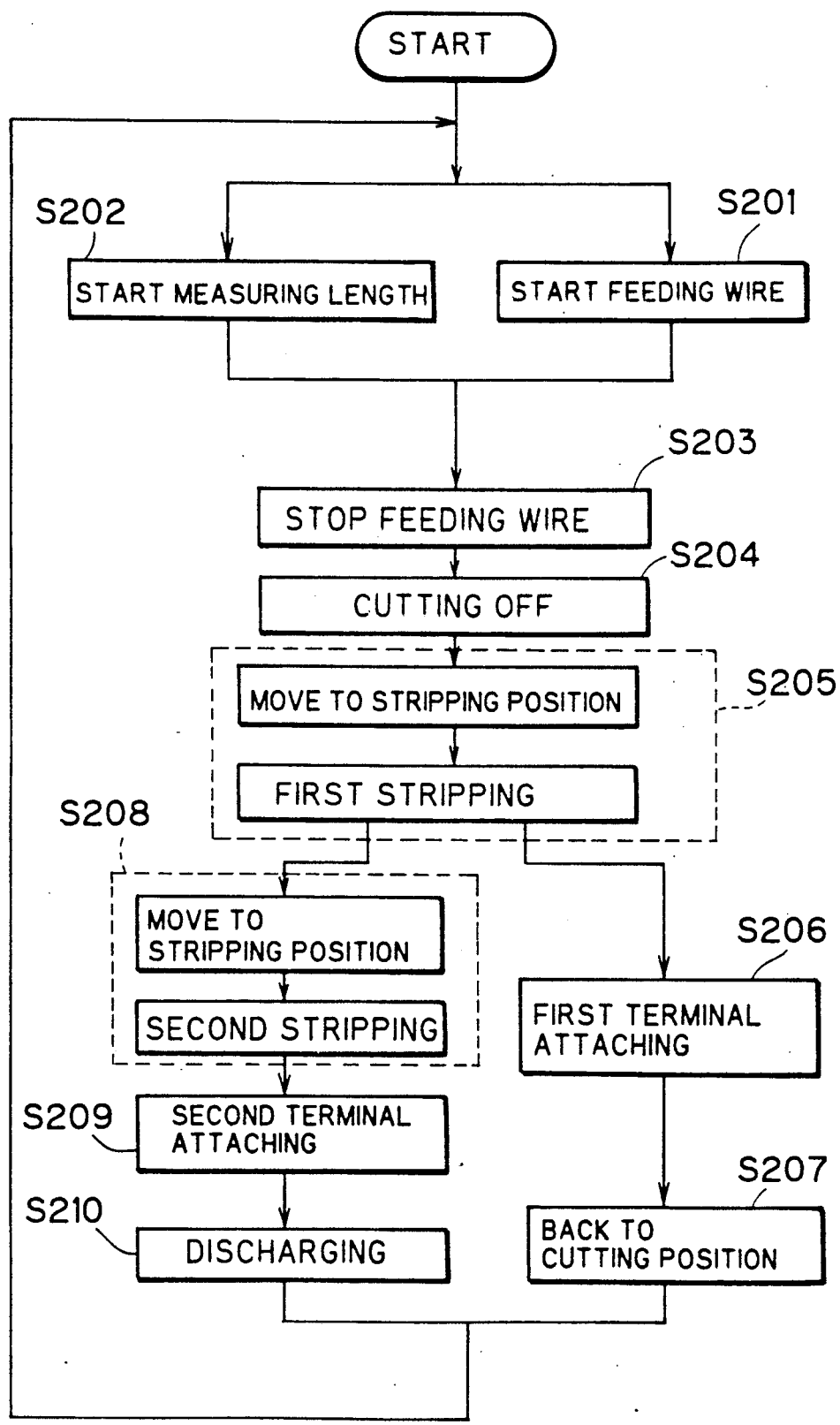
FIG. 24 is a flowchart showing an operation of the sixth embodiment.

FIG. 24 is a flowchart illustrating the operation of the harness producing apparatus G.

In the harness producing apparatus G, when operator arranges the covered wires 600a, 600b on an initial position and inputs an operation start command to the fourth control means through the operation element 900 (FIG. 1A), the covered wires 600a, 600b are nipped with the wire feeding means 50. Thereafter, the feeding rollers 65, 66 start to rotate and feed the covered wires 600a, 600b to the cutting region between the cutting edges 141, 143 (Step S201). Simultaneously with Step S201, the length measuring rollers 63, 64 start to rotate while length measuring means (not shown) starts its operation for measuring a feeding amount of the covered wires 600a, 600b on the basis of the rotation of the length measuring rollers 63, 64 (Step S202).

When the amount of the covered wires 600a, 600b fed by the wire feeding means 50 reaches a predetermined value, the rotation of the feeding rollers 65, 66 is stopped to stop feeding of the covered wires 600a, 600b (Step S203). In this case, the amount of the covered wires 600a, 600b fed by the wire feeding means 50 is determined based upon information about the length of a harness to be produced, which is inputted through the operation element 900 in advance.

Then, the covered wires 600a, 600b are held by the first and second holding means 201, 301 of the first and second holding and moving means 200, 300, respectively. The feeding rollers 65, 66 are moved to the open position, to thereby release the covered wires 600a, 600b, and the cutters 105G are moved to the closed position. As a result, the cutting edges 161, 163 nip the covered wires 600a, 600b, respectively, to thereby cut off the covered wires 600a, 600b (Cutting process: Step S204), so as to divided into remaining wires 601a, 601b and cut-off wires 602a, 602b.

Then, the second holding means 301 is moved somewhat to the left (in S-direction) so that the remaining wires 601a, 601b and the cut-off wires 602a, 602b may not interfere with each other when the remaining wires 601a, 601b are moved forward later. The first holding means 201 is moved to a position corresponding to a stripping region between the stripping edges 162, 164, so that the remaining wires 601a, 601b held by the first holding means 201 are moved to the stripping position. The remaining wires 601a, 601b are moved somewhat forward with the forward movement (in the direction shown with an arrow P) of the first holding means 201, and then the cutters 105G are moved to the somewhat open. Thus, the stripping edges 162, 164 are cut into the coverings of the remaining wires 601a, 601b. In this case, the amount by which the remaining wires 601a, 601b are moved forward by the first holding means 201 is determined based upon information about a stripped length of the coverings, which is inputted through the operation element 900 in advance. The holding means 201 is moved backward with the coverings of the remaining wires 601a, 601b being cut into the stripping edges 162, 164 to strip the coverings of the downstream ends of the remaining wires 601a, 601b (First stripping process: Step S205).

When the holding means 201 is moved to the right (in an R-direction) toward the first terminal attaching means 400 by the first moving means 202 so that terminals are in this order attached to stripped ends of the remaining wires 601a, 601b by the first terminal attaching means 400 (First terminal attaching process: Step S206). After the first terminal attaching process (Step S206) is completed, the first holding means 201 is moved back to the original position (Step S207).

As shown in FIG. 24, while Steps S206 and S207 are carried out, the second stripping process (Step S208), the second terminal attaching process (Step S209) and discharging process (Step S210) are performed. Specifically, upstream parts of the coverings of the cut-off wires 602a, 602b are stripped by the second holding and moving means 300 and the wire cutting means 100G, similarly to Step S205, the cut-off wires 602a, 602b are moved by the second holding and moving means 300 in a direction shown with an arrow S, and terminals are attached to stripped ends of the cut-off wires 602a, 602b by the second terminal attaching means 500, similarly to Step S206 (Step S209). After that, the cut-off wires 602a, 602b are discharged by the discharging means 550 (Step S210), and the second holding means 301 of the second holding and moving means 300 is moved back to the original position in a direction shown with the arrow R.

As stated above, in the sixth embodiment, the pair of cutters 105G are provided with the cutting edges 161, 163 for nipping and cutting off the covered wires 600a, 600b and the stripping edges 162, 164 for cutting into the coverings of the covered wires 600a, 600b. In a cutting process of the covered wires 600a, 600b, the covered wires 600a, 600b are cut off with the cutting edges 161, 163, respectively. In a stripping process of coverings of the covered wires, the coverings are stripped with the stripping edges 162, 164, respectively. Accordingly, even when the cutting quality of the cutting edges 161, 163 is reduced due to the cutting process, the stripping edges 162, 164 are independent of the degradation in the quality due to the cutting treatment. Consequently, the life of the stripping edges 162, 164 is prolonged because less exchanges of cutters due to the cutting quality degradation are needed, so that the cutters can be used longer.

Furthermore, the cutting edges 161, 163 are formed almost linearly, and therefore the cutting edges 161, 163 can be whetted easily.

H. Seventh Embodiment

A harness producing apparatus H of the seventh embodiment according to claim 10 will now be described. The harness producing apparatus H is different from the harness producing apparatus A of the first embodiment in that the harness producing apparatus H is further provided with a detection means 970 shown in FIG. 25 and a fifth control means C5 instead of the first control means C1 to perform the following operation.

H-1. Construction

Figure 25:
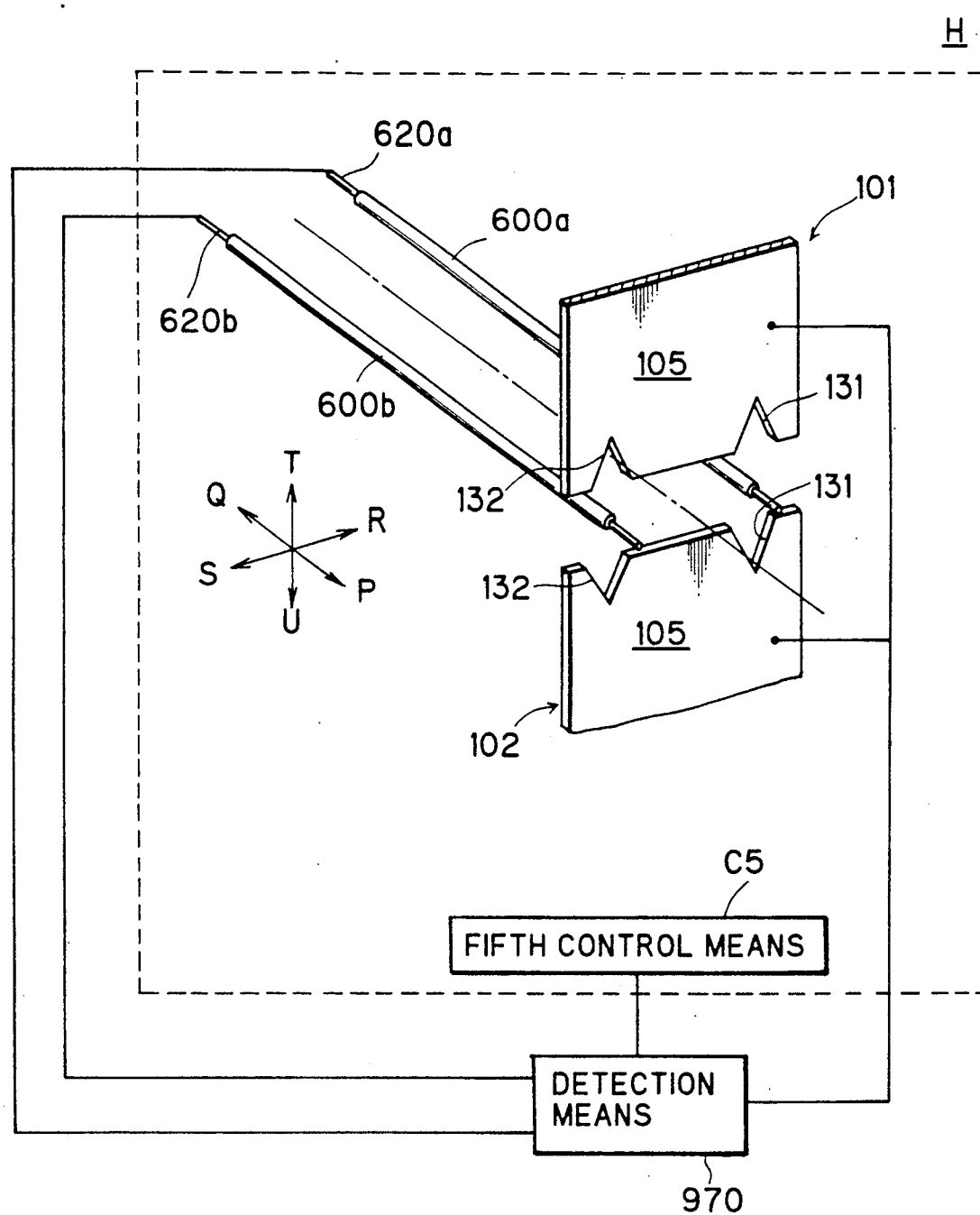
FIG. 25 is a schematic view showing a harness producing apparatus of the seventh embodiment of the present invention.

FIG. 25 is a view showing a schematic construction of the harness producing apparatus H of the seventh embodiment. As shown in FIG. 25, the detection means 970 is electrically connected to the cores 620a, 620b of the covered wires 600a, 600b as well as the cutters 105. Also, the detection means 970 detects conduction or non-conduction between the core 620a of the covered wire 600a and the cutters 105 and between the core 620b of the covered wire 600b and the cutters 105.

H-2. Method for Setting Cutting Depth of Covering

Figure 26A:
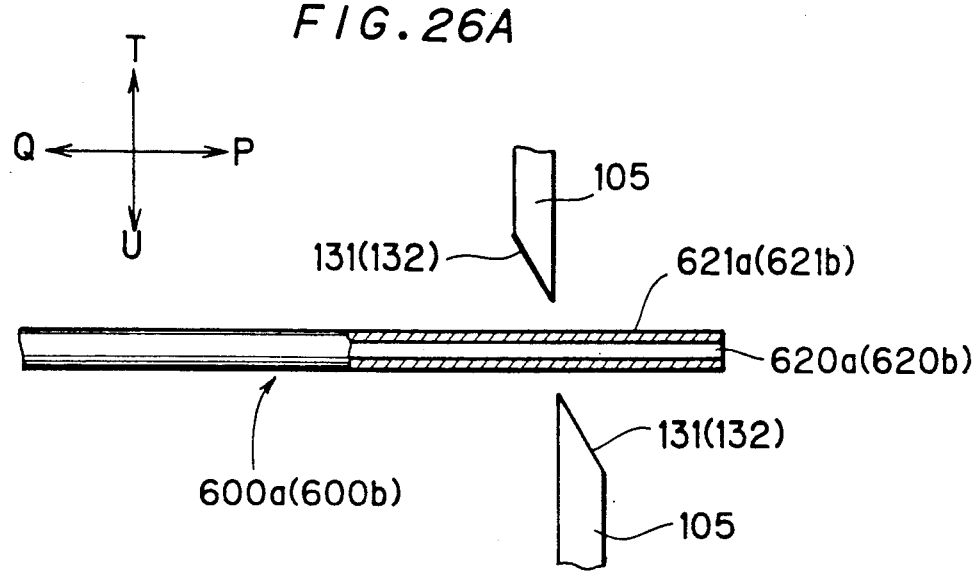
FIGS. 26A to 26C are explanatory views showing a method for setting a cutting depth of a covering, respectively.
Figure 26B:
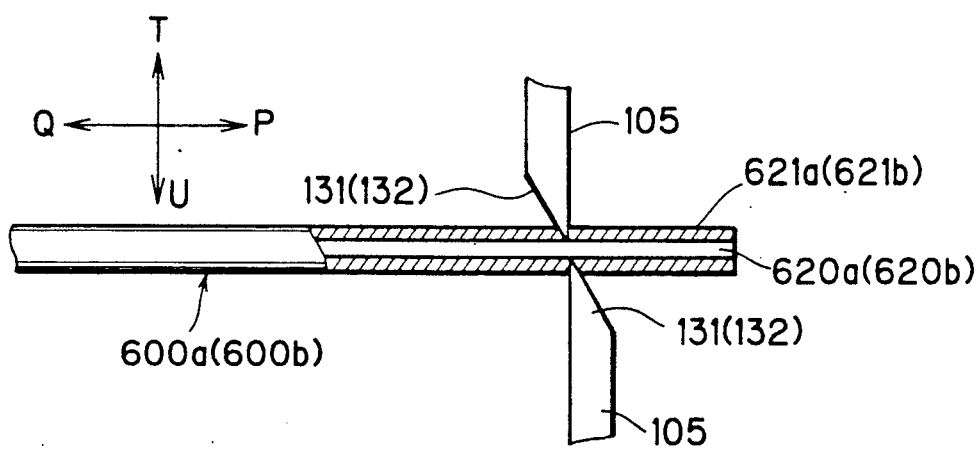
Figure 26C:
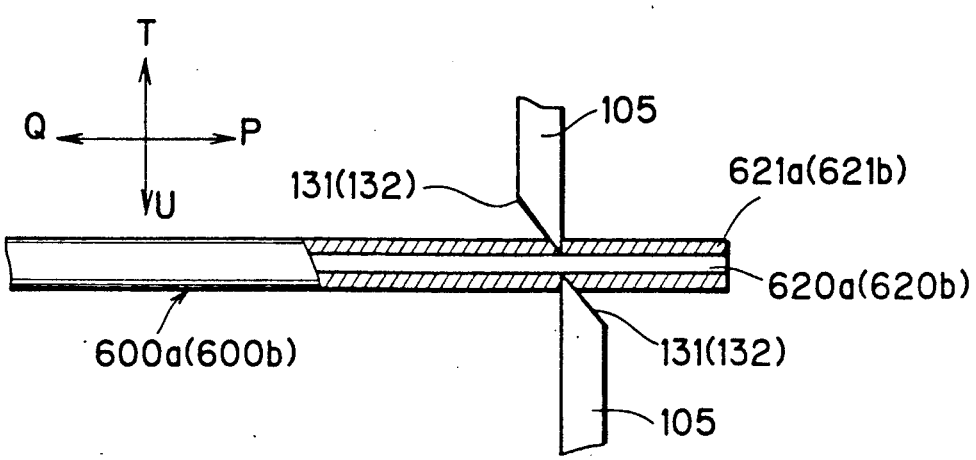

FIGS. 26A to 26C are views illustrating a method for getting an optimum cutting depth in the harness producing apparatus H, respectively.

When operator sets the covered wires 600a, 600b into a predetermined position and applys a cutting depth setting command to a CPU in the fifth control means C5 through the operation element 900 (FIG. 1A) in order to get an optimum cutting depth, the harness producing apparatus H performs the following operation on the basis of commands from the CPU.

As shown in FIG. 26A, the covered wires 600a, 600b are moved forward by an appropriate distance in a wire feeding direction (P-direction) by the wire feeding means 50 (FIG. 1A or the like) so that coverings 621a, 621b of the covered wires 600a, 600b to be stripped are disposed beyond the cutters 105.

Then the cutters 105 are gradually moved to nip the covered wires 600a, 600b. Simultaneously, conduction or non-conduction between the core 620a of the covered wire 600a and the cutters 105 and between the core 620b of the covered wire 600b and the cutters 105, is detected by the detection means 970. As can be seen in FIG. 26A, for example, when the cutters 105 does not completely cut into the coverings 621a, 621b, current does not flow between the core 620a of the covered wire 600a and the cutters 105 and between the core 620b of the covered wire 600b and the cutters 105 because the cores 621a, 621b are not in contact with the edges 131, 132 of the cutters 105.

After that, the cutters 105 are further moved, and then the coverings 621a, 621b are cut into with the cutters 105 by depth corresponding to the thickness of the coverings 621a, 621b as shown in FIG. 26B. When the edges 131, 132 of the cutters 105 come in contact with the cores 620a, 620b, current flows between them.

Simultaneously with the detection of conduction by the detection means 970, the movement of the cutters 105 is stopped at that position. Thus, given is the cutting depth necessary to make the cutters 105 come in contact with the cores 620a, 620b.

If stripping is performed in such situation that the cores 620a, 620b are in contact with the edges 131, 132 (FIG. 26B), the cores 620a, 620b are liable to be damaged by the edges 131, 132. Therefore, the cutters 105 are moved back by a the predetermined amount so as to come in no contact between the cores 620a, 620b and the edges 131, 132 (FIG. 26C). The cutting depth in this situation (FIG. 26C), that is, an optimum cutting depth are stored in a memory (not shown) of the fifth control means C5 as cutting depth control data. Thus, setting of the cutting depth of the coverings is completed.

After that, when operator applys a normal operation start command to the CPU of the fifth control means C5 through the operation element 900, a harness is produced in order shown in a flowchart of FIG. 12, for example. In this case, the cutting depth is determined based upon the above cutting depth control data read from a memory.

Also, the operation similar to the above case gives an optimum cutting depth control data for different kind of wires. On the normal operation, stripping can be performed based upon the cutting depth control data.

H-3. Effects

As previously mentioned, in a harness producing apparatus H of a seventh embodiment, an optimum cutting depth is given with always constant accuracy so that the product quality can be kept constant. Further, since an optimum cutting depth can be given only by the above successive processes, a period necessary for getting an optimum covering cutting depth is reduced, and productive efficiency is improved.

H-4. Other Advantages

The above stated system can be used for detecting stripping errors, so that the detection can be automated. Specifically, the covered wires 600a, 600b are moved backward in a Q-direction while the edges 131, 132 of the cutters 105 are cut into the coverings 621a, 621b by an optimum cutting depth (FIG. 26C) to strip the coverings 621a, 621b of the covered wires 600a, 600b (Stripping process). Conduction or non-conduction between the cores 620a, 620b and the cutters 105 are detected at that time. Thus, stripping errors can be detected. For example, current has never flow between the core 620a of the covered wire 600a and the cutters 105 and between the core 620b of the covered wire 600b and the cutters 105 during stripping, it means that the edges 131, 132 of the cutters 105 have not come in contact with the respective cores 621a, 621b, that is, it is recognized that stripping has been performed without error. Conversely, current flows between the core 620a of the covered wire 600a and the cutters 105 or between the core 620b of the covered wire 600b and the cutters 105 during stripping, it means that the cutters 105 have come in contact at least with either one of the cores 621a, 621b, that is, it suggests that the cores 621a, 621b have possibly been damaged by the edges 131, 132 of the cutters 105.

In the above embodiment, the detection means 970 detects conduction or non-conduction between the core 620a and the cutters 105. However, the detection means 970 can detect contact or non-contact between the edges 131, 132 of the cutters 105 and the cores 620a, 620b by detecting the variation in electrostatic capacity between the core 620a and the cutters 105 and between the core 620b and the cutters 105 due to other electrical characteristics such as movement of the cutters 105. For example, when electrostatic capacity changes rapidly due to the movement of the cutters 105, contact between the core 621a and the cutters 105 and between the core 621b and the cutters 105 is recognized.

I. Eighth to Tenth Embodiments

When a stripping process is performed, stripped end portions are formed in the remaining and cut-off wires while scraps of the coverings stripped during the first and second stripping processes are yielded. The scraps of the coverings are liable to scatter from the wire cutting means 100 and get into the peripheral parts (e.g., the first wire holding and moving means 200). This causes a trouble in such parts. Therefore, it is desirable that the above harness producing apparatus is provided with a means for surely collecting and removing the scraps of the covering.

The construction and the operation of a scrap removing means which is applicable to the harness producing apparatus A and can surely collect and remove the scraps of the covering will be described below.

I-1. Eighth Embodiment

Figure 27:
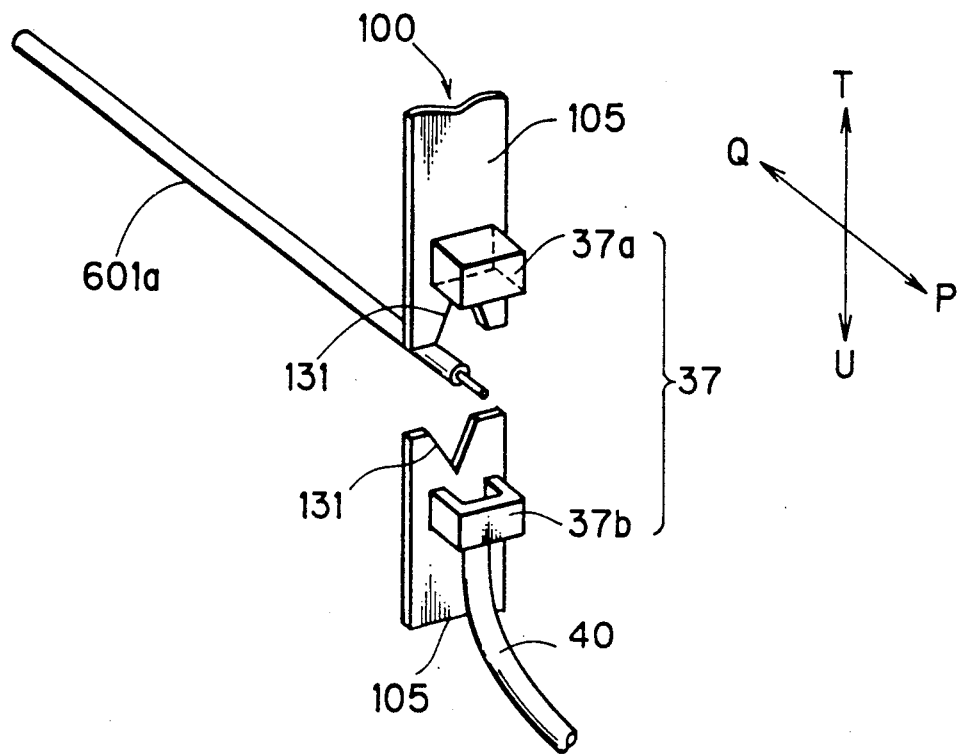
FIG. 27 is a perspective view showing a scrap removing means applied to the eighth embodiment of the present invention.

FIG. 27 is a perspective view showing an embodiment of the scrap removing means to attain the above object. In FIG. 27, reference numeral 100 designates a wire cutting means for the harness producing apparatus A shown in FIG. 1A. For the convenience of explanation, only a construction related to the remaining wire 601a is shown in the figure. Also in the explanation below, although the construction and the operation related to the remaining wire 601a are explained below, those related to the remaining wire 601b and the cut-off wires 602a, 602b are the same, and therefore the explanations about them are omitted.

(1) Scrap Removing Means

Figure 28:
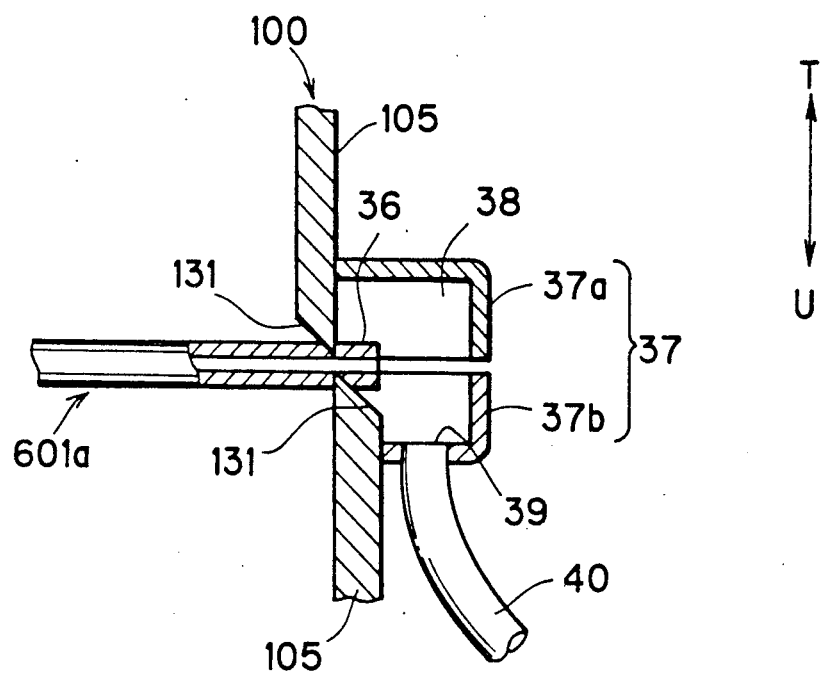
FIG. 28 is a sectional view thereof.

The scrap removing means comprises a closed space forming member 37 consisting of a pair of elastic covers 37a 37b, a scrap suction pipe 40 and a sucking means (not shown), as shown in FIG. 27. The elastic covers 37a, 37b are fixed to each one side of the respective cutters 105 and elastically come into contact to mate with each other when the cutters 105 are moved to the somewhat open position during a stripping process, so that an almost perfect closed space 38 can be formed as shown in FIG. 28. In this case, the elastic covers 37a, 37b are elastically in contact with each other to the extent that the air is easily sucked into the closed space 38 from the junction of them. The lower cover 37b is provided with an opening 39 to which one end of the scrap suction pipe 40 is connected. The other end of the scrap suction pipe 40 is connected to the sucking means. Thus the scrap suction pipe 40 and the opening 39 connect the closed space 38 and the sucking means, so that scraps 36 within the closed space 38 are collected by the sucking means through the opening 39 and the scrap suction pipe 40.

(2) Scrap Removing Process

Similar to the first embodiment, when an operation start command is given to the harness producing apparatus A through the operation element, the covered wires 600a, 600b are fed by a predetermined amount in the P-direction by the wire feeding means 50. Thereafter, a cutting process is performed by the wire cutting means 100 to divide into the remaining wires 601a, 601b and the cut-off wires 602a, 602b.

Then, similar to the first embodiment, the remaining wire 601a is moved forward by an appropriate distance in the P-direction by the first holding and moving means 200 to perform a stripping process, so that the covering to be stripped is fed to pass the cutters 105. The edges 131 of the cutters 105 are moved to the somewhat open position by a control means (not shown) to cut into the covering of the remaining wire 601a. In this case, elastic covers 37a, 37b are moved together with the cutters 105, so that the closed space 38 is formed with the elastic covers 37a, 37b and the cutters 105 so as to enclose the covering to be stripped during the stripping process (see in FIG. 28). After that, the remaining wire 601a is moved backward in the Q-direction with the covering being cut into with the cutters to strip the covering of the remaining wire 601a (First stripping process) while the sucking means is driven by a control means to make the closed space 38 to be under the negative pressure. Immediately after the stripping process, the covering 36 stripped from the remaining wire 601a, so-called the scrap, is kept within the closed space 38 and further sucked and collected into the sucking means through the scrap suction pipe 40 (Scrap removing process).

Additionally, a terminal is attached to the stripped end of the remaining wire 601a and the remaining wire 601a is moved back to the wire feeding line X while the cut-off wire is subjected to the second strippings, the second terminal attaching and discharging processes in the same manner as in the first embodiment.

(3) Effects

As previously mentioned, the closed space 38 is formed with the cutters 105 and the elastic covers 37a, 37b during the stripping process. Consequently, scattering of the scrap 36 yielded due to the stripping process is restricted to the closed space 38, and also the scrap 36 is removed away from the closed space 38 to the scrap removing means because the closed space 38 is sucked by the sucking means. Thus, scattering of scraps to the wire cutting means 100 or its peripheral parts can be avoided and the trouble caused by the scraps can be prevented. Also, since the range to be sucked by the sucking means is restricted only to the closed space 38, the scraps can be completely removed and collected by a small sucking means.

I-2. Ninth Embodiment

Figure 29:
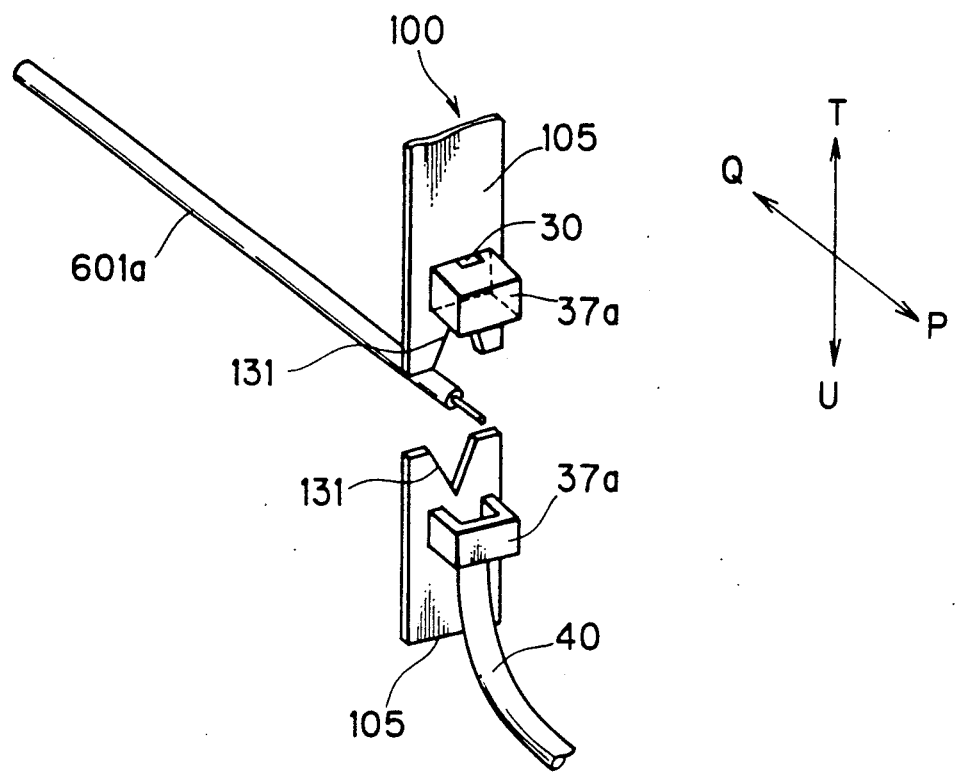
FIG. 29 is a perspective view showing a scrap removing means applied to the ninth embodiment of the present invention.

FIG. 29 is a perspective view showing another embodiment of the scrap removing means. For the convenience of explanation, only a construction related to the remaining wire 601a is shown in the figure and also the operation in addition to the construction related to the same is described, similarly to the eighth embodiment. Since the constructions and the operations related to the remaining wire 601b and the cut-off wires 602a, 602b are the same as those of the remaining wire 601a, explanations about them are omitted.

(1) Scrap Removing Means

Figure 30:
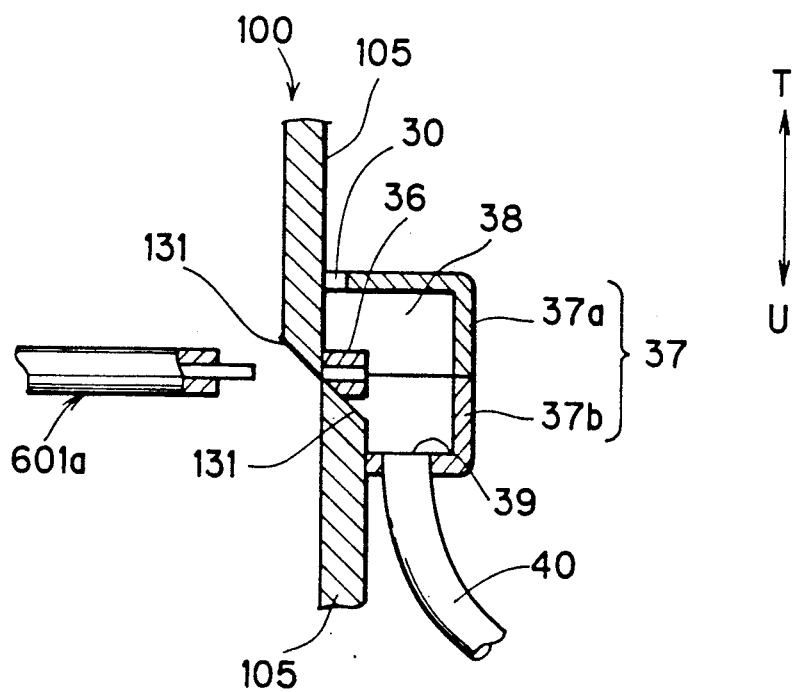
FIG. 30 is a sectional view thereof.

The ninth embodiment is different from the eighth embodiment in that an opening 30 is formed in a part of the upper surface of an elastic cover 37a as shown in FIG. 29 and that the elastic covers 37a, 37b elastically come into contact to mate with each other when the cutters 105 are moved to the closed position, so that an almost perfect closed space 38 is formed with the covers 37a, 37b and the cutters 105 as shown in FIG. 30. Other parts of the ninth embodiment is the same as those of the eighth embodiment.

(2) Scrap Removing Process

The operation of the ninth embodiment will described below. After wire feeding and cutting processes are performed to form the remaining wires 601a, 601b and the cut-off wires 602a, 602b, the first stripping process is carried out in the same manner as in the eighth embodiment. Specifically, the remaining wire 601a is fed in the P-direction by an appropriate distance to pass beyond the cutters 105. The cutters 105 are moved to the somewhat open position so that the covering of the remaining wire 601a is cut into with the edges 131 of the cutters 105. Thereafter, the remaining wire 601a is moved backward in the Q-direction with the covering being cut into with the cutters 105 so as to strip the covering of the remaining wire 601a.

Immediately after the stripping process, the cutters 105 are moved to the closed position. Thus, the elastic covers 37a, 37b are moved together with the cutters 105, so that the almost perfect closed space 38 is formed with the elastic covers 37a, 37b and the cutters 105, to thereby enclose the covering stripped during the stripping process as shown in FIG. 30.

Then the sucking means is driven to make the closed space 38 to be under the negative pressure. The covering stripped from the remaining wire 601a and kept within the closed space 38 is sucked and collected by the sucking means through the scrap suction pipe 40 (Scrap removing process).

Then, similarly to the first embodiment, a terminal is attached to the stripped end of the remaining of the remaining wire 601a and the remaining wire 601a is moved back to the wire feeding line X while the cut-off wire is subjected to the second stripping, the second terminal attaching and discharging processes.

(3) Effects

As previously mentioned, in the ninth embodiment, the same effect as in the eight embodiment can be obtained because, immediately after the stripping process, the almost perfect closed space 38 is formed with the cutters 105 and the elastic cover 37a, 37b while the closed space 38 is sucked by the sucking means. As understood from comparing FIG. 28 with FIG. 30, there exists a comparatively large clearance between the edges 131 of the cutters 105 in the eighth embodiment whereas there exists only a smaller opening 30 in the ninth embodiment. Therefore, scraps can be removed and collected by a smaller sucking means in the ninth embodiment.

I-3. Tenth Embodiment

Figure 31:
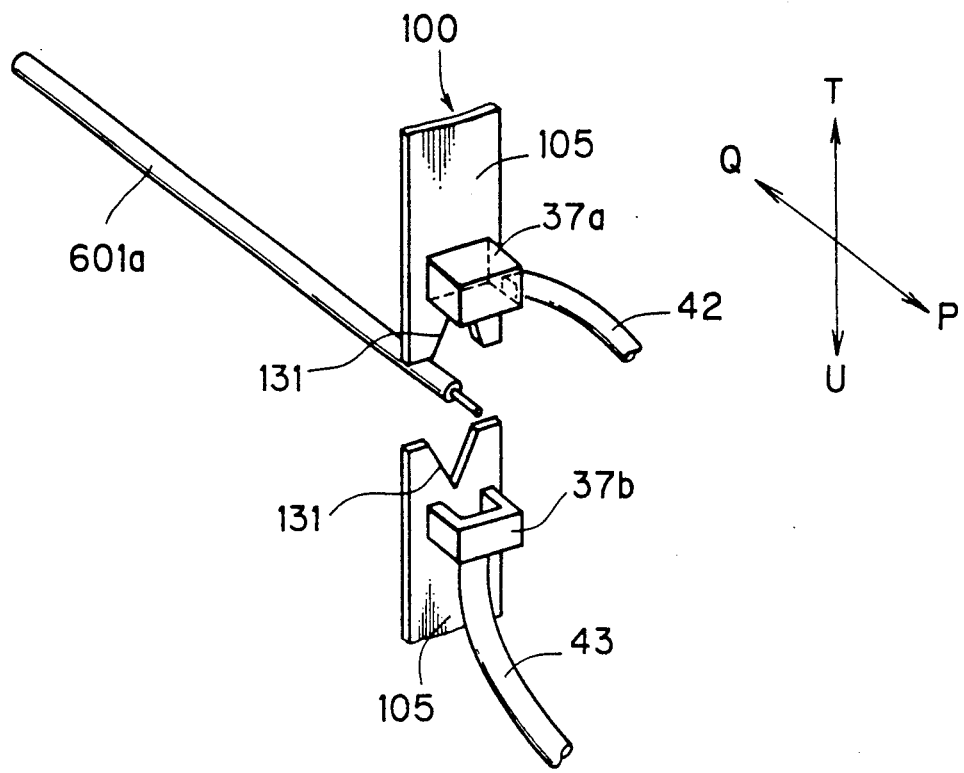
FIG. 31 is a perspective view showing a scrap removing means applied to the tenth embodiment of the present invention.

FIG. 31 is a perspective view showing another embodiment of the scrap removing means. For the convenience of explanation, similarly to the eighth and ninth embodiment, only the construction related to the remaining wire 601a is shown in the figure and the construction and the operation related the same are explained. However, the constructions and the operations related to the remaining wire 601b and the cut-off wires 602a, 602b are the same, and therefore the explanations about them are omitted.

(1) Scrap Removing Means

Figure 32:
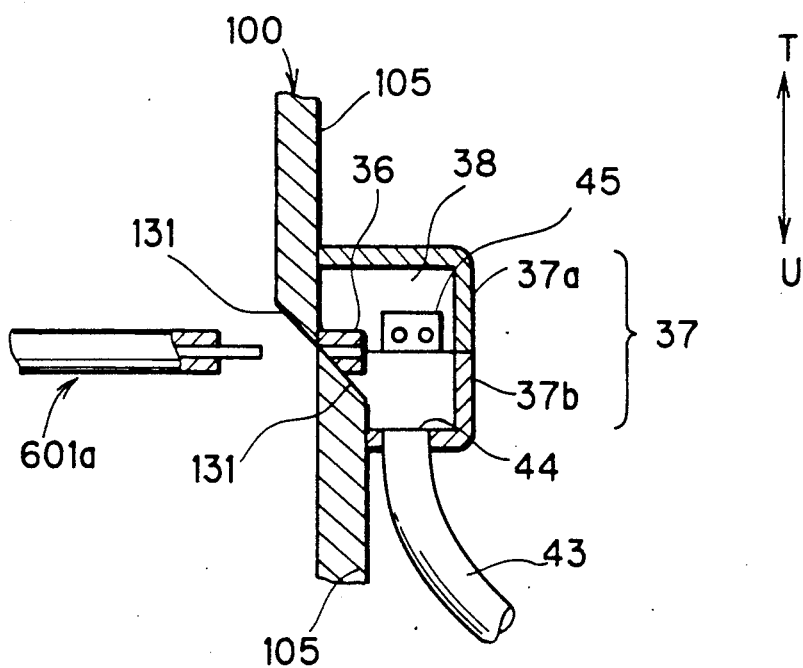
FIG. 32 is a sectional view thereof.

As shown in FIG. 31, the scrap removing means comprises a closed space forming member 37 consisting of a pair of elastic covers 37a, 37b, an air blow pipe 42, a discharging pipe 43 and an air blowing means (not shown). The elastic covers 37a, 37ba are fixed to each one side of the respective cutters 105 and elastically come into contact to mate with each other when the cutters 105 are moved to the closed position so that an almost perfect closed space 38 can be formed as shown in FIG. 32. The lower cover 37b is provided with an opening 44 to which one end of the discharging pipe 43 is connected. The upper cover 37a is provided with an opening 45 to which one end of the air blow pipe 42 is connected. The other end of the air blow pipe 42 is connected to the air blowing means. Thus, the air blow pipe 42 and the opening 45 connect the closed space 38 and the air blowing means, so that the scraps 36 within the closed space 38 are blown with the air supplied through the air blow pipe 42 and the opening 45 and removed and collected through the opening 44 and the discharging pipe 43.

(2) Scrap Removing Process

Now the operation of the embodiment will be described. Similarly to the eighth and ninth embodiments, wire feeding and cutting processes are performed to form the remaining wires 601a, 601b and the cut-off wires 602a, 602b, and thereafter the first stripping process is performed. Then, the cutters 105 are moved to the closed position immediately after the stripping process. At this time, the elastic covers 37a, 37b are moved together with the cutters 105, so that the closed space 38 is formed with the elastic covers 37a, 37b and the cutters 105, to thereby enclose the covering 36 stripped in the stripping process, as shown in FIG. 32.

After that, the air blowing means is driven by a control means, so that scraps kept within the closed space 38 are blown with the air supplied through the air blow pipe 42 and the opening 45 and further removed and collected through the opening 44 and the discharging pipe 43 (Scrap removing process).

Then, similarly to the first embodiment, a terminal is attached to the stripped end of the remaining wire 601a and then the remaining wire 601a is moved back to the cutting position while the cut-of wire is subjected to the second stripping, the second terminal attaching and discharging process.

(3) Effects

As previously mentioned, the perfect closed space 38 is formed with the cutters 105 and the elastic covers 37a, 37b immediately after the stripping process, and thereafter scraps are blown with the supplied air, so that they can be removed and collected. Thus, the scraps of the stripped covering are removed away from the closed space 38 and collected to a scrap removing apparatus. Consequently, scattering of the scraps to the wire cutting means 100 or its peripheral means can be avoided, and trouble on the machine can be prevented.

I-4. Other Advantages

In the above embodiment, the respective cutters 105 are provided with the elastic covers 37a, 37b, which are components of the closed space forming member 37 and cooperate with the cutters 105 to mate with each other. The elastic covers 37a, 37b are not necessarily fixed to the cutters 105. It is possible, for example, that the elastic covers 37a, 37b are formed independently of the cutters 105 and provided with driving means (not shown) for driving each of them so that they are driven to mate with each other and form the closed space 38 together with the cutters 105.

No reference has been made about the other end of the discharging pipe 43 in the tenth embodiment, but a sucking means may be connected to the other end of the discharging pipe 43, similarly to the eighth and ninth embodiments. This enhances scrap removing and collecting capability compared with the tenth embodiment.

J. Eleventh and Twelfth Embodiments

Although any method of feeding wires from the wire drawing means 800 to the wire feeding means 50 has not previously described, a sixth control means can be applied to the harness producing apparatus A instead of the first control means. The sixth control means operates as follows, whereby the wires 600a, 600b are fed to the wire feeding means 50 without giving tension to the wire.

A harness producing apparatus J has the same construction except control means. In this apparatus, the feeding rollers 65 of the wire feeding means 50 feeds the covered wires 600a, 600b to the wire cutting means 100 in FIG. 1A in a constant speed V, referred to as feeding speed below, in a time $T_1$. Then, the above sequential processes consisting of the cutting, stripping and terminal attaching processes are carried out to the wires 600a, 600b in a time $T_2$. That is, in an operation cycle of a time $T$ ($=T_1+T_2$), the apparatus performs the above processes repeatedly, whereby correspondingly produced are harnesses which are processed by the predetermined steps and has a length l ($=V \cdot T_1$).

Figure 33:
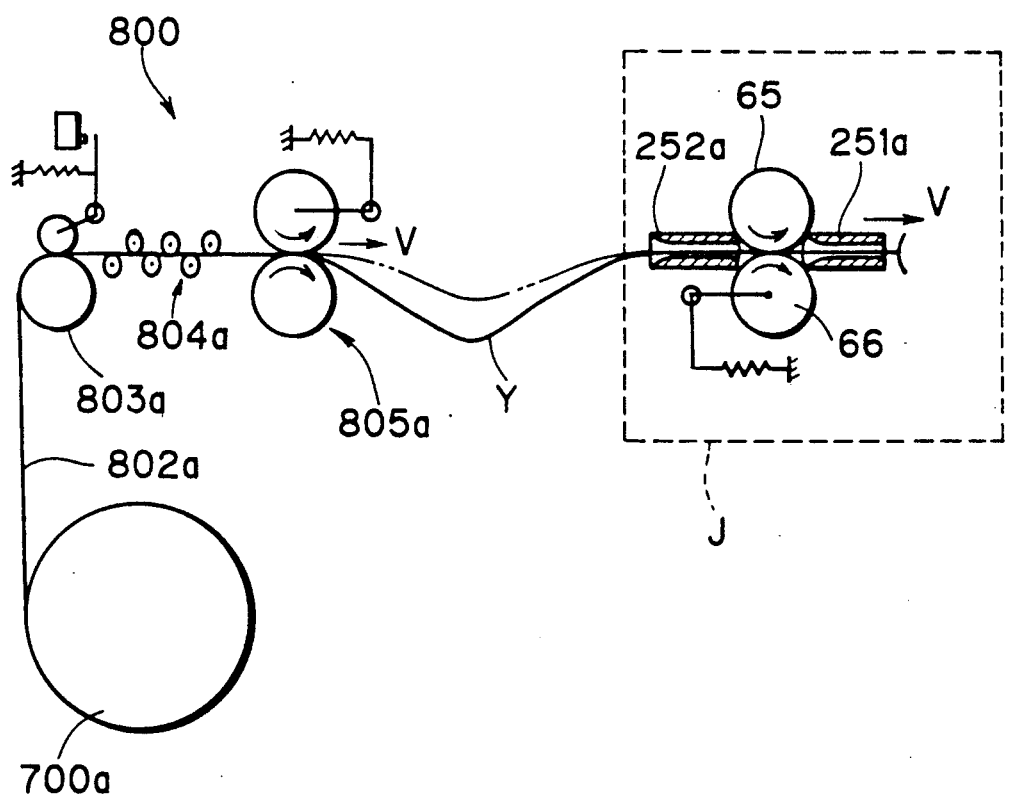
FIG. 33 is a schematic view showing an embodiment of a wire drawing means.

FIG. 33 is a schematic view showing the wire feeding drawing means 800. For the convenience of explanation, FIG. 33 shows only the construction related to the covered wire 600a. The construction and the operation of the covered wire 600a will be described in the following. However, description related to the covered wire 600b is omitted because it is the same as that related to the wire 600a.

As shown in FIG. 33, the wire drawing means 800 consists of guide rollers 803a, a group of straightening rollers 804a and pre-feeding rollers 805a. The wire 600a taken-up by the stock roll 700a is fed through the guide roller 803a to the straightening rollers 804a which is disposed in zig-zag manner. After straightened by the rollers 804a, the wire 600a is fed to the harness producing apparatus A by a pair of the pre-feeding rollers 805a.

J-1. Eleventh Embodiment (1) Operation of the eleventh embodiment

Figure 34A:
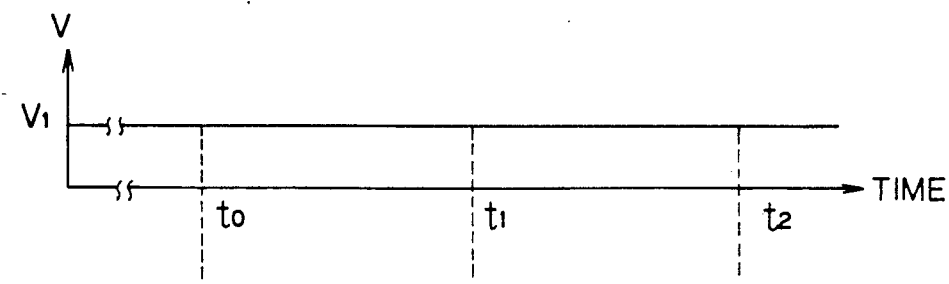
FIGS. 34 to 37 are explanatory views showing an operational principle of the wire drawing means, respectively.
Figure 35A:
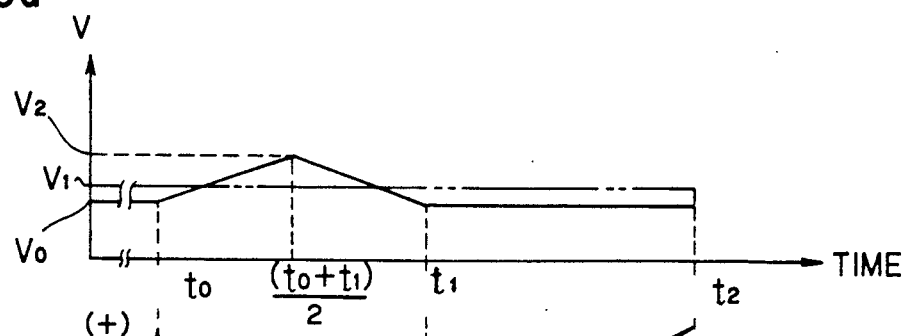

The feeding speed v, referred to as pre-feeding speed below, in which the wire is fed from the wire drawing means 800 to the harness producing apparatus J is controlled as follows; the wire drawing means 800 has two patterns of speed control. One of the speed control patterns, referred to as "a first pattern" below, is shown in FIG. 34(a). According to this pattern, the wire 600a is fed from the wire drawing means 800 to the harness producing apparatus J in a constant speed $v_1$ ($=l/T$) in spite of operating condition of the harness producing apparatus. According to the other speed pattern, referred to as "a second pattern", is shown in FIG. 35(a), whereby the pre-feeding speed v is controlled to change.

Figure 36A:
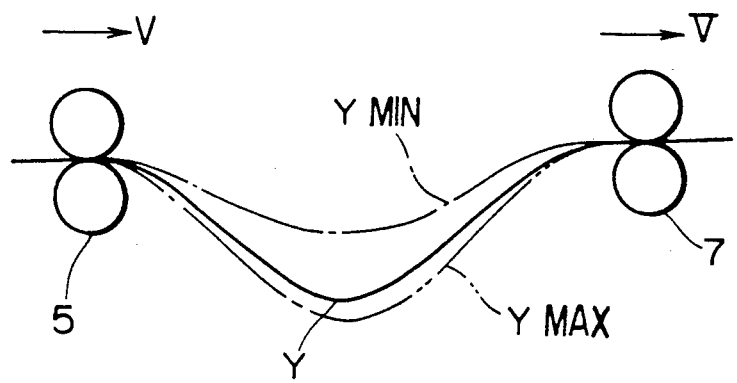
Figure 36B:
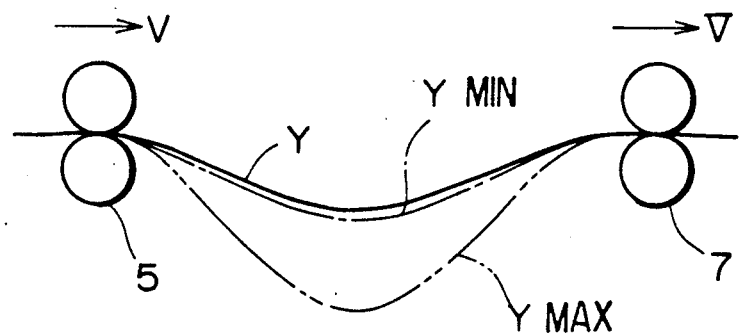

These speed control patterns are selected by the CPU of the sixth control means, not shown, depending on the following condition: The wire drawing means 800 is operated in the first pattern, when the control means judged that a slack portion Y of the wire 600a between the wire drawing means 800 (pre-feeding rollers 805a) and the harness producing apparatus J is within a range between a maximum condition $Y_{max}$ and a minimum condition $Y_{min}$ of the wire slack as shown in FIG. 36(a) at the length measuring starting time when the feeding rollers 65, 66 start feeding the wire 600a in the harness producing apparatus J and that the slack portion Y is being kept within the range between the maximum condition $Y_{max}$ and the minimum condition $Y_{min}$ of the wire slack during one operational cycle of the harness producing apparatus A in the pre-feeding speed v calculated with the following formula:

$$v = l/T \qquad (1)$$

meanwhile, the wire drawing means 800 is operated in the second pattern when the controlled means judged that the slack portion Y is or is going to be out of the above condition. For example, when the slack amount of the portion Y is smaller than the minimum amount of the slack condition $Y_{min}$ as shown in FIG. 36(b), the pre-feeding speed v is controlled to change in order to make the portion Y go into the range between the maximum condition $Y_{max}$ and the minimum condition $Y_{min}$ of the slack.

As described above, whether the pre-feeding speed v is controlled with the first pattern or the second pattern, is judged on the basis of a time T and length l which are predetermined with functional characteristics and the like of the harness producing apparatus J and the maximum and minimum slack conditions $Y_{max}$ and $Y_{min}$ which are predetermined with the size of the harness producing apparatus J and the wire drawing apparatus 800. Then, the pre-feeding speed v is controlled with the pattern selected. Therefore, the slack portion Y is always kept within the range between the maximum condition $Y_{max}$ and the minimum condition $Y_{min}$ of the wire slack, whereby any excessive tension is not applied to the wire 600a. Further, the pre-feeding speed v is not or hardly changed, so that the pre-feeding rollers 805a does not apply any excessive tension to the wire 600a.

Each example of controlling the pre-feeding roller 805a depending on the first and second patterns will be described in detail. Initial condition is set as follows:

1) The slack portion Y of the wire has a slack amount $l_{max}$ in the maximum condition $Y_{max}$ at the time (time $t=t_0$) when the feeding rollers 65, 66 start feeding the wire.

2) The slack portion Y has a slack amount $l_{min}$ in the minimum condition $Y_{min}$.

Figure 34B:
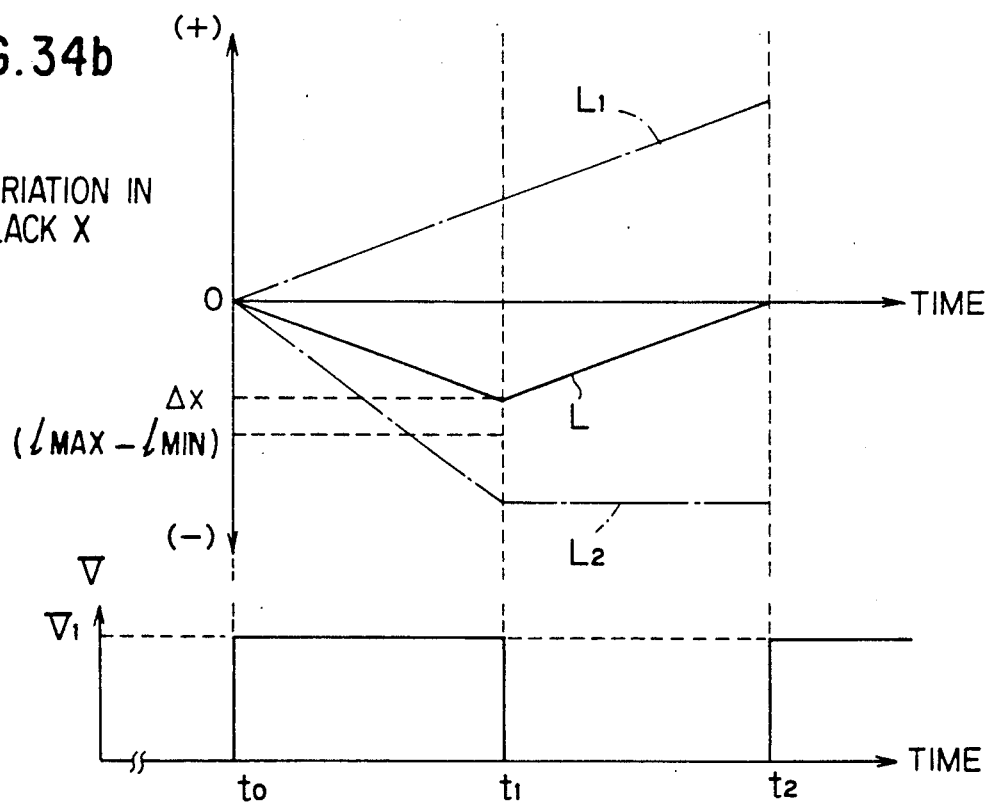
Figure 34C:
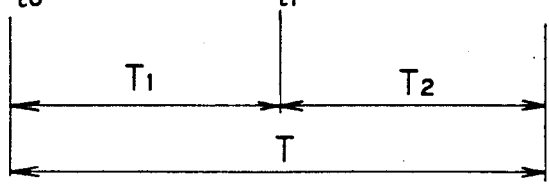

FIG. 34 shows an example of controlling the pre-feeding rollers 805a with the first pattern. In FIG. 34(a), pre-feeding speed v is held at a constant speed $v_1$ (=1/T). Assuming that there are not the feeding rollers 65, 66 feeding the wire, slack variation x of the slack portion Y which is 0 at time $t_0$ and increases in a gradient $v_1$ as time passes, as shown with a dash-dot line $L_1$ in FIG. 34(b). The feeding speed V, as shown in FIG. 34(c), is held at a constant speed $V_1$ from time $t_0$ to time $t_1$ (=$t_0+T_1$) and at zero speed from time $t_1$ to time $t_2$ (=$t_1+T_2$). Therefore, assuming that there are not the pre-feeding rollers 805a feeding the wire, the slack variation x decreases in a gradient $V_1$ from time $t_0$ to time $t_1$ as time passes, and then it is held in a constant value from $t_1$ to time $t_2$. Accordingly, an apparent variation in slack x of the wire 600a varies as shown with a line L in FIG. 34(b). According to the line L, the variation of slack x decreases in a gradient $|v_1-V_1|$ from time $t_0$ to time $t_1$, increases in the gradient $v_1$ from time $t_1$ to time $t_2$ and becomes zero at time $t_2$. In other words, as can be understood with the solid line L in FIG. 34(b), the slack amount of the slack portion Y decreases as time passes to come at the maximum at time $t_1$ and thereafter increases to come at the maximum condition $Y_{max}$ at time $t_2$ in a range of time T (=$T_1+T_2$). Since the absolute value of the slack variation $\Delta x$, which is a decreasing amount at time $t_1$, is smaller than $|l_{max}-l_{min}|$ as shown in FIG. 34(b), the slack portion Y is kept within the range between the maximum and minimum slack conditions $Y_{max}$, $Y_{min}$. That is, while the slack condition of the slack portion Y is being kept in the range between the maximum and minimum slack condition $Y_{max}$, $Y_{min}$, the wire 600a is fed intermittently to the harness producing apparatus J, so that no excessive tension is applied to the wire 600a. Since the pre-feeding speed v is constant, the wire 600a is fed in a wire feeding direction without giving a necessary tension to the wire 600a by the pre-feeding rollers 805a.

Figure 35B:
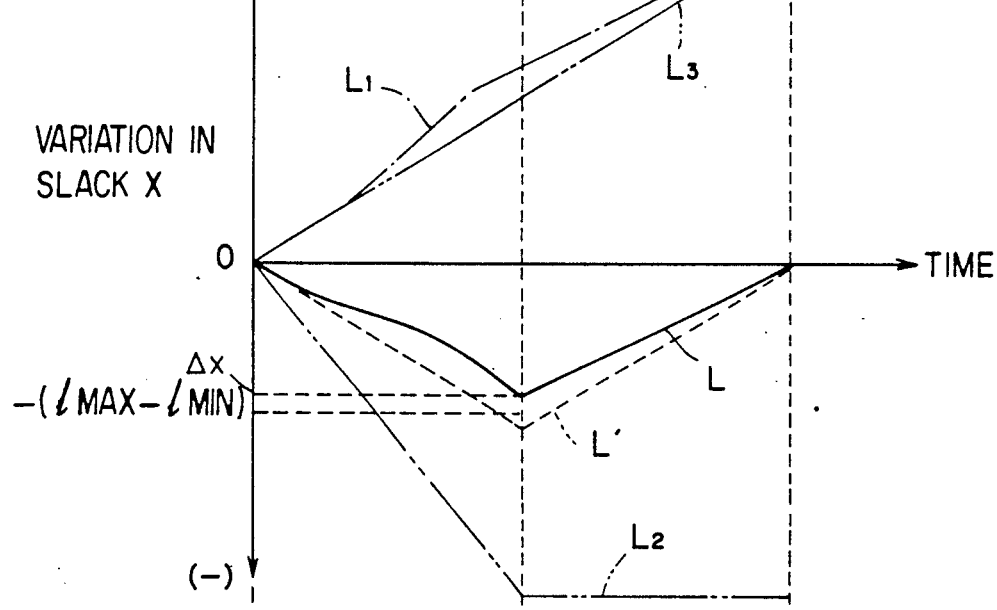
Figure 35C:
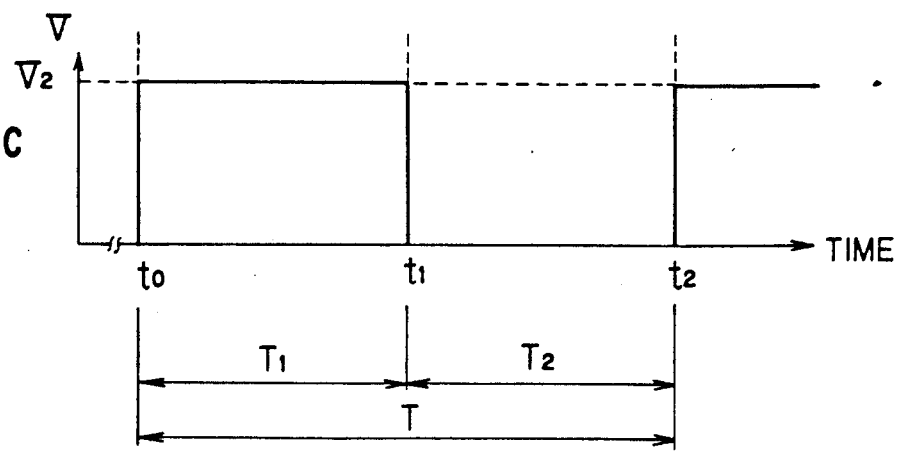

FIG. 35 shows an example in which the pre-feeding rollers 805a are controlled with the second pattern. Prior to describing the second pattern, the first pattern with which the pre-feeding rollers 805a are controlled will now be described. As shown with a dash-two dots line in FIG. 35(a), the pre-feeding speed v is a constant speed $v_1$ (=1/T), so that the variation of slack amount x increases in a gradient $v_1$ as time passes, as shown with a dash-two dots line in FIG. 35(b), when it is assumed that the feeding rollers 65, 66 do not feed the wire. The feeding speed V, as shown in FIG. 35(c), is a constant speed $V_2$ from time $t_0$ to $t_1$ and zero from time $t_1$ to time $t_2$, so that the slack variation x decreases in a gradient $V_2$ from time $t_0$ to $t_1$ as time passes and then is constant from time $t_1$ to $t_2$ as shown with a dash-two dots line in FIG. 35(b), when it is assumed that the pre-feeding rollers 805a does not feed the wire. As a result, an apparent variation of the slack changes as shown with a broken line L' in FIG. 35(b). Similar to the first pattern, the slack amount of the slack portion Y decreases from time $t_0$ to time $t_1$ to come at minimum at time $t_1$ and thereafter increases to come at the amount as it was at the beginning. However, the variation of the slack amount $\Delta x$ at time $t_1$ is different from that of the first pattern. That is, the absolute value of the variation $\Delta x$ which is a decreasing amount here, is larger than $|l_{max}-l_{min}|$ as shown in FIG. 35(b), while the absolute value of the first pattern is smaller than $|l_{max}-l_{min}|$ as shown in FIG. 34(b). Therefore, the slack amount of the slack portion Y might be smaller than that of the minimum condition $Y_{min}$ (FIG. 36(b)), so that an excessive tension is applied to the wire 600a so as to cause the above deficiency.

In this embodiment, when the slack portion Y may not be kept within the range between the maximum and minimum conditions $Y_{max}$, $Y_{min}$ with the constant speed $v_1$ (=1/T) of the pre-feeding speed v, the pre-feeding rollers 805a is controlled so that the pre-feeding speed v depends on the second pattern. That is, the pre-feeding speed is controlled at a speed as shown with a solid line in FIG. 35(a). Concretely, the pre-feeding speed v having a speed $v_0$ as an initial speed at time $t_0$ increases with a constant acceleration from time $t_0$ to time (($t_0+t_1$)/2) to come at the maximum speed $v_2$ at time (($t_0+t_1$)/2) and thereafter decreases with a constant acceleration until time $t_1$ to become the initial speed $v_0$ again. Furthermore, the pre-feeding speed v is a constant speed $v_0$ from time $t_1$ to time $t_2$. In the above control, in order to make a variation, or an acceleration, of the pre-feeding speed v as small as possible, the values of the speed $v_0$, $v_2$ are calculated as follows: each speed $v_0$, $v_2$ is so defined that the slack portion Y becomes the minimum slack condition $Y_{min}$ at time $t_1$, it increases gradually from time $t_1$ to time $t_2$ and then becomes the condition as it was at the beginning (=the maximum slack condition $Y_{max}$) at time $t_2$. The speed $v_0$ is calculate with the following formula:

$$v_0 = (l_{max} - l_{min})/(t_2 - t_1) \qquad (2)$$
$$= (l_{max} - l_{min})/T_2$$

The speed $v_2$ is set to satisfy the following formulae:

$$\left.\begin{array}{l} l = 2 \cdot S_1 + S_2 \\ S_1 = ((v_0 + v_2) \cdot (T_1/2))/2 \\ S_2 = v_0 \cdot T_2 \end{array}\right\} \qquad (3)$$

Therefore, assuming that the feeding roller 65, 66 does not feed the wire, the variation in slack x increases as time passes, as shown with a dash-dot line $L_1$ in FIG. 35(b). However, as can be understood from the comparation between the dash-dot line $L_1$ and a dash-three dots line $L_3$ in FIG. 35(b), the increase of the second pattern is different from that of the first pattern. Further, the variation in slack of the second pattern at time $t_1$, which is a decreasing amount, is larger than that of the first pattern. Since the feeding speed V is always constant in spite of controlling the pre-feeding speed v by the first pattern or the second pattern, the variation in slack x changes as shown with a dash-two dots line $L_2$ similar to the above when it is assumed that the pre-feeding rollers 805a do not feed the wire. Therefore, the apparent variation in slack x of the wire 600a changes as shown with a solid line L in FIG. 35(b). As can be recognized in FIG. 35(b), the slack amount of the slack portion Y decreases as time passes in time T (=$T_1+T_2$) to come at the minimum condition $Y_{min}$ at time $t_1$ and thereafter increases as time passes to become the condition as it was at the beginning, or the maximum slack condition $Y_{max}$). Therefore, the wire 600a is always fed to the harness producing apparatus J within the range between the maximum and minimum conditions $Y_{max}$, $Y_{min}$, so that any excessive tension is not applied to the wire 600a. Further, since the pre-feeding speed v is so controlled that the variation of the speed is as small as possible, as shown with the solid line in FIG. 35(a), the wire 600a is transferred in the wire feeding direction without giving the wire 600a any unnecessary tension by the pre-feeding rollers 805a.

Figure 37A:
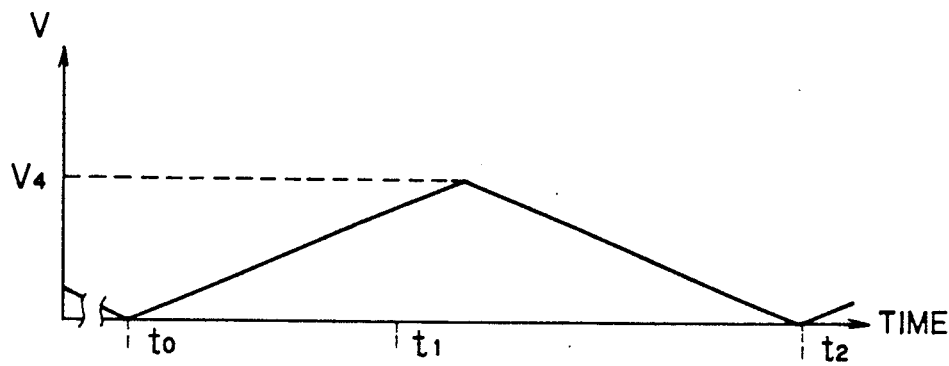
Figure 37B:
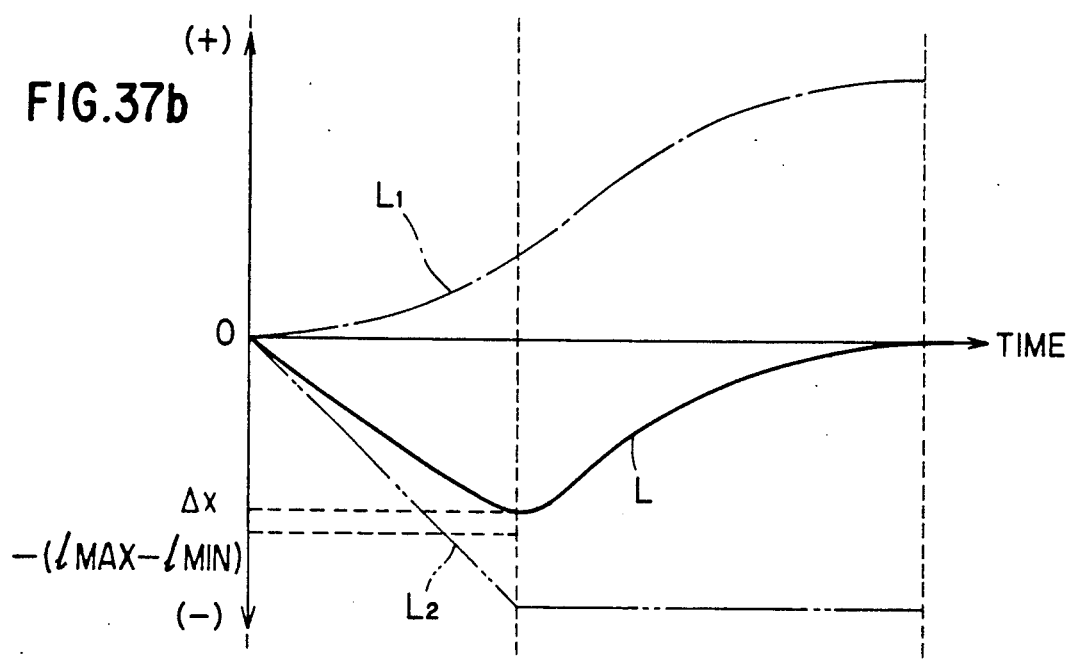
Figure 37C:
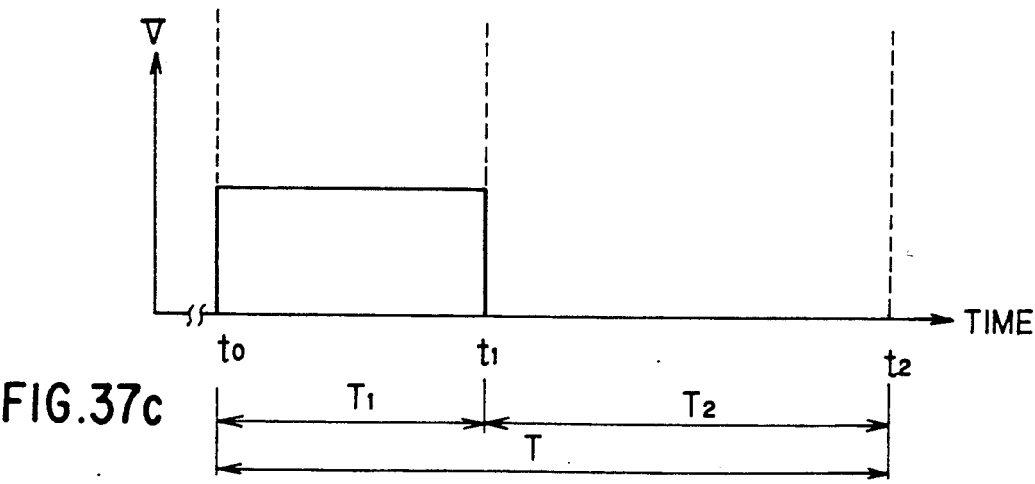

Needless to say, the second pattern is not limited to that shown with the solid line in FIG. 35(a). The second pattern can be defined as, for example, in FIG. 37(a). Consequently, the second pattern can be so arranged that when the slack portion Y is not kept within the range between the maximum and minimum conditions $Y_{max}$, $Y_{min}$, the feeding amount of the wire 600a from the pre-feeding rollers 805a to the harness producing apparatus J becomes the length l and the slack portion Y kept within the above stated range by the time $(T_1+T_2)$, where the pre-feeding speed v is a constant speed (l/T).

(2) Detailed Description of Operation of Eleventh Embodiment

Figure 38:
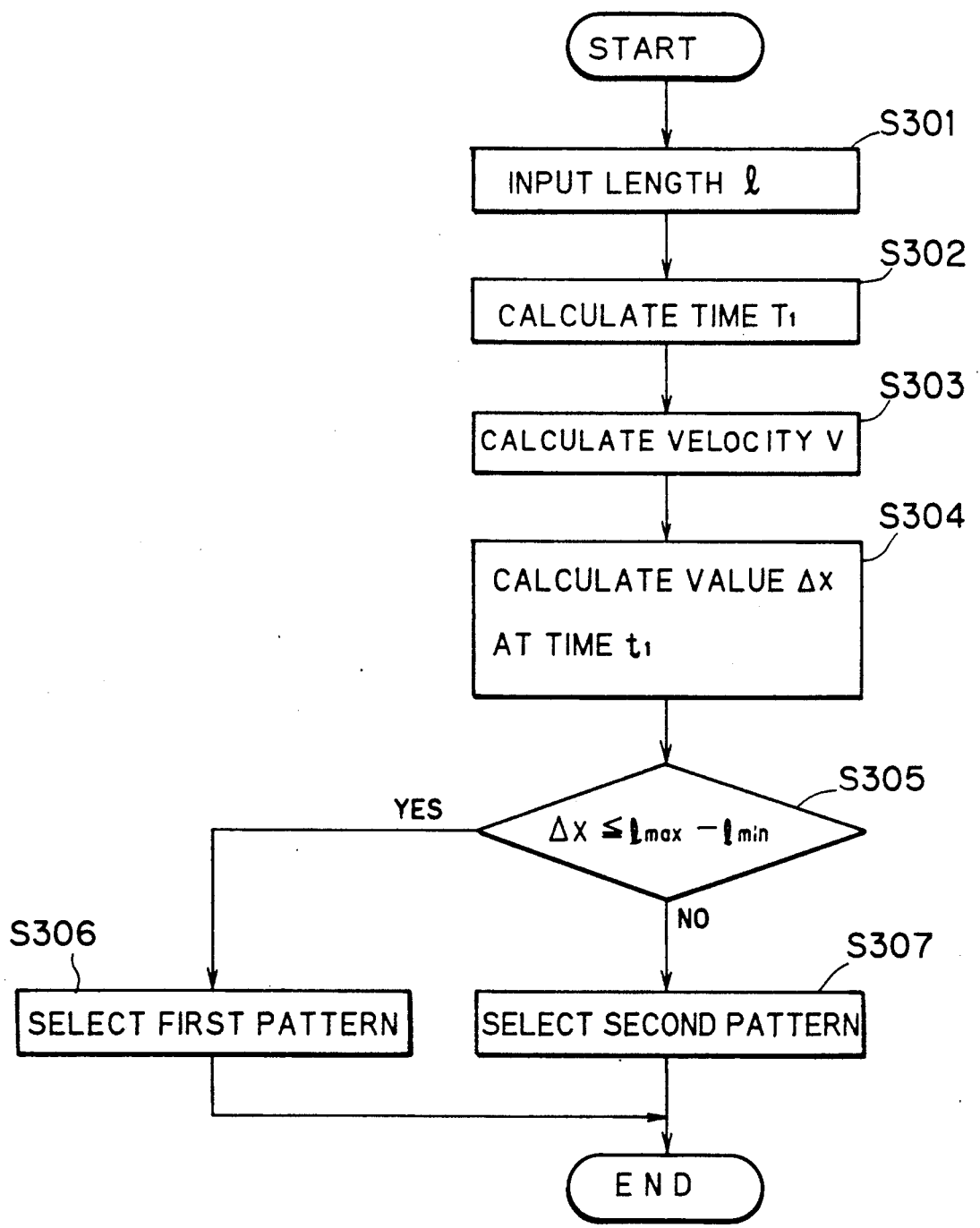
FIG. 38 is a flowchart showing an operation of the wire drawing means of FIG. 33.

FIG. 38 is a flowchart showing an operation of the wire drawing means 800 depending on the above fundamental operation. Prior to starting the operaion of the harness producing apparatus J and driving the pre-feeding rollers 805a, slack amounts $l_{max}$, $l_{min}$ of the maximum and minimum slack conditions $Y_{max}$, $Y_{min}$, feeding speed V and time $T_2$ are inputted by an operator through the operation element 900 as an initialization. And the slack amounts $l_{max}$, $l_{min}$, the feeding speed V and the time $T_2$ as initial data are stored in the memory 910. These data will be used as a part of information for judging whether pre-feeding rollers 805a is controlled with the first pattern or the second pattern as will be described.

After that, the operator inputs the value of length l in relation to the wire through the operation element 900 (Step S301). As the value of the length l is inputted, the following processes (Steps S302 to S307) are performed on the basis of commands ouputted from the CPU 430:

The time $T_1$ is calculated with the inputted length l, the feeding speed V stored in the memory 910 and the following formula:

$$T_1 = l/V \qquad (4)$$

(Step S302). Then, the speed v is calculated with the time $T_1$, $T_2$, the length l and the following formula $$v = l/(T_1+T_2) \qquad (5)$$

(Step S303). The variation $\Delta x$ at time $t_1$, referring to FIGS. 34 and 35, is calculated with the time $t_1$, the speeds v, V and the following formula $$x = V \cdot T_1 - v \cdot T_1 \qquad (6)$$

(Step S304).

At Step S305, the variation $\Delta x$ is compared with the difference between the maximum and minimum amounts $l_{max}$, $l_{min}$. If the following formula is satisfied, the first pattern is selected (Step S306):

$$\Delta x \leq l_{max} - l_{min} \qquad (7)$$

If the formula (7) is not satisfied, the second pattern is selected (Step S307).

As the harness producing apparatus J starts, the control member controls the pre-feeding rollers 805a depending upon the selected speed control pattern.

As described above, since either the first or second pattern is selected as an optimum control pattern to the pre-feeding speed v depending upon the length l and the like and the pre-feeding rollers 805a are controlled depending upon the selected pattern, the wire 600a is fed to the harness producing apparatus J with the slack portion Y kept within the range between the maximum and minimum conditions $Y_{max}$, $Y_{min}$. Further, since the pre-feeding speed v does not or hardly change, any excessive tension is not applied to the wire 600a.

Although it was assumed in the above description that the wire 600a does not skid at all when it is fed by the pre-feeding rollers 805a and the feeding rollers 65, 66, the skid may occur actually. In order to detect the skid, a limit switch for detecting the maximum slack condition $Y_{max}$ and/or a limit switch for detecting the minimum slack condition $Y_{min}$ can be applied. These limit switches can detect the skid of the wire 600a to cope with problems due to the skid. A limit switch, for example, for detecting the minimum slack condition $Y_{min}$ can detect the minimum slack condition $Y_{min}$. Then a signal from the limit switch is transmitted to the CPU 12 through the system bus 14. Depending upon the command from the CPU 12, the pre-feeding speed v increases in a certain range of time, and then the slack portion Y gets into the above range. Therefore, a pre-feeding rollers 805a and the feeding rollers 65, 66 do not feed the wire when the slack portion Y is out of the range between the maximum and minimum slack conditions $Y_{max}$, $Y_{min}$.

(3) Effects

As described above, since either the first or second pattern is selected as an optimum control pattern for the pre-feeding speed v depending upon the length l and the like and then the pre-feeding rollers 805a are controlled depending upon the selected pattern, the wire 600a is fed to the harness producing apparatus J always with the slack portion Y within a range between the maximum and minimum slack conditions $Y_{max}$, $Y_{min}$. Further, since the pre-feeding speed v does not or hardly changes, any excessive tension is not applied to the wire 600a.

J-2. Twelfth Embodiment (1) Brief Description of the Twelfth Embodiment

Case may be met with, which the pre-feeding rollers 805a cannot be controlled by above controlling method of the eleventh embodiment. In the case that the length l is very short or the time T is very long, it is difficult to drive the pre-feeding rollers 805a in the constant pre-feeding speed v (=l/T). In such a case, the following construction can be applied and the pre-feeding rollers 805a can be controlled depending upon a third pattern.

Figure 39:
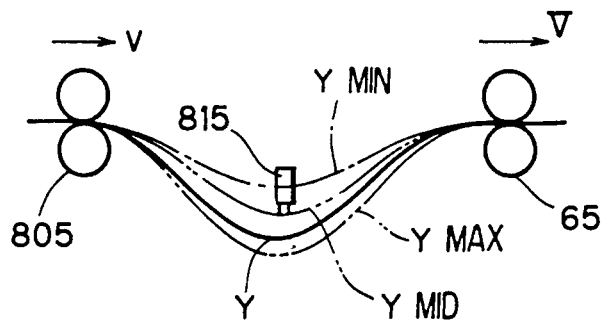
FIG. 39 is a schematic view showing another embodiment of the wire drawing means.

FIG. 39 is a schematic view showing another embodiment of the wire drawing means 800. This wire drawing means 800, as shown in FIG. 39, has a limit switch 815 activated by the wire 600a. This limit switch 815 detects the proper slack condition, referred to as "middle slack condition", $Y_{mid}$ in which the slack portion Y is within a range between the maximum slack condition $Y_{max}$ and the minimum slack condition $Y_{min}$. The other part of the construction is the same as that of the eleventh embodiment.

Now, referring to FIG. 40, the third pattern will be described. The initial condition is defined as follows:

1) The slack portion Y is in the maximum slack condition $Y_{max}$ and the slack amount is $l_{max}$ at the starting time (time $t=t_0$) of the wire feeding by the feeding rollers 65, 66.

2) The slack amount is $l_{min}$ in the minimum slack condition $Y_{min}$.

3) The slack amount is $l_{mid}$ in the middle slack condition $Y_{mid}$.

Figure 40A:
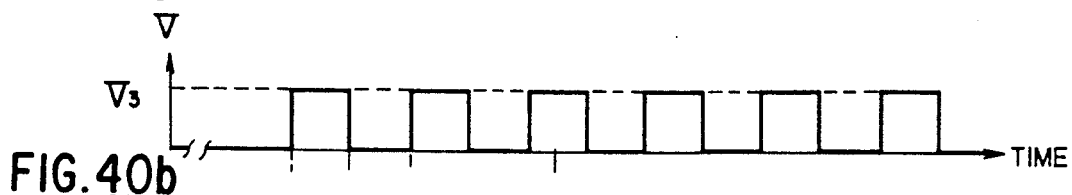
FIGS. 40A–40C are explanatory views showing an operation of the wire drawing means of FIG. 39.
Figure 40B:

The feeding speed V is set as a constant speed $V_3$ in time $T_1$ (for example, from time $t_0$ to $t_1$) and zero in time $T_2$ (for example, from time $t_1$ to $t_2$) as shown in FIG. 40(a). Therefore, the slack amount of the slack portion Y decreases while the feeding rollers 65, 66 operate, to thereby decreases gradually as time passes. Then, at a time $t_3$, the wire 600a pushes the limit switch 815, so that it is detected that the slack portion Y turns into the middle slack condition $Y_{mid}$ (FIG. 40(b)).

Figure 40C:
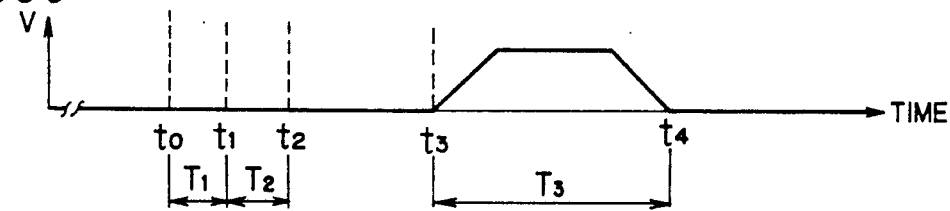

When the middle slack condition $Y_{mid}$ is detected by the limit switch 815, a speed change control on the pre-feeding speed v is carried out as shown in FIG. 40(c) and then the slack portion Y becomes in the condition as it was for the maximum slack condition $Y_{max}$, at time $t_4$. That is, the third pattern is set so that the wire 600a is fed from the pre-feeding rollers 805a to the harness producing apparatus J in time $T_3(=2\cdot(T_1+T_2))$ by the predetermined length l' calculated as follows:

$$l' = (l_{max} - l_{mid}) + 2 \cdot l \qquad (8)$$

where $l = V_3 \cdot T_1$. Immediately after the pre-feeding rollers 805a are driven, the pre-feeding speed v is very small and smaller than the feeding speed V. Therefore, the slack portion Y becomes out of the middle slack condition $Y_{mid}$ and the slack portion Y decreases for a while. However, there is no problem as long as the slack portion Y comes into the minimum slack condition $Y_{min}$. Accordingly, the medium slack condition $Y_{mid}$ may be properly set. Although the third pattern as an example is shown in FIG. 40(c), the third pattern is not limited by that.

(2) Operation

Figure 41:
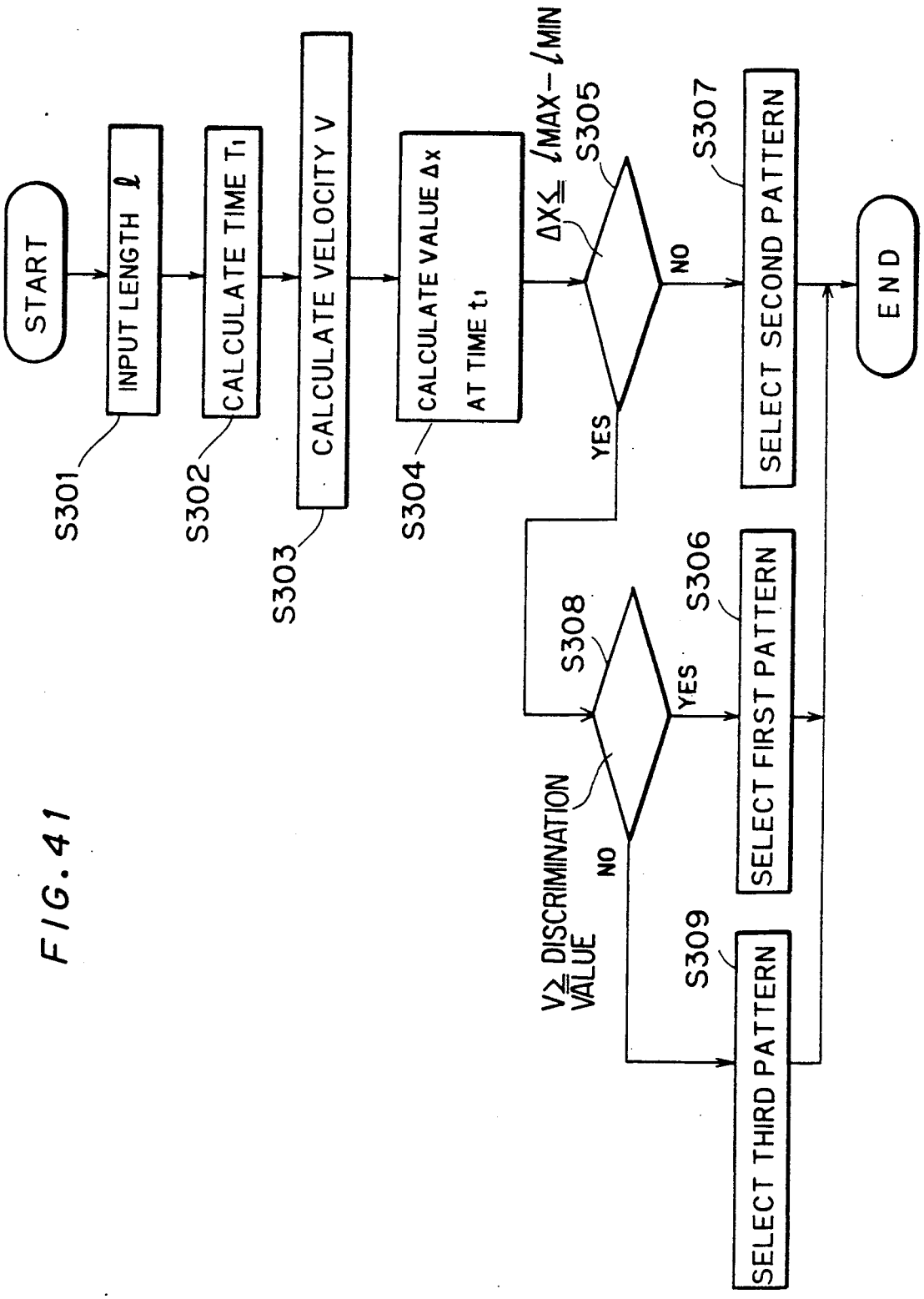
FIG. 41 is a flowchart showing an operation of the wire drawing means.

Now, an operation of the wire drawing means 800 will be described with reference to FIG. 41. As shown in FIG. 41, Steps S301 to S305 are the same as those in the eleventh embodiment. In the variation $\Delta x$ does not satisfy the formula (6) at Step S305, the second pattern is selected (Step S307). Then, as the harness producing apparatus J starts, the control means controls the pre-feeding rollers 805a with the second pattern. Meanwhile, if the variation $\Delta x$ satisfies the formula (6), the CPU 930 judges whether the pre-feeding rollers 805a can be driven in a constant pre-feeding speed v $(=l/T)$ at Step S308. That is, the speed v $(=l/T)$ is compared with the judging value stored in the memory 910 in advance. If the speed v is larger than the judging value, the CPU 930 judges that the pre-feeding rollers 805a can be driven in the constant pre-feeding speed v $(=l/T)$, and the first pattern is selected (Step S306). Then, as the harness producing apparatus J starts, the control means controls the pre-feeding rollers 805a depending upon the first pattern. If the speed v is smaller, the CPU 930 judges that the pre-feeding rollers 805a can not be driven in the constant pre-feeding speed v $(=l/T)$ and the third pattern is selected (Step S309). Then, as the harness producing apparatus J starts, the control means controls the pre-feeding rollers 805a depending upon the third pattern.

(3) Effects

As described above, since the apparatus has the limit switch 815 for detecting that the slack portion Y is in the middle slack condition $Y_{mid}$, the first, the second or the third pattern is selected as an optimum control pattern for the pre-feeding speed v with the length l and the like, and the pre-feeding rollers 805a are controlled with the selected pattern, the same effects as of the eleventh embodiment can be obtained even when the wire feeding length l is very short.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A harness producing apparatus for cutting a wire having a core covered with a covering, stripping the covering from a cut end portion of the wire and attaching a terminal to the stripped end portion of the core, comprising:

(a) means for intermittently feeding said wire in a wire feeding direction;

(b) means having first and second cutters disposed opposite to each other, for nipping and cutting off said wire and cutting into said covering with the first and second cutters;

(c) means for attaching said terminal to the stripped end portion of the core;

(d) means for holding and moving said wire, said holding and moving means including (d-1) means for holding said wire at a holding position which is adjacent to a cutting position at which said wire is cut off by said cutting means and which is upstream of the cutting portion in the wire feeding direction, and (d-2) means for moving said holding means three-dimensionally so that said wire held by said holding means is movable between said terminal attaching means and a wire feeding line along which said wire is fed by said wire feeding means;

(e) means for driving said wire feeding means, said cutting means, said terminal attaching means and said holding and moving means, respectively;

(f) means for inputting command and information; and (g) means for controlling said driving means by applying drive control signals to said driving means on the basis of the command and information inputted through said inputting means, said controlling means including (g-1) means for performing a cutting process in which said wire is fed by said wire feeding means, and cut off by said cutting means while being held by said holding and moving means, (g-2) means for performing a stripping process in which, after said cutting process, said wire is moved by a prescribed amount in the wire feeding direction by said holding and moving means, said covering is cut into with said cutters, and said wire is moved in the reverse direction to the wire feeding direction by said holding and moving means with said cutters into, whereby an end portion of said covering is stripped from said wire, and (g-3) means for performing a terminal attaching process in which, after said stripping process, said stripped portion of said wire is moved to said terminal attaching means by said holding and moving means and said terminal is attached to the stripped portion by said terminal attaching means.

2. A harness producing apparatus for cutting a wire having a core covered with a covering to divide into a remaining wire and a cut-off wire, stripping the covering from a cut end portion of the remaining wire, stripping the covering from a cut end portion of the cut-off wire, attaching a terminal to a stripped portion of the core of the remaining wire and attaching a terminal to a stripped portion of the core of the cut-off wire, comprising:

(a) means for intermittently feeding said wire in a wire feeding direction;

(b) means having first and second cutters disposed opposite to each other, for nipping and cutting off said wire to divide into said remaining and cut-off wires and cutting into said covering with said first and second cutters;

(c) first terminal attaching means for attaching said terminal to said stripped portion of said core of said remaining wire;

(d) second terminal attaching means for attaching said terminal to said stripped portion of said core of said cut-off wire;

(e) first holding and moving means for holding and moving said wire, said first holding and moving means including (e-1) first holding means for holding said remaining wire at a first holding position which is adjacent to a cutting position at which said wire is cut off by said cutting means and which is upstream of the cutting position in the wire feeding direction, and (e-2) first moving means for moving said first holding means three-dimensionally so that said remaining wire held by said first holding means is movable between said first terminal attaching means and a wire feeding line along which said wire is fed by said wire feeding means;

(f) second holding and moving means for holding and moving said wire, said second holding and moving means including (f-1) second holding means for holding said cut-off wire at a second holding position which is adjacent to the cutting position and which is downstream of the cutting position in the wire feeding direction, and (f-2) second moving means for moving said second holding means three-dimensionally so that said cut-off wire held by said second holding means is movable between said second terminal attaching means and the wire feeding line;

(g) means for discharging said cut-off wire having said terminal attached to said stripped portion of said core;

(h) means for driving said wire feeding means, said cutting means, said first and second terminal attaching means, said first and second holding and moving means and said discharging means, respectively;

(i) means for inputting command and information; and (j) means for controlling said driving means by applying drive control signals to said driving means on the basis of said command and information inputted through said inputting means, said controlling means including (j-1) means for performing a cutting process in which said wire is fed by said wire feeding means and cut off by said wire cutting means to divide into said remaining and cut-off wires while being held by said first and second holding and moving means, (j-2) means for performing a first stripping process in which, after said cutting process, said remaining wire is moved by a prescribed amount in the wire feeding direction by said first holding and moving means, said covering of said remaining wire is cut into with said cutters and said wire is moved in the reverse direction to the wire feeding direction by said first holding and moving means as said cutters are cut into said convering, whereby an end portion of said covering is stripped from said remaining wire, (j-3) means for performing a second stripping process in which, after said cutting process, said cut-off wire is moved by a prescribed amount in the wire feeding direction by said second holding and moving means, said covering of said cut-off wire is cut into with said cutters and said cut-off wire is moved in the wire feeding direction by said second holding and moving means as said cutters are cut into said convering, whereby an end portion of said covering is stripped from said cut-off wire, (j-4) means for performing a first terminal attaching process in which, after said first stripping process, said stripped portion of said remaining wire is moved to said first terminal attaching means by said first holding and moving means and said terminal is attached to the stripped portion of said remaining wire by said first terminal attaching means, (j-5) means for performing a second terminal attaching process in which, after said second stripping process, said stripped portion of said cut-off wire is moved to said second terminal attaching means by said second holding and moving means and said terminal is attached to the stripped portion of said cut-off wire by said second terminal attaching means, and (j-6) means for performing a discharging process in which, after said second terminal attaching process, said cut-off wire is released from said second holding and moving means and discharged by said discharging means.

3. A harness producing apparatus according to claim 2, wherein said controlling means further includes means for simultaneously performing said first and second stripping process.

4. A harness producing apparatus according to claim 2, wherein said controlling means further includes means for successively changing the cutting position in said cutting process by deviating the respective first and second holding positions of said remaining and cut-off wires held by said first and second holding means in a direction perpendicular to the wire feeding direction in each cutting.

5. A harness producing apparatus according to claim 1 or 2, wherein said wire cutting means further includes:

(b-1) a body;

(b-2) first and second cutter holding means for holding said first and second cutters, respectively;

(b-3) first and second guide means fixed to said body for guiding the movement of said first and second cutter holding means so that said first and second cutters can come in contact with and apart from each other, respectively;

(b-4) a first mechanism including a first shaft rotatably supported by said body, a first spindle-like member attached to one end of said first shaft eccentrically to the axis of said first shaft and a first lever having one end rotatably connected to said first spindle-like member and the other end rotatably connected to said first cutter holding means, for converting the rotation of said first shaft into a linear movement of said first cutter; and (b-5) a second mechanism including a second shaft rotatably supported by said body, a second spindle-like member attached to one end of said second shaft eccentrically to the axis of said second shaft and a second lever having one end rotatably connected to said second spindle-like member and the other end rotatably connected to said second cutter holding means, for converting the rotation of said second shaft into a linear movement of said second cutter; and said driving means further includes means for rotating said first and second shafts about the axes.

6. A harness producing apparatus according to claim 1 or 2, wherein said wire cutting means further includes:

(b-1) a body;

(b-2) first and second cutter holding means for holding said first and second cutters, respectively;

(b-3) first and second guide means fixed to said body for guiding the movement of said first and second cutter holding means so that said first and second cutters can come in contact with and far from each other, respectively;

(b-4) a ball thread which has one end provided with a first screw portion and the other end provided with a second screw portion threaded reverse to said first screw portion, and which is placed parallel to a direction in which said cutters move and is supported by said body rotatably about the axis, (b-5) a first ball thread bracket connected to said first cutter holding means and engaged with said first screw portion of said ball thread, and (b-6) a second ball thread bracket connected to said second cutter holding means and engaged with said second screw potion of said ball thread; and said driving means further includes means for rotating said ball thread about the axis thereof.

7. A harness producing apparatus according to claim 1, wherein said respective first and second cutters includes a first cutting portion formed in linear shape for nipping and cutting off said wire and a second cutting portion formed in substantially V-shaped or U-shaped for nipping and cutting into said covering of said wire, said cutting process is performed with said first cutting portion of said first and second cutters, and said control means further includes means for, after said cutting process and before said stripping process, moving said wire by said holding and moving means from a position corresponding to said first cutting portion of said first and second cutters to a position corresponding to said second cutting portion.

8. A harness producing apparatus according to claim 2, wherein said respective first and second cutters includes a first cutting portion formed in linear shape for nipping and cutting off said wire and a second cutting portion formed in substantially V-shaped or U-shaped for nipping and cutting into said covering of said wire, said cutting process is performed with said first cutting portion of said first and second cutters, and said control means further includes means for, after said cutting process and before said first stripping process, moving said remaining wire by said first holding and moving means from a position corresponding to said first cutting portion of said first and second cutters to a position corresponding to said second cutting portion and means for, after said cutting process and before said second stripping process, moving said cut-off wire by said second holding and moving means from the position corresponding to said first cutting portion of said first and second cutters to the position corresponding to said second cutting portion.

9. A harness producing apparatus according to claim 1, further comprising:

(k) a memory for storing cutting depth control data concerning a cutting depth by which said covering of said wire is cut into with said first and second cutters, and (l) means for detecting a change in electrical characteristic between at least one of said first and second cutters and said core, wherein;

said control means further includes means for, on receiving a cutting depth setting command through said inputting means, controlling said drive means so that said covering is gradually cut into with said first and second cutters while causing said detecting means to detect a change in the electrical characteristic between said cutters and said core so as to decide an optimum cutting depth for said cutters on the basis of the cutting depth at rapid change in the electrical characteristic and to store it as said cutting depth control data into said memory, and said cutting depth by which said covering of said wire is cut into with said first and second cutters is controlled on the basis of said cutting depth control data read from said memory when said stripping process is performed.

10. A harness producing apparatus according to claim 2, further comprising:

(k) a memory for storing cutting depth control data concerning a cutting depth by which said covering of said wire is cut into with said first and second cutters, and (l) means for detecting a change in electrical characteristic between at least one of said first and second cutters and said core, wherein;

said control means further includes means for, on receiving a cutting depth setting command through said inputting means, controlling said drive means so that said covering is gradually cut into with said first and second cutters while causing said detecting means to detect a change in the electrical characteristic between said cutters and said core so as to decide an optimum cutting depth for said cutters on the basis of the cutting depth at rapid change in the electrical characteristic and to store it as said cutting depth control data into said memory, and said cutting depth by which said covering of said remaining wire is cut into with said first and second cutters is controlled on the basis of said cutting depth control data read from said memory when said first stripping process is performed, and said cutting depth by which said covering of said cut-off wire is cut into with said first and second cutters is controlled on the basis of said cutting depth control data read from said memory when said second stripping process is performed.

11. A harness producing apparatus according to claim 1, further comprising,
  (k) first and second cover members which are fixed to said first and second cutters, respectively, and which, when said covering of said wire is cut into with said first and second cutters, are arranged so as to be close to each other, to thereby form a closed space in coopration with said first and second cutters,
  (l) a suction pipe connected to at least one of said first and second cover members to open into said closed space, and
  (m) suction means connected to said suction pipe for sucking air of said closed space to make said closed space under a negative pressure, wherein;
  said control means further includes means for, after said stripping process, making said closed space under the negative pressure while remaining said cutters at the position in the completion of said stripping process, to thereby remove a piece of said covering stripped from said wire in said stripping process through said suction pipe.

12. A harness producing apparatus according to claim 2, further comprising,
  (k) first and second cover members which are fixed to each one side of said first and second cutters, respectively, and which, when said covering of said wire is cut into with said first and second cutters, are arranged so as to be close to each other, to thereby form a first closed space in coopration with said first and second cutters
  (l) a first suction pipe connected to at least one of said first and second cover members to open into said first closed space,
  (m) first suction means connected to said first suction pipe for sucking air of said first closed space to make said first closed space under a negative pressure,
  (n) third and fourth cover members which are fixed to the other sides of said first and second cutters, respectively, and which, when said covering of said wire is cut into with said first and second cutters, are arranged so as to be close to each other, to thereby form a second closed space in coopration with said first and second cutters,
  (o) a second suction pipe connected to at least one of said third and fourth cover members to open into said second closed space, and
  (p) second suction means connected to said second suction pipe for sucking air of said second closed space to make said second closed space under a negative pressure, wherein;
  said control means further includes means for, after said first stripping process, making said first closed space be under the negative pressure while remaining said cutters at the position in the completion of said first stripping process, to thereby remove a piece of said covering stripped from said remaining wire in said first stripping process through said first suction pipe, and means for, after said second stripping process, making said second closed space be under the negative pressure while remaining said cutters at the position in the completion of said second stripping process, to thereby remove a piece of said convering stripped from said cut-off wire in said second stripping process through said second suction pipe.

13. A harness producing apparatus according to claim 1, further comprising,
  (k) first and second cover members which are fixed to said first and second cutters, respectively, and which, when said covering of said wire is cut into with said first and second cutters, are arranged so as to be close to each other, to thereby form a closed space in coopration with said first and second cutters,
  (l) an opening formed in said first cover member to open into said closed space, for sucking air,
  (m) an suction pipe connected to said second cover member to open into said closed space, and
  (n) suction means connected to said suction pipe for sucking air of said closed space to make said closed space under a negative pressure, wherein;
  said control means further includes means for, after said stripping process, controlling said driving means so that said first and second cover members come in contact with each other and making said closed space be under the negative pressure, to thereby remove a piece of said covering stripped from said wire in said stripping process through said suction pipe.

14. A harness producing apparatus according to claim 2, further comprising,
  (k) first and second cover members which are fixed to each one side of said first and second cutters, respectively, and which, when said covering of said wire is cut into with said first and second cutters, are arranged so as to be close to each other, to thereby form a first closed space in coopration with said first and second cutters,
  (l) a first opening formed in said first cover member to open into said first closed space, for sucking air,
  (m) a first suction pipe connected to said second cover member to open into said first closed space,
  (n) first suction means connected to said first suction pipe for sucking air of said first closed space to make said first closed space under a negative pressure,
  (o) third and fourth cover members which are fixed to the other sides of said first and second cutters, respectively, and which, when said covering of said wire is cut into with said first and second cutters, are arranged so as to be close to each other, to thereby form a second closed space in coopration with said third and fourth cutters,
  (p) a second opening formed in said third cover member to open into said second closed space, for sucking air,
  (q) a second suction pipe connected to said fourth cover member to open into said second closed space, and
  (r) second suction means connected to said second suction pipe for sucking air of said second closed space to make said second closed space under a negative pressure, wherein;

said control means further includes means for, after said first stripping process, controlling said driving means so that said first and second cover members come in contact with each other and making said first closed space be under the negative pressure, to thereby remove a piece of said covering stripped from said remaining wire in said first stripping process through said first suction pipe, and means for, after said second stripping process, controlling said driving means so that said third and fourth cover members come in contact with each other and making said second closed space be under the negative pressure, to thereby remove a piece of said covering stripped from said cut-off wire in said second stripping process through said second suction pipe.

15. A harness producing apparatus according to claim 1, further comprising,
   (k) first and second cover members which are fixed to said first and second cutters, respectively, and which, when said covering of said wire is cut into with said first and second cutters, are arranged so as to be close to each other, to thereby form a closed space in coopration with said first and second cutters,
   (l) a discharge pipe connected to said first cover member to open into said closed space,
   (m) an air blow pipe connected to said second cover member to open into said closed space, and
   (n) air supply means connected to said air blow pipe for supplying air to said closed space through said air blow pipe, wherein;
   said control means further includes means for, after said stripping process, controlling said driving means so that said first and second cover members come in contact with each other and supplying air to said closed space by said air supply means, to thereby remove a piece of said covering stripped from said wire in said stripping process through said discharge pipe.

16. A harness producing apparatus according to claim 2, further comprising,
   (k) first and second cover members which are fixed to each one side of said first and second cutters, respectively, and which, when said covering of said wire is cut into with said first and second cutters, are arranged so as to be close to each other, to thereby form a first closed space in coopration with said first and second cutters,
   (l) a first discharge pipe connected to said first cover member to open into said first closed space,
   (m) a first air blow pipe connected to said second cover member to open into said first closed space,
   (n) first air supply means connected to said first air blow pipe for supplying air to said first closed space through said first air blow pipe,
   (o) third and fourth cover members which are fixed to the other sides of said first and second cutters, respectively, and which, when said covering of said wire is cut into with said first and second cutters, are arranged so as to be close to each other, to thereby form a second closed space in coopration with said third and fourth cutters,
   (p) a second discharge pipe connected to said third cover member to open into said second closed space,
   (q) a second air blow pipe connected to said fourth cover member to open into said second closed space, and
   (r) second air supply means connected to said second air blow pipe for supplying air to said second closed space through said second air blow pipe, wherein;
   said control means further includes means for, after said first stripping process, controlling said driving means so that said first and second cover members come in contact with each other and supplying air to said first closed space by said first air supply means, to thereby remove a piece of said covering stripped from said remaining wire in said first stripping process through said first discharge pipe, and means for, after said second stripping process, controlling said driving means so that said third and fourth cover members come in contact with each other and supplying air to said second closed space by said second air supply means, to thereby remove a piece of said covering stripped from said cut-off wire in said second stripping process through said second discharge pipe.

17. harness producing apparatus according to claim 1 or 2, further comprising a pre-feed roller changeable in feeding speed for feeding said wire to said wire feeding means so as to slack said wire between said pre-feed roller and said wire feeding means, wherein;
   said driving means further includes means for driving said pre-feed roller,
   said controlling means further includes:
   means for calculating a change of said slack $\Delta X$ with the following formula, assuming that said pre-feed roller feeds said wire in constant speed, $$\Delta X = l \cdot \frac{T_2}{T_1 + T_2}$$

where symbol $T_1$ denotes a range of time when said wire feeding means feeds said wire, symbol $T_2$ denotes a range of time when said wire feeding means stops feeding said wire, symbol $l$ denotes a length of said wire fed by said wire feeding means in the time range $T_1$, and symbol $\Delta X$ denotes a change of said slack of said wire caused in the time range $T_1$;
   means for judging whether or not said slack of said wire is kept in a range between a predetermined maximum and a predetermined minimum by comparing said change $\Delta X$ calculated by said calculating means with an allowable change; and
   speed controlling means for keeping said feeding speed be in a constant speed of $(l/(T_1+T_2))$ when said judging means judges that said slack of said wire is kept in said range, while changing said feeding speed so that said pre-feed roller feeds said wire with said length $l$ to said wire feeding means in a time range $(T_1+T_2)$ and said slack of said wire is kept in said range when said judging means judges that said slack of said wire is out of said range.

18. A harness producing apparatus according to claim 1 or 2, further comprising a pre-feed roller changeable in feeding speed for feeding said wire to said wire feeding means so as to slack said wire between said pre-feed roller and said wire feeding means, and means for detecting said slack of said wire coming into a predetermined intermediate value, wherein;

said drive means further includes means for driving said pre-feed roller, said controlling means further includes:

means for calculating a change of said slack $\Delta X$ and a feeding velocity v with the following formulas, assuming that said pre-feed roller feeds said wire in constant speed, $$v = \frac{l}{T_1 + T_2}$$

$$\Delta X = l \cdot \frac{T_2}{T_1 + T_2}$$

where symbol $T_1$ denotes a range of time when said wire feeding means feeds said wire, symbol $T_2$ denotes a range of time when said wire feeding means stops feeding said wire, symbol l denotes a length of said wire fed by said wire feeding means in the time range $T_1$, and symbol $\Delta X$ denotes a change of said slack of said wire caused in the time range $T_1$;

first judging means for judging whether or not said slack of said wire is kept in a range between a predetermined maximum and a predetermined minimum by comparing said change $\Delta X$ calculated by said calculating means and an allowable change;

first speed control means for changing said feeding speed so that said pre-feed roller feeds said wire with said length to said wire feeding means in a time range $(T_1+T_2)$ and said slack of said wire is kept in said range when said first judging means judges that said slack of said wire is out of said range;

second judging means for judging whether or not said feeding velocity v is kept lower than a minimum allowable velocity, second speed control means for keeping said feeding speed be in a constant speed of $(l/(T_1+T_2))$ when said second judging means judges that said feeding velocity v is larger than said allowable velocity, while changing said feeding speed so that said slack of said wire is put into a range between said intermediate value and a maximum of said slack in a predetermined time range when said second judging means judges that said feeding velocity v is smaller than said minimum allowable velocity and said detecting means detects said slack of said wire coming into said intermediate value.

* * * * *